United States Patent [19]
Yashiro et al.

[11] Patent Number: 5,954,822
[45] Date of Patent: Sep. 21, 1999

[54] DISK ARRAY APPARATUS THAT ONLY CALCULATES NEW PARITY AFTER A PREDETERMINED NUMBER OF WRITE REQUESTS

[75] Inventors: Mitsuhiko Yashiro; Takeshi Obata; Suijin Takeda; Sawao Iwatani, all of Kawasaki, Japan

[73] Assignee: Fujitsu Limited, Kawasaki, Japan

[21] Appl. No.: 09/031,004

[22] Filed: Feb. 26, 1998

Related U.S. Application Data

[62] Division of application No. 08/746,154, Nov. 6, 1996, Pat. No. 5,787,460.

[30]     Foreign Application Priority Data

| May 21, 1992 | [JP] | Japan | 4-128975 |
| Oct. 8, 1992 | [JP] | Japan | 4-269823 |
| Oct. 8, 1992 | [JP] | Japan | 4-269824 |
| May 20, 1993 | [JP] | Japan | PCT/JP93/0066 |

[51] Int. Cl.[6] .................................................. G06F 11/00
[52] U.S. Cl. .............................................. 714/6; 714/770
[58] Field of Search .................................. 714/6, 5, 7, 20, 714/41, 42, 44, 48, 763, 770; 711/114, 154, 113, 162, 142

[56]     References Cited

U.S. PATENT DOCUMENTS

| 5,274,799 | 12/1993 | Brant et al. ............................ 395/575 |
| 5,315,602 | 5/1994 | Noya et al. ............................ 371/40.4 |
| 5,333,305 | 7/1994 | Neufeld .................................. 395/575 |
| 5,341,381 | 8/1994 | Fuller ..................................... 371/10.1 |
| 5,408,644 | 4/1995 | Schneider et al. ..................... 395/575 |
| 5,418,921 | 5/1995 | Cortney et al. ........................ 395/425 |
| 5,513,192 | 4/1996 | Janku et al. ............................. 371/48 |
| 5,758,054 | 5/1998 | Katz et al. ............................ 395/182.2 |
| 5,761,705 | 6/1998 | Dekoning et al. ..................... 711/113 |
| 5,774,643 | 6/1998 | Lubbers et al. ..................... 395/182.18 |
| 5,787,460 | 7/1998 | Yashiro et al. ........................ 711/114 |
| 5,809,543 | 9/1998 | Byers et al. ........................... 711/162 |
| 5,835,698 | 11/1998 | Harris et al. ....................... 395/182.13 |
| 5,844,919 | 12/1998 | Glover et al. ........................ 371/40.14 |
| 5,848,229 | 12/1998 | Morita ............................... 395/182.05 |
| 5,860,090 | 1/1999 | Clark ...................................... 711/113 |
| 5,860,091 | 1/1999 | Dekoning et al. ..................... 711/114 |
| 5,867,640 | 2/1999 | Aguilar et al. .................... 395/182.04 |
| 5,872,800 | 2/1999 | Glover et al. .......................... 371/40.4 |

FOREIGN PATENT DOCUMENTS

| 63-115251 | 5/1988 | Japan . |
| 64-28755 | 1/1989 | Japan . |
| 4245352 | 9/1992 | Japan . |

OTHER PUBLICATIONS

Katz, Randy et al., "Disk System Architectures for High Performance Computing", Proc. of the IEEE, Dec. 1989, V. 77,N. 12pp. 1842–1858.

Gibson, Garth, "Disk Reads with Dram Latency", Workstation Operating Systems, 1992, pp. 126–131.

Orji, Cyril et al., "Write Only Disk Cache Experiments on Multiple Surface Disk", Computing and Information, 1992 International Conference, pp. 385–388.

*Primary Examiner*—Robert W. Beausoliel, Jr.
*Assistant Examiner*—Nadeem Iqbal
*Attorney, Agent, or Firm*—Greer, Burns & Crain, Ltd.

[57]     ABSTRACT

A parity which is used to a disk array is formed by using a cache memory. A storing method of the cache memory is classified into three methods such that: only data is stored; only redundant information is stored; and both of the data and the redundant information are stored. Even when a power source is shut off during the data writing process, the processing stages of the data writing and parity updating and the necessary data are stored into a non-volatile memory and are used for recovery.

17 Claims, 46 Drawing Sheets

DISK ARRAY APPARATUS THAT ONLY CALCULATES NEW PARITY AFTER A PREDETERMINED NUMBER OF WRITE REQUESTS

This is a divisional of application Ser. No. 08/746,154, filed Nov. 6, 1996 now U.S. Pat. No. 5,787,460.

TECHNICAL FIELD

The invention relates to a disk array apparatus in which a plurality of disk apparatuses are accessed in parallel and data input/output processes are executed and, more particularly, to a disk array apparatus for efficiently form redundant information when updating data stored in a disk apparatus.

In recent years, an establishment of LAN (Local Area Network) is being rapidly spread in order to effectively use resources by allowing a plurality of users to commonly use expensive peripheral apparatuses such as external memory device, printer, and the like, as well as resources such as files or the like. In such an LAN, it is a client server model that is excellent from a viewpoint of the common use of the resources. The client server model is a model to realize a distributed processing system by connecting a client apparatus which requires services and a server apparatus which provide services and by performing mutual communication between the client apparatus and the server apparatus. As typical server apparatuses in the client/server model, there are a print server apparatus, a terminal server apparatus, a disk server apparatus, and the like. Among those server apparatuses, the disk server apparatus is a node to provide an external memory device of a large capacity to each client apparatus connected to the LAN line. A management of a large amount of data and a high reliability of the data management are required for the disk server apparatus. As an external memory device of a large capacity which is connected to the disk server apparatus for coping with such requirements, there is provided a disk array apparatus having a disk apparatus such as magnetic disk apparatus, magnetooptic disk apparatus, or the like which can be accessed at random and is rewritable. According to such a disk array apparatus, by transferring data in parallel to the disk apparatuses arranged in an array form, data can be transferred at a high speed or the times corresponding to the number of disks as compared with the case of one disk apparatus. On the other hand, in addition to the data, by adding and recording redundancy information such as parity data or the like, a data error occurring due to a failure of the disk apparatus or the like as a cause can be detected and corrected. A high reliability which is almost equal to that by the method of recording the contents of the disk apparatus twice can be realized by such a double recording by low costs.

BACKGROUND ART

Hitherto, David A. Patterson et al. of University of California at Berkeley have proposed a paper regarding the results of the evaluation by classifying into levels 1 to 5 with respect to a disk array apparatus in which a large amount of data is accessed to disks at a high speed and a redundancy of the data in case of a failure of the disk is realized ("ACM SIGMOD Conference", pages 109 to 116, Chicago, Ill., Jun. 1 to 3, 1988). The levels 1 to 5 to classify the disk array apparatus which has been proposed by David A. Patterson et al. are abbreviated to RAID (Redundant Arrays of Inexpensive Disks) 1 to 5. The RAID 1 to 5 will now be briefly explained hereinbelow.

RAID0

FIG. 1 shows a disk array apparatus having no redundancy of data. Although it is not included in the classification by the David A. Patterson, it is temporarily called RAID0. According to the disk array apparatus of RAID0, as shown in data A to I, a disk array control apparatus 10 merely distributes the data to disk apparatuses 31-1 to 32-3 on the basis of input/output requests from a host computer 18, respectively. There is no redundancy of data in case of a disk failure.

RAID1

As shown in FIG. 2, a disk array apparatus of RAID1 has a mirror disk apparatus 32-2 in which copies A' to C' of data A to C stored in the disk apparatus 32-1 have been stored. Although a use efficiency of the disk apparatus is low, the RAID1 has a low redundancy and can be realized by a simple control, so that it is widely spread.

RAID2

A disk array apparatus of RAID2 stripes (divides) the data on a bit or byte unit basis and reads or writes the data from/to the disk apparatuses. All of the striped data is physically recorded to the same sector in all of the disk apparatuses. As an error correction code, a hamming code produced from the data is used. In addition to the disk apparatus for data, the apparatus has another disk apparatus to record the hamming code. The failed disk apparatus is decided from the hamming code and the data is reconstructed. By providing the redundancy by the hamming code, even when the disk apparatus fails, correct data can be assured. However, it is not put into practical use yet because the use efficiency of the disk apparatus is bad.

RAID3

A disk array apparatus of RAID3 has a construction shown in FIG. 3. That is, as shown in FIG. 4, for example, data a, b, and c are divided into data a1 to a3, b1 to b3, and c1 to c3 on a bit or sector unit basis. Further, a parity P1 is calculated from the data a1 to a3. A parity P2 is calculated from the data b1 to b3. A parity P3 is calculated from the data c1 to c3. The disk apparatuses 32-1 to 32-4 in FIG. 3 are simultaneously accessed in parallel and the data is written. In the RAID3, the redundancy of the data is held by the parity. The data writing time can be reduced by the parallel processes of the divided data. It is necessary to execute the parallel seeking operations of all of the disk apparatuses 32-1 to 32-4 by the one writing or reading access operation. Therefore, although it is effective in case of continuously handling a large amount of data, in case of a transaction process such that a small amount of data is accessed at random, a high data transfer speed cannot be utilized and the efficiency deteriorates.

RAID4

As shown in FIG. 5, a disk array apparatus of RAID4 divides one data on a sector unit basis and writes to the same disk apparatuses. For example, when considering the disk apparatus 32-1, the data a is divided into sector data a1 to a4 and those four data are written. The parities are stored in the disk apparatus which has fixedly been determined. The parity P1 is calculated from the data a1, b1, and c1. The parity P2 is calculated from the data a2, b2, and c2. The parity P3 is calculated from the data a3, b3, and c3. The parity P4 is calculated from the data a4, b4, and c4. The data can be read out in parallel from the disk apparatuses 32-1 to 32-3. As for the reading of the data a to b, when considering the data a as an example, sectors 0 to 3 of the disk apparatus 32-1 are accessed and the sector data a1 to a4 are sequentially read out and synthesized. As for the data writing, after the data and parities before writing were read out, new parities are calculated and written, so that the accessing operations of total four times are necessary with respect to one writing operation. For instance, in case of updating (rewriting) the sector data a1 of the disk apparatus 32-1, the operations to read out old data $(a1)_{old}$ at the updating location and an old parity $(P1)_{old}$ of the disk apparatus 324 corresponding thereto and to obtain and write new data $(a1)_{new}$ and a new parity $(P1)_{new}$ which is matched therewith are needed in addition to the data writing operation for updating. On the other hand, when writing, since the disk apparatus 32-4 for parities is certainly accessed, it is impossible to simultaneously write data to a plurality of disk apparatuses. For example, even when the writing of the data a1 to the disk apparatus 32-1 and the writing of the data b2 to the disk apparatus 32-2 are simultaneously executed, since it is necessary to read out and calculate the parities P1 and P2 from the same disk apparatus 32-4 and to subsequently write them, they cannot be simultaneously written. Although RAID4 has been defined as mentioned above, since there is little advantage, a tendency to put into practical use is small at present.

RAID5

A disk array apparatus of RAID5 can perform the reading or writing operations in parallel because the disk apparatus for parities is not fixed. Namely, as shown in FIG. 6, the disk apparatuses in which the parities are set are different every sector. The parity P1 is calculated from the data a1, b1, and c1. The parity P2 is calculated from the data a2, b2, and d2. The parity P3 is calculated from the data a3, c3, and d3. The parity P4 is calculated from the data b4, c4, and d4. As for the parallel reading/writing operations, for example, since the data a1 of the sector 0 of the disk apparatus 32-1 and the data b2 of the sector 1 of the disk apparatus 32-2 do not overlap because the parities P1 and P2 are set into the different disk apparatuses 32-4 and 32-3, so that the data can be simultaneously read or written. The overhead which needs the accessing operations of total four times upon writing is substantially the same as that in RAID4. As mentioned above, in RAID5, since a plurality of disk apparatuses are asynchronously accessed and the reading/writing operations can be executed, it is suitable for a transaction process in which a small amount of data is accessed at random. In the disk array apparatus as shown in RAID3 to RAID5, a combination of the disk apparatuses regarding the formation of the redundant information is called a rank. For example, in the case where there are (k) disk apparatuses for data recording and (m) disk apparatuses for recording the redundant information regarding the data, the (k+m) disk apparatuses are referred to as a rank.

In such conventional disk array apparatuses corresponding to RAID4 and RAID5, in case of rewriting and updating a part or all of the data stored in the disk apparatuses in the rank, it is also necessary to update the redundant information regarding the data to be updated. In this instance, in order to obtain new redundant information, the data before updating and the redundant information are necessary. It is now assumed that the parity data is used as redundant information, when the data of one disk apparatus in the rank of the disk array apparatus is updated, new parities can be calculated from the following equation (1).

$$\text{Old data}(+)\text{old parity}(+)\text{new data} = \text{new parity} \quad (1)$$

where,(+)denotes the exclusive OR

As will be understood from the equation (1), upon updating of data, the data before updating and the redundant information must be read out from the disk apparatuses, respectively, before the updating data is written. There is, consequently, a problem such that it takes a long time for the data updating process than that of the ordinary disk apparatus by only the time which is required to read out the data before updating and the redundant information from the disk apparatus.

It is, therefore, an object of the invention to provide a disk array apparatus in which at least one of a plurality of data which are handled upon updating is stored into a cache memory and the disk access that is necessary to produce redundant information is efficiently executed.

On the other hand, in the conventional disk array apparatus, in the case where the power supply is stopped due to some causes during the data writing operation, in the conventional disk apparatus or the disk array apparatus of RAID1 to RAID3, the same writing operation can be also executed from the beginning after the recovery of the power source. In the disk array apparatuses of RAID4 and RAID5, however, it is not permitted that the same writing operation is executed again from the beginning after the recovery of the power source because of the following reasons. Upon writing of data of RAID4 and RAID5, as shown by the following equation, the exclusive OR of the data in a plurality of disk apparatuses is calculated and is set to a parity and is held into the disk apparatus for parities.

$$\text{data a}(+)\text{data b}(+) \ldots = \text{parity P}$$

where,(+)denotes a symbol of exclusive OR

Storing locations of the data and parity are fixed into the specific disk apparatuses 32-1 to 32-4 as shown in FIG. 5 in case of RAID4. On the other hand, in RAID5, as shown in FIG. 6, the parities are distributed to the disk apparatuses 32-1 to 32-4, thereby preventing the concentration of the accesses to the special disk apparatuses by the parity reading/writing operation. Upon data reading of RAID4 an RAID5, since the data in the disk apparatuses 32-1 to 32-4 is not rewritten, the matching of the parities is held. Upon writing, however, the parities also need to be changed in accordance with the data. For example, when one old data $(a1)_{old}$ in the disk apparatus 32-1 is rewritten to the new data $(a1)_{new}$, in order to obtain the matching of the parity P1, the calculation shown in the equation (1) is executed and the parity is updated, thereby enabling the matching of the parities of the whole data of the disk apparatuses to be held. As will be understood from the equation (1), in the data writing process, it is necessary to first read out the old data and old parity in the disk apparatus, and after that, the new data is written and the new parity is produced and written.

When the power source is shut off during the writing of the new data or new parity, the location in which the data has actually been correctly written cannot be recognized and the matching of the parities is lost. When the same data writing process is again executed at the time of recovery of the power source in this state, the old data and old parity are read out from the disk apparatus in which the matching of the parity is not obtained, so that there is a problem such that the new parity which is not matched is produced and the writing operation is finished.

It is, therefore, an object of the invention to provide a disk array apparatus in which even when a shut-off of the power source occurs during the data writing process, the data writing process which was interrupted can be restarted and completed from the halfway after the recovery of the power source.

DISCLOSURE OF INVENTION

A disk array which is used in the invention comprises: a plurality of disk apparatuses to store data; and one disk apparatus to store, for example, parity data as redundant information. A set of disk apparatuses to store data and the disk apparatus to store parities is defined as a rank. It is now assumed that data is divided on a unit basis of a predetermined data length, for example, sector unit, file unit, or record unit and written into each disk apparatus. The disk apparatus to store the parities can be fixedly determined (RAID-4) or can be also made different every sector position (RAID-5). When accepting an updating request from an upper apparatus, the access processing section forms new redundant information on the basis of new data, the data before updating, and the redundant information before updating and updates the data and redundant information before updating stored in the disk array to the new data and redundant information. In case of using parity data as redundant information, new parity data is formed by the exclusive OR of the new data, the data before updating, and the parity data before updating. Namely, the new parity data is obtained by the following equation.

New parity=new data(+)old data(+)old parity

Further, the invention has a cache memory to form the redundant information without accessing the disk apparatus of the disk array. The storing data in the cache memory is classified into the following three cases.

(1) Only data is stored
(2) only redundant information is stored
(3) Both of data and redundant information are stored Before the disk array is updated by the access processing section, a cache control section searches the data and/or redundant information before updating from the cache memory and supplies to the access processing section, thereby forming the redundant information. In case of a hit mistake such that it is known by the search of the cache memory that none of the data and/or redundant information is stored, no storage is informed to the access processing section. After completion of the updating based on the reading from the disk array, the data and/or redundant information is stored into the cache memory. Further, according to the invention, after the data was updated by only a predetermined number of times in the area which was newly assured in the cache memory, the data is rewritten into the disk array. Specifically speaking, until the number of updating times reaches a predetermined number of times, the access processing section updates the data on the cache memory without forming new redundant information every updating. When the number of updating times reaches the predetermined number of times, the data is updated on the cache memory. After that, new redundant information is formed from the redundant information (old parity) before updating which was read out from the disk array and the newest updating data read out from the cache memory and the data (old data) before updating. The data and redundant information are rewritten to the disk array. When considering the formation of the parity data as an example, the formation of the redundant information in this case is as shown by the following equation.

New parity=old data(+)old parity(+)newest updating data

Further, dummy data $D_{dummy}$ and dummy redundant information $P_{dummmy}$ are stored into empty areas in each disk apparatus in the disk array and the cache memory. The access processing section forms new redundant information including the dummy data and dummy redundant information in the empty areas at the times of updating and deletion of data. With respect to the dummy data and dummy redundant information, preset values are used without reading out them from the disk array.

According to the disk array apparatus of the invention as mentioned above, the cache memory to store a part or all of the data accessed before the updating process. At the time of the updating process, and when the old data has already been stored in the cache memory at the time of the updating process, such data is read out from the cache memory and is used, so that a process to read out the data from the disk apparatus can be omitted and the processing time can be reduced. If both of the data and the corresponding redundant information are stored into the cache memory, the process to directly read out the redundant information before updating from the disk apparatus can be omitted and the processing time can be further reduced. In addition, by executing processes such that at the time of the updating process, the updated data is not immediately written into the disk apparatus but stored into the cache memory and, after the data was updated by only a predetermined number of times, the data is rewritten to the data apparatus, the data before updating and the newest updated data are read out from the cache memory and the new redundant information can be formed. The process to write the updated data and the redundant information into the disk apparatus every updating process can be made unnecessary. Further, dummy data is stored in the space areas in the disk apparatus and cache memory, the redundant information is formed at the time of updating of either one of the same segments including the dummy data, thereby making it unnecessary to manage the space areas of the same segments to form the redundant information. Since the dummy data has a predetermined fixed value, there is no need to read out the dummy data from the disk apparatus. Even when the dummy data is included, the redundant information can be easily formed.

The disk array apparatus of the invention such that even when a power shut-off occurs during the data writing operation, the interrupted data writing process can be restarted and completed from the halfway after the recovery of the power source comprises: a disk array mechanism; a data writing section; a parity updating section; a non-volatile memory; and a recovering section. When the writing process is commanded from the upper apparatus, the data writing section of the disk array mechanism reads out the old data stored at the writing position of an arbitrary designated disk apparatus and, after that, writes the new data transferred from the upper apparatus. The parity updating section reads out the old parity from the storing position in the disk apparatus for parities corresponding to the disk writing position by the data writing section and, specifically speaking, forms a new parity from the exclusive OR on the basis of the old parity, old data, and new data. After that, the new parity is written to the disk storing position of the old parity. Further, a non-volatile memory is provided. Processing stage data indicative of the processing stages of the data writing section and parity updating section and the new data transferred from the upper apparatus are stored into the non-volatile memory. When the power source is turned on, the recovering section refers to the processing stage data in the non-volatile memory. When the writing process has been interrupted in the halfway, the recovering section executes a recovering process by using the new data held in the non-volatile memory.

The parity updating section includes a stage to form an intermediate parity from, for example, the exclusive OR of the old data and old parity. The processing mode of the recovering section is set to either one of the following two modes in case of storing the new data and the processing stage data into the non-volatile memory.

Mode 1

This mode relates to the case where the power shut-off has already occurred before completion of the writing operation of the new data to the disk apparatus. In the mode 1, after the old data stored at the writing position in the disk apparatus designated by the data writing section was read out, a process to write the new data read out from the non-volatile memory is executed. After completion of writing of the new data, the old parity is read out from the storing position in the disk apparatus for parities corresponding to the disk writing position of the data by the parity updating section. The new parity is formed on the basis of the old parity, old data, and new data. After that, the process to write the new parity to the disk storing position of the old parity is executed.

Mode 2

This mode relates to the case where a power shutoff has already occurred before completion of the writing of the new parity to the disk apparatus for parities. In case of the mode 2, the process to read out the data stored at the corresponding positions in the disk apparatuses other than the disk apparatus into which the data is written by the data writing section and the disk apparatus for parities is executed. The parity updating section forms the new parity from the data read out from the other disk apparatuses and the new data read out from the non-volatile memory. After that, the process to write the new parity to the disk storing position of the old parity is executed.

In the invention, an intermediate parity is further stored into the non-volatile memory. In this case, a recovering process when a power shut-off has occurred before completion of the storage of the intermediate parity after completion of the writing of the new data is added as a new mode. Further, according to the invention, the new parity can be also stored into the non-volatile memory and as for the recovery after the power shut-off, it is sufficient to restart the process from the next stage on the basis of the data at the last stage remaining in the non-volatile memory. In this case, by also providing a backup power source to a disk adapter which is provided for every disk apparatus, both of the old data and the old parities can be also held at the time of the power shut-off. The process to again read out the data in the recovering process can be made unnecessary. According to the disk array apparatus of the invention having such a construction, when the power shut-off occurs in the disk array apparatuses with the constructions according to RAID4 and RAID5, by restarting the process during the halfway of the writing process by using the information held in the non-volatile memory, the writing process can be normally finished. After the power source was recovered, there is no need to execute the processes from the beginning, so that the recovering process can be performed at a higher speed. The kind of data which is held for the recovering process by the power shut-off can be selected in accordance with the capacity of the non-volatile memory which can be used from a viewpoint of the costs.

BEST MODE FOR CARRYING OUT THE INVENTION

1. Hardware Construction of the Invention

Figure 6:
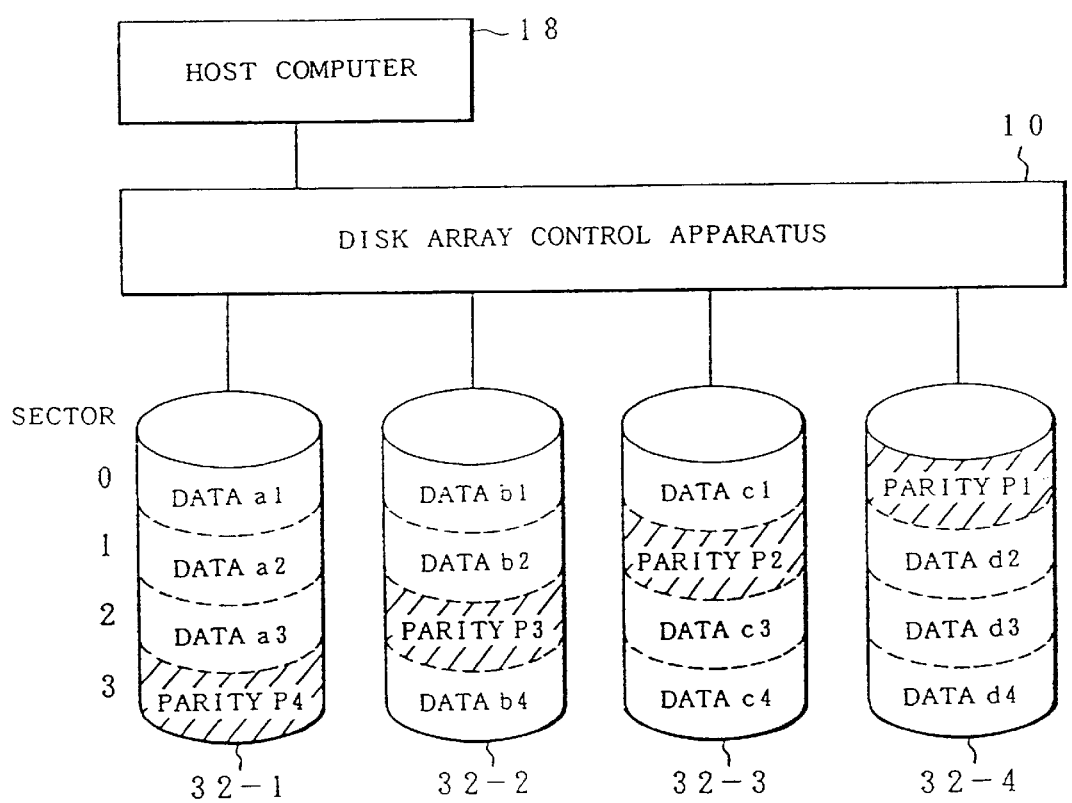
FIG. 6 is an explanatory diagram of a Prior Art disk array apparatus by RAID5.
Figure 7:
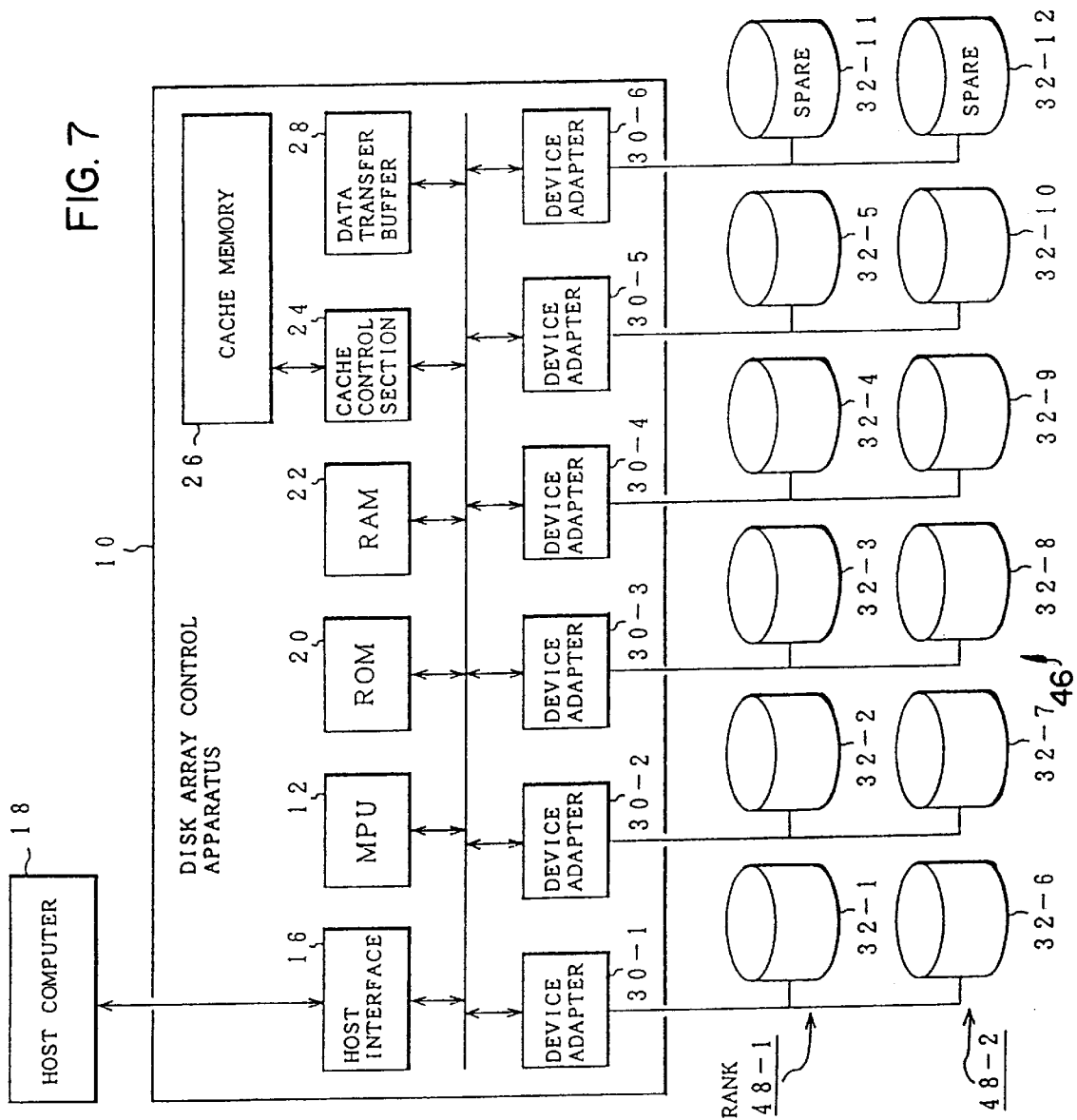
FIG. 7 is a constructional diagram of an embodiment showing a hardware construction of the invention.

FIG. 7 is an embodiment constructional diagram showing a hardware construction of a disk array apparatus according to the invention. In FIG. 7, the disk array control apparatus 10 has an MPU 12 which operates as control means. An ROM 20 in which processing programs have been stored, an RAM 22 which is used as a control memory or the like, a cache memory 26 connected through a cache control section 24, and a data transfer buffer 28 are connected to an internal bus 14 from the MPU 12. A host interface 16 is provided to communicate with the host computer 18 as an upper apparatus. In the embodiment, a disk array 46 with a 2-rank construction of ranks 48-1 and 48-2 is provided under control of the disk array control apparatus 10. Five disk apparatuses 32-1 to 32-5 are provided for the rank 48-1 in the disk array 46. Five disk apparatuses 32-6 to 32-10 are also similarly provided for the rank 48-2. Further, disk apparatuses 32-11 and 32-12 which are in a stand-by mode are provided as spare apparatuses for the ranks 48-1 and 48-12, respectively. Among five disk apparatuses constructing each of the ranks 48-1 and 48-2, four disk apparatuses are used to record data and the remaining one disk apparatus is used to record parities. The disk apparatus to record parities is fixed in case of the disk array of RAID4 shown in FIG. 5. In the disk array of RAID5 shown in FIG. 6, the recording positions of the parities in the rank are changed each time the sector position as a recording unit into the disk differs.

The disk apparatuses 32-1 to 32-10 constructing the ranks 48-1 and 48-2 and the spare disk apparatuses 32-11 and 32-12 are connected to the internal bus 14 of the MPU 12 through the device adapters 30-1 to 30-6 provided for the disk array control apparatus 10. The device adapters 30-1 to 30-6 execute the accesses to the disk apparatuses at the same positions of the ranks 48-1 and 48-2, for instance, the device adapter 30-1 executes the accesses of the disk apparatuses 32-1 and 32-6 under control of the MPU 12.

Figure 8:
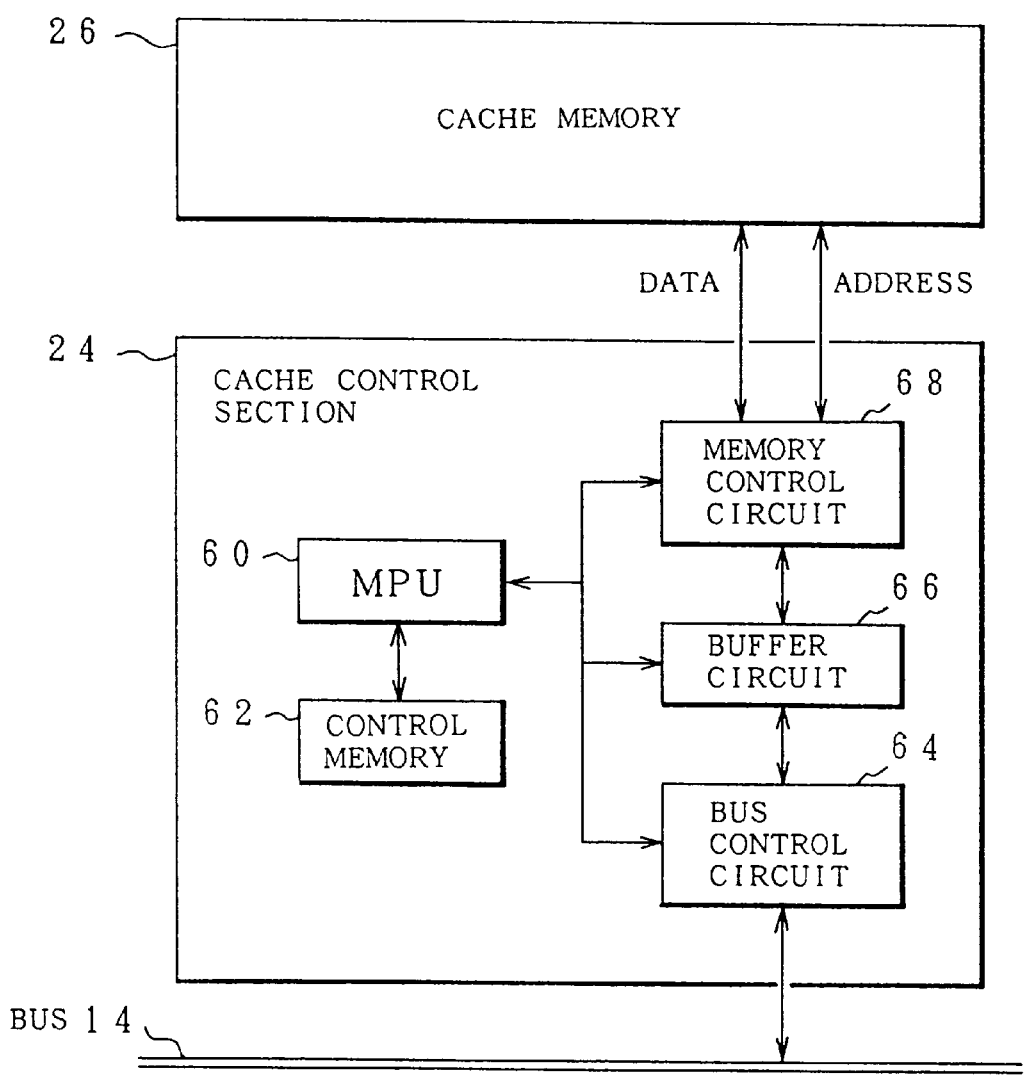
FIG. 8 is a constructional diagram of an embodiment of a cache control section in FIG. 7.

FIG. 8 shows a construction of the cache control section 24 in FIG. 7. The cache control section 24 comprises: an MPU 60 to control the whole apparatus; a control memory 62 which is used under the control of the MPU 60; a bus control circuit 64 to control the transmission and reception of data with the bus 14 and instructions with the MPU 60; a memory control circuit 68 to transmit and receive data with the cache memory 26; and a buffer circuit 66 to perform the transmission and reception of data between the bus control circuit 64 and the memory control circuit 68. The instruction sent from the MPU 12 of the disk array control apparatus 10 passes through the bus 14 and is sent to the bus control circuit 64 and is sent to the MPU 60 of the cache control section 24. The MPU 60 indicates a memory address of a target to be accessed to the memory control circuit 68. Further, the MPU 60 supplies an instruction regarding the data transfer to the memory control circuit 68, buffer circuit 66, and bus control circuit 64. In case of reading out from the cache memory 26, the contents in the indicated memory address are transferred to the bus 14 through the memory control circuit 68, buffer circuit 66, and bus control circuit 64. In case of writing into the cache memory 26, the data sent from the bus 14 to the bus control circuit 64 is transmitted to the memory control circuit 68 via the buffer circuit 66 and is written into the designated address in the cache memory 26.

2. First Embodiment in Which Only Data is Stored into the Cache Memory

Figure 9:
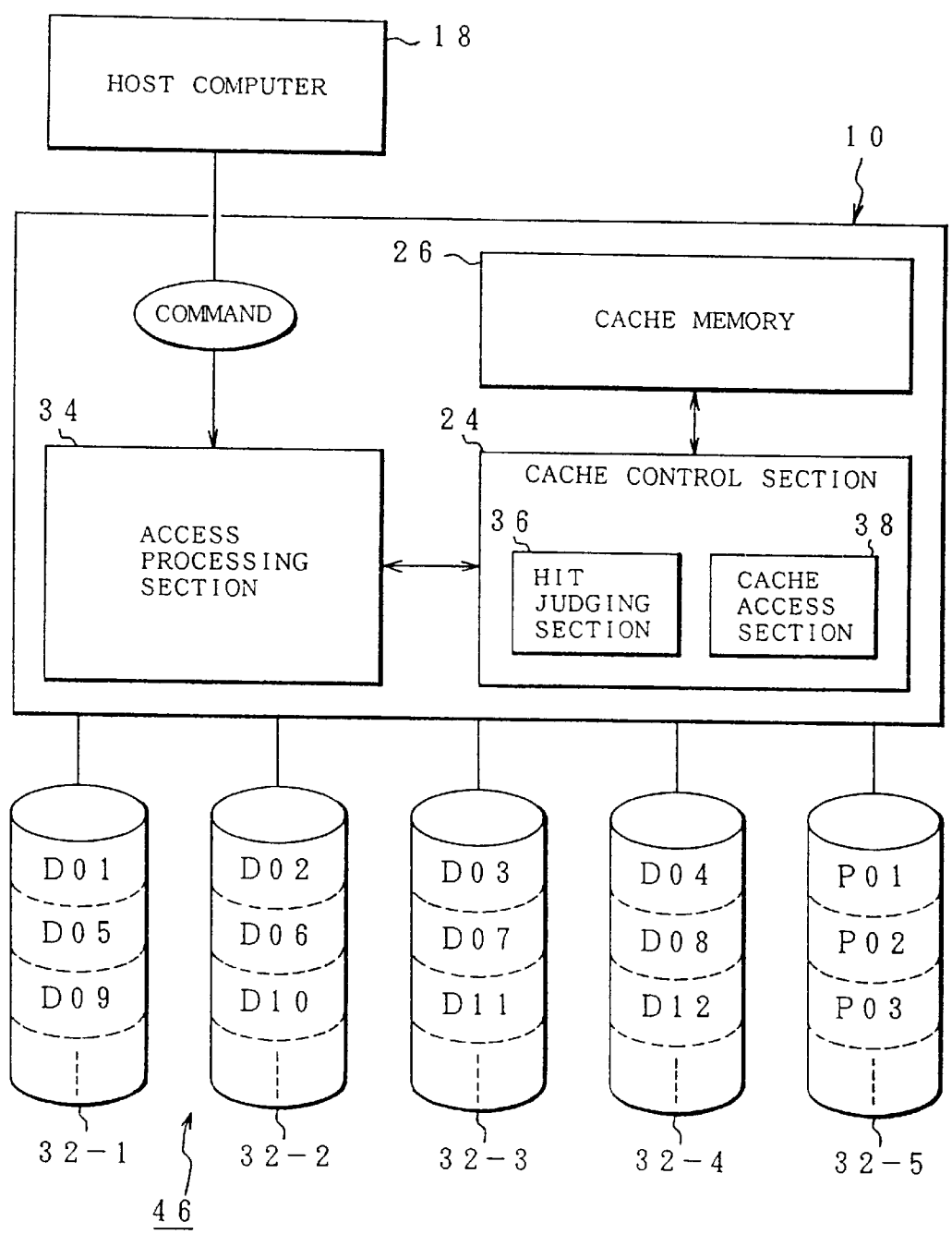
FIG. 9 is a functional block diagram showing the first embodiment of the invention.

FIG. 9 is a functional block diagram showing the first embodiment of the invention. The first embodiment is characterized in that only the data used for updating of the disk array 46 of the cache memory 26 provided for the disk array control apparatus 10 is stored. In FIG. 9, the access processing section 34 provided for the disk array control apparatus 10 is realized by the program control of the MPU 12 and executes the accessing process to the disk array 46 on the basis of the command as an input/output request from the host computer 18. As a disk array 46, there is shown a one-rank construction in which the five disk apparatuses 32-1 to 32-5 are picked up and shown. The disk apparatuses 32-1 to 32-5 constructing one rank are divided on a predetermined data recording unit basis, for example, on a sector unit basis as shown by broken lines. A physical ID has been preset in each of the disk apparatuses 32-1 to 32-5. A logic ID from the host computer 18 is converted into the physical ID by a device ID management table provided in the access processing section 34, and the disk apparatus as a target to be accesses can be designated. Namely, by decoding the command between the host computer 18 and the access processing section 34 by the access processing section 34, a disk ID and a data address are obtained. A special disk apparatus is designated by the disk ID and the reading process or writing process based on a request from the host computer 18 is executed for the data address. As storage data for each sector position of the data disk apparatuses 32-1 to 32-5 of the disk array 46, in the embodiment, a case where the parity disk has been fixed to the disk apparatus 32-5 in RAID4 is now considered as an example. For instance, a parity data P01 obtained as an exclusive OR of storage data D01 to D04 at the first sector positions of the disk apparatuses 32-1 to 32-4 is stored to the same sector position of the disk apparatus 32-5. A hit judging section 36 and a cache access section 38 which are realized by the program control in the MPU 60 shown in FIG. 8 are provided for the cache control section 24. The hit judging section 36 receives the notification of the disk ID and data address obtained by decoding the command from the host computer 18 by an access processing section 34 and searches the cache memory 26. In the first embodiment, only the updating data stored in the disk apparatuses 32-1 to 32-4 for data recording in the disk array 46 has been stored in the cache memory 26. The hit judging section 36 refers to a cache table on the basis of the device ID and data address from the access processing section 34. When the hit judging section 36 judges the cache registration, namely, hit of the corresponding data in the cache table, the corresponding old data before updating is read out from the cache memory 26 and supplied to the access processing section 34. Prior to updating the old data of the designated disk apparatus of the disk array 46 to the new data, the access processing section 34 forms a new parity on the basis of the old data before updating which was read out from the cache memory 26, the old parity stored in the disk apparatus, and new data to be updated. After the new parity was formed, the new data is written into the disk apparatus and is updated. The new parity is written into the updating sector of the disk apparatus 32-5 for parities and updated. The new parity is written into the sector at the same position with the updating sector of the disk apparatus 32-5 for parities, thereby updating the parity. In case of a misjudgment such that the registered target data cannot be obtained even by searching the cache management table by the hit judging section 36, no data is read out from the cache memory 26 but the old data before updating which was stored in the corresponding sector of the disk apparatus as an updating target of the disk array 46 and the old parity before updating in the same segment of the disk apparatus 32-5 for parities are read out in a manner similar to the ordinary method and a new parity is formed from those old data and old parity and the new data. After that, the data and parities for the disk apparatus are updated.

Figure 10:
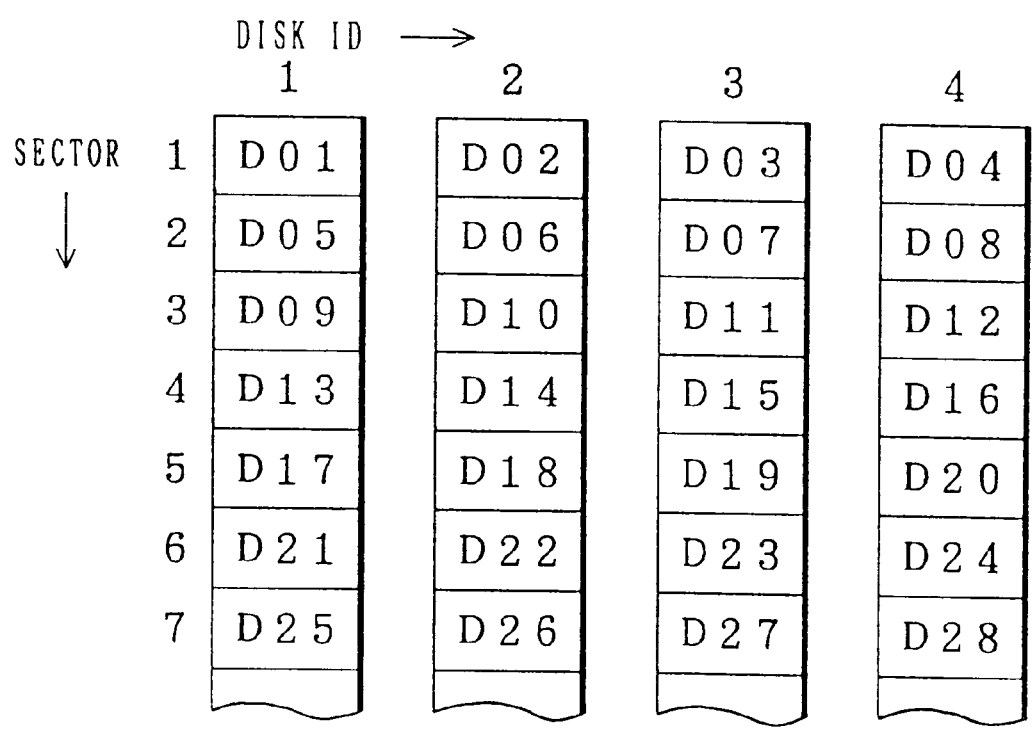
FIG. 10 is an explanatory diagram showing the content of a cache memory of the first embodiment.

FIG. 10 shows an example of the memory contents in the cache memory 26 in FIG. 9. The memory address can be specified by the sector number corresponding to the disk ID No. and the data address. Data D0, D02, D03, - - - are stored with the corresponding relation with the disk apparatuses 32-1 to 32-4 of the disk array 46.

Figure 11:
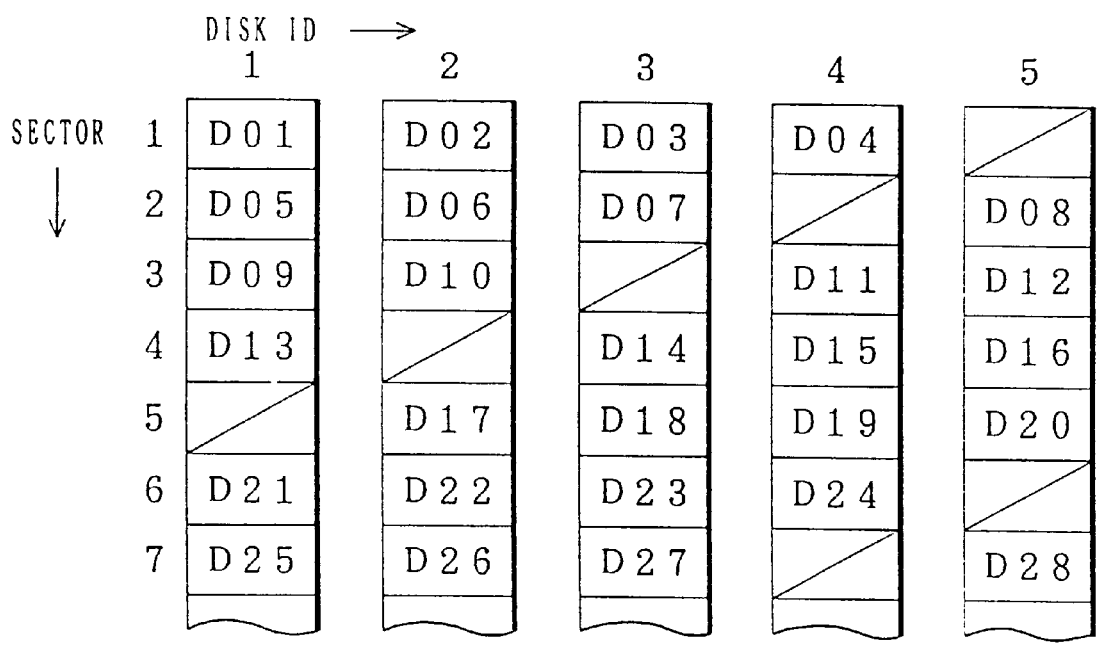
FIG. 11 is an explanatory diagram showing another content in the cache memory of the first embodiment.

FIG. 11 shows the memory contents in the cache memory 26 corresponding to the disk array 46 corresponding to RAID5 in which the disk apparatus to store the parity data differs each time the sector position changes. Similarly, the memory area can be specified by the disk ID No. and the sector No. corresponding to the data address. The areas which are deleted by oblique lines and are designated by the disk ID No. and the sector No. correspond to the parity data. Therefore, such areas are eliminated in case of storing only the data in the first embodiment into the cache memory 26.

Figure 12:
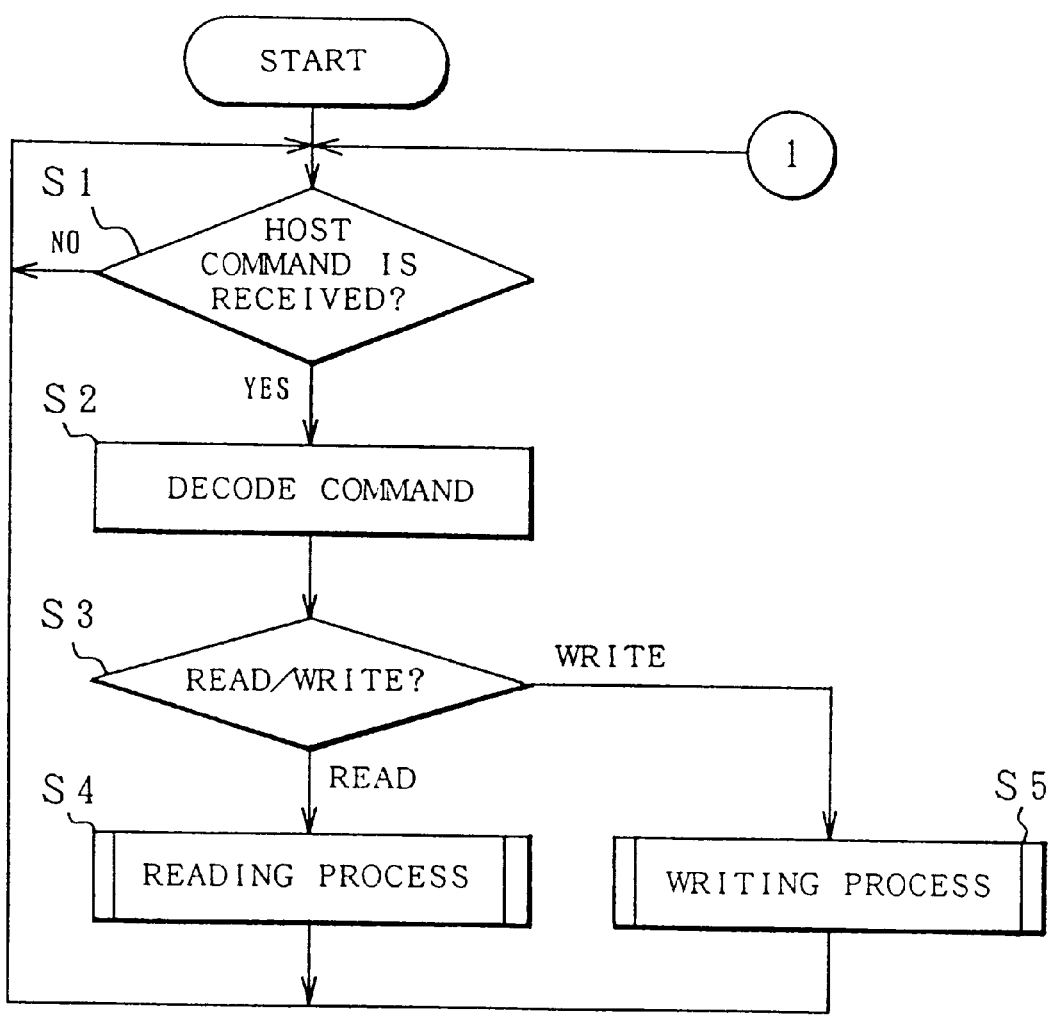
FIG. 12 is a flowchart showing the whole processing operation of the invention.

FIG. 12 is a flowchart showing the whole processing operation in the disk array control apparatus 10 in FIG. 9. In FIG. 12, in step S1, the access processing section 34 first checks the presence or absence of the reception of a command from the host computer 18. When the command is received, step S2 follows and a command analyzing process is executed. In step S3, a check is made to see if the decoded command content indicates the reading operation or writing operation. In case of the reading operation, the processing routine advances to a reading process in step S4. In case of the writing operation, the processing routine advances to a writing process in step S5. There are the following input/output requests for the disk array 46 by the host computer 18.

(1) Writing of new data
(2) Updating to rewrite the existing data
(3) Deletion of the existing data The reading process in step S4 and the writing process in step S5 are executed in accordance with the content of each input/output request.

Figure 1:
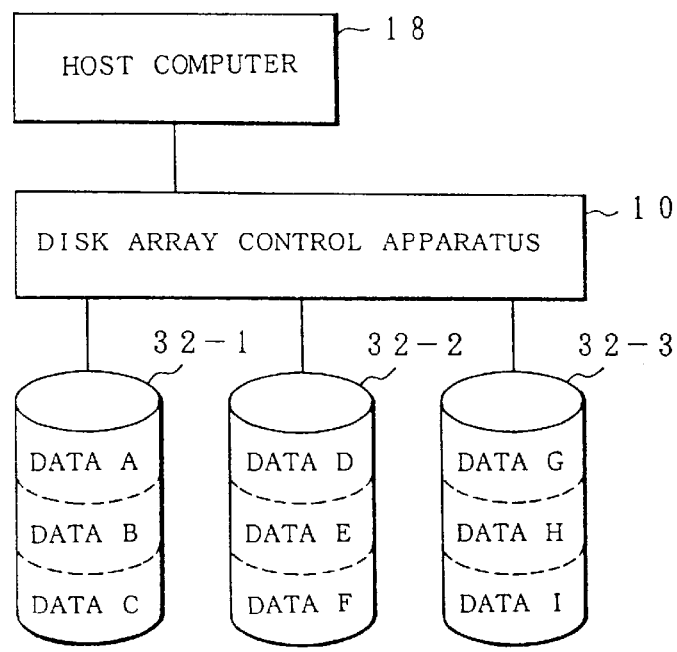
FIG. 1 is an explanatory diagram of a Prior Art disk array apparatus by RAID0.
Figure 2:
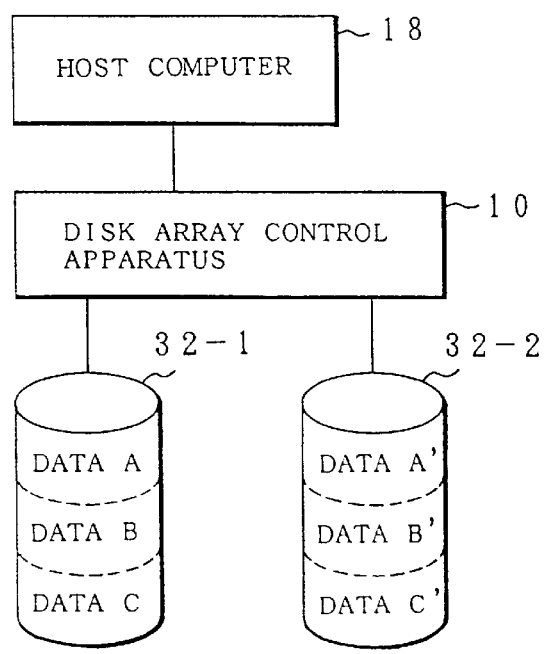
FIG. 2 is an explanatory diagram of a Prior Art disk array apparatus by RAID1.
Figure 3:
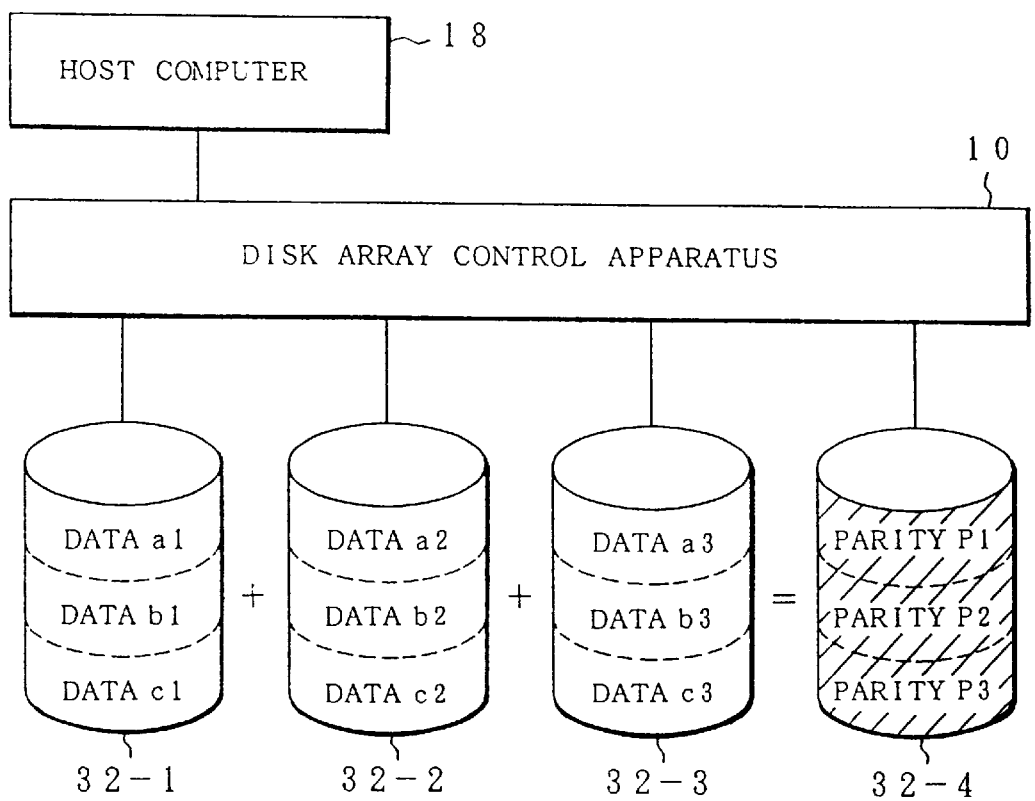
FIG. 3 is an explanatory diagram of a Prior Art disk array apparatus by RAID3.
Figure 4:
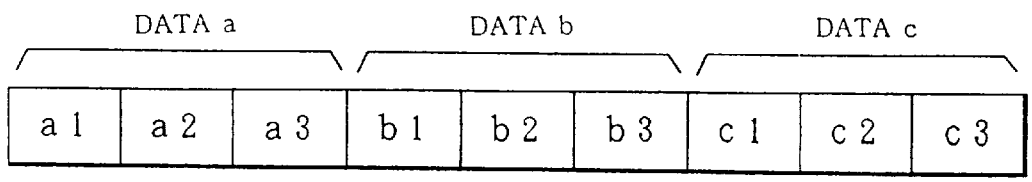
FIG. 4 is an explanatory diagram of a Prior Art the data division by RAID3.
Figure 13:
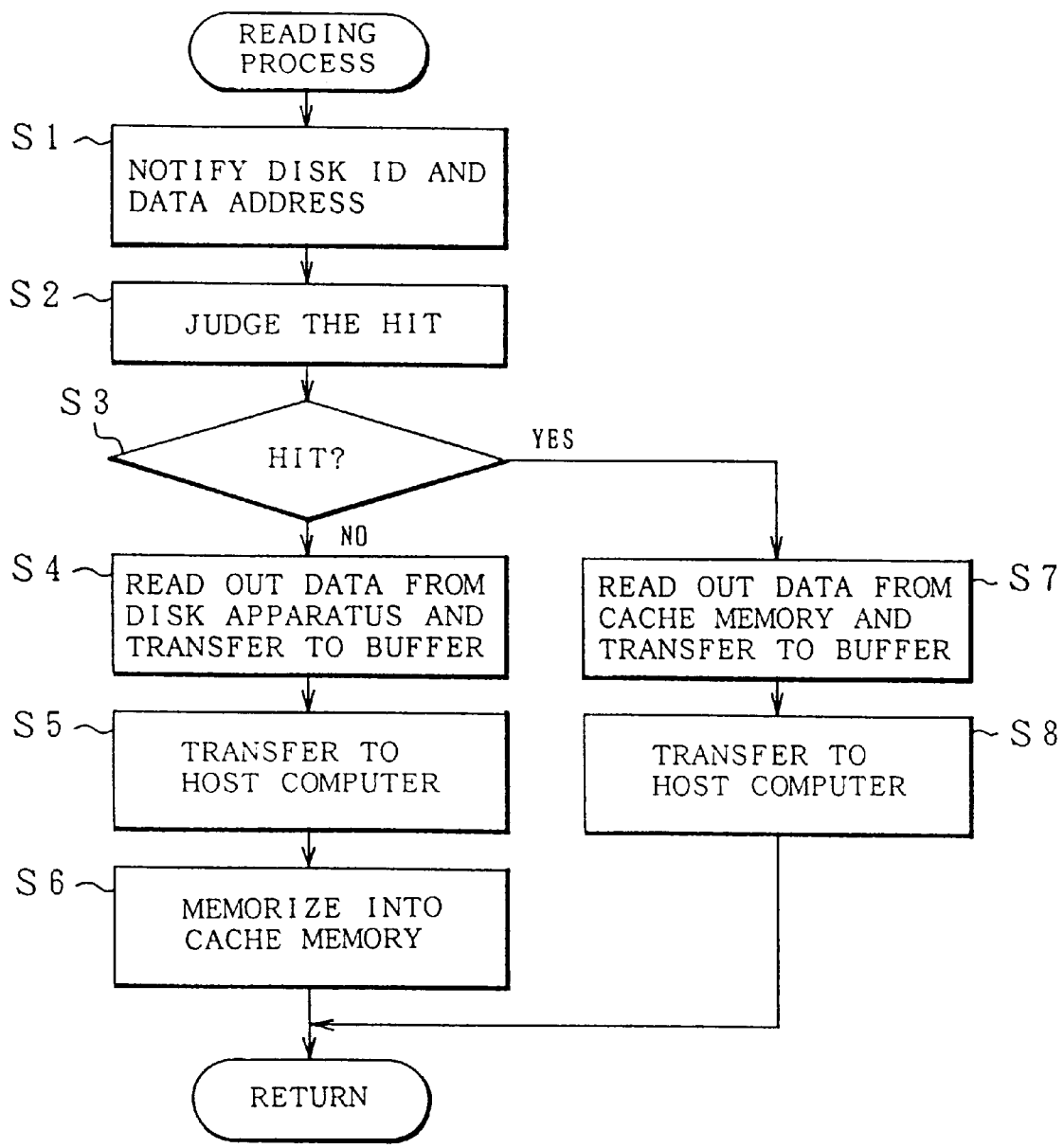
FIG. 13 is a flowchart showing the details of a reading process of the first embodiment.

FIG. 13 is a flowchart showing the details of the reading process shown in step S4 in FIG. 12. In FIG. 13, in step S1, the access processing section 34 notifies the disk ID obtained as an analysis result of the host command and the sector No. which is decided by the data addresses to the hit judging section 36 of the cache control section 24. The hit judging section 36 searches the cache management table on the basis of the disk ID and the sector No. in step S2, thereby judging the presence or absence of the registration of the reading target data for the cache memory 26. As a processing result of the hit judgment in step S2, when there is no corresponding data registration in step S3 and there is a mistake, step S4 follows. The data is read out from the sector of the disk apparatus designated by the disk ID and data address and transferred to the data transfer buffer 28 shown in FIG. 2. Subsequently, in step S5, the data is transferred to the host computer 18 and the read data is further stored into the cache memory 26. In step S6, in case of storing data into the cache memory 26, when an area to store new data lacks in the cache memory 26, the data which is considered to be unnecessary is put out from the cache memory 26 and a new area is assured and the new data is stored therein. As a management of the cache memory 26, it is sufficient to use an LRU method whereby the data used latest is attached to the last of a list which is determined by a cache management table and the oldest data which is not used is put out. On the other hand, in step S3, when the data registration corresponding to the cache management table exists and the hit judgment is obtained, the processing routine advances from step S3 to S7 and the corresponding data is read out from the cache memory 26 and transferred to the data transfer buffer 28. In step S8, the data is transferred to the host computer. In the reading process in FIG. 13, since the data is merely read out from the disk array, there is no need to update the parity data.

Figure 14:
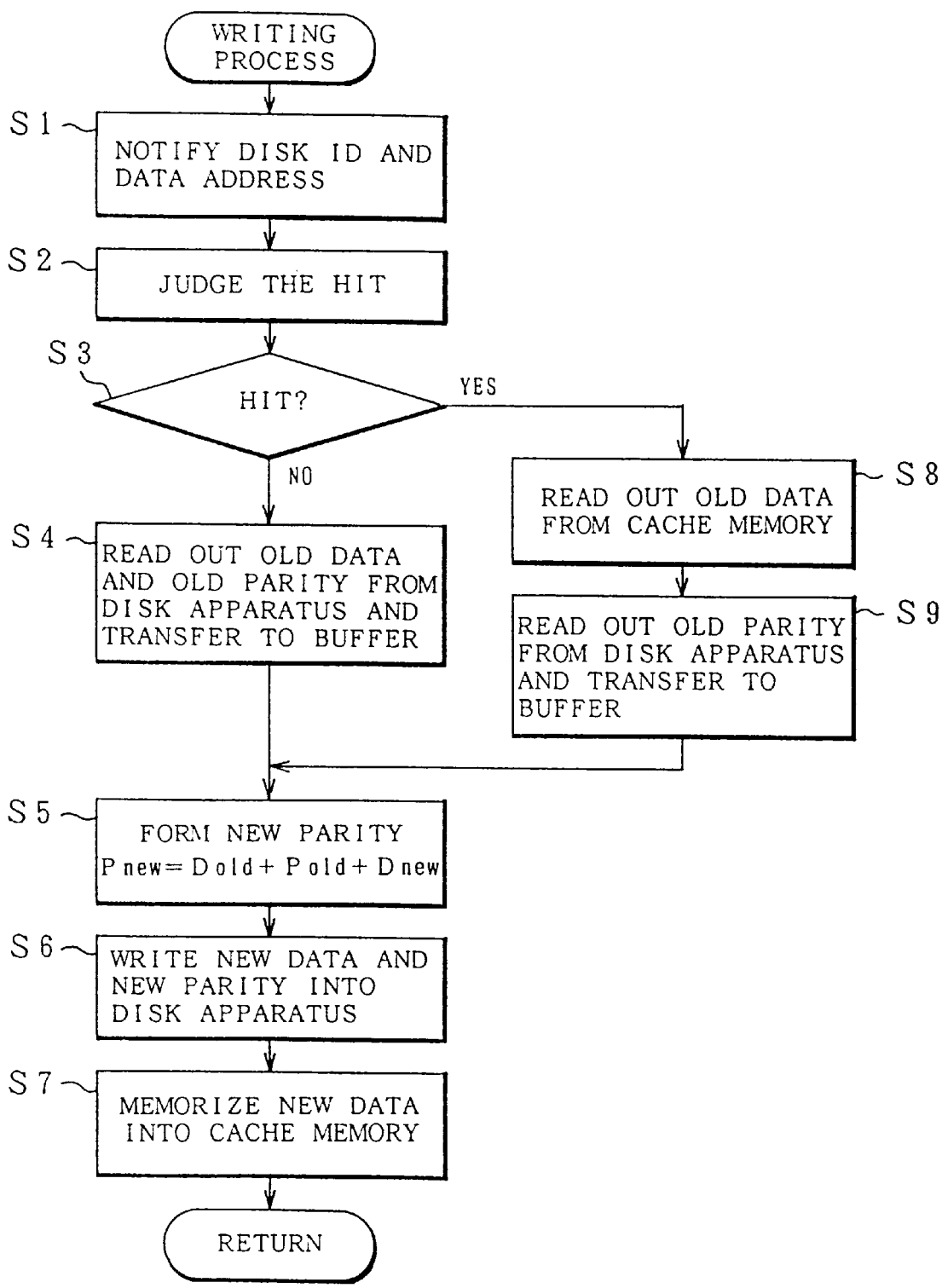
FIG. 14 is a flowchart showing the details of a writing process of the first embodiment.

FIG. 14 is a flowchart showing the details of the writing process shown in step S5 in FIG. 12. In FIG. 14, first, the access processing section 34 notifies the disk ID obtained as an analysis result of the host command in step S1 and the sector No. corresponding to the data address to the hit judging section 36 of the cache control section 24. The hit judging process is executed in step S2. As a result of the hit judgment, when there is a mistake in step S3, since there is no old data before updating in the cache memory 26, step S4 follows. The old data before updating is read out from the corresponding disk apparatus for data recording on the basis of the disk ID and the data address. The old parity data before updating is read out from the sector of the same position as that of the old data of the disk apparatus for parity recording and is transferred to the data transfer buffer 28. In step S5, the access processing section 34 forms a new parity $P_{new}$ from the old data $D_{old}$ and old parity $P_{old}$ which were read out from the disk apparatus and new data $D_{new}$. Namely, the new parity is formed from the exclusive OR of the old data, old parity, and new data in accordance with the foregoing equation (1). In step S6, the new data and new parity are respectively written into the corresponding disk apparatuses and are updated. In step S7, the new data is stored into the cache memory 26, thereby preparing for the next access. On the other hand, the result of the hit judgment in step S3 indicates the hit, step S8 follows and the old data before updating is read out from the cache memory 26. Subsequently, in step S9, the old parity before updating is read out from the sector at the same position as that of the sector in which the old data of the disk apparatus for parity recording has been stored and is transferred to the data transfer buffer 28. In the subsequent processes, in a manner similar to the case of miss-hit, the new parity is formed in step S5, the new data and new parity are respectively written into the disk apparatus in step S6, the new data after completion of the updating is stored into the cache memory in step S7, and the apparatus waits for the next access.

Figure 15:
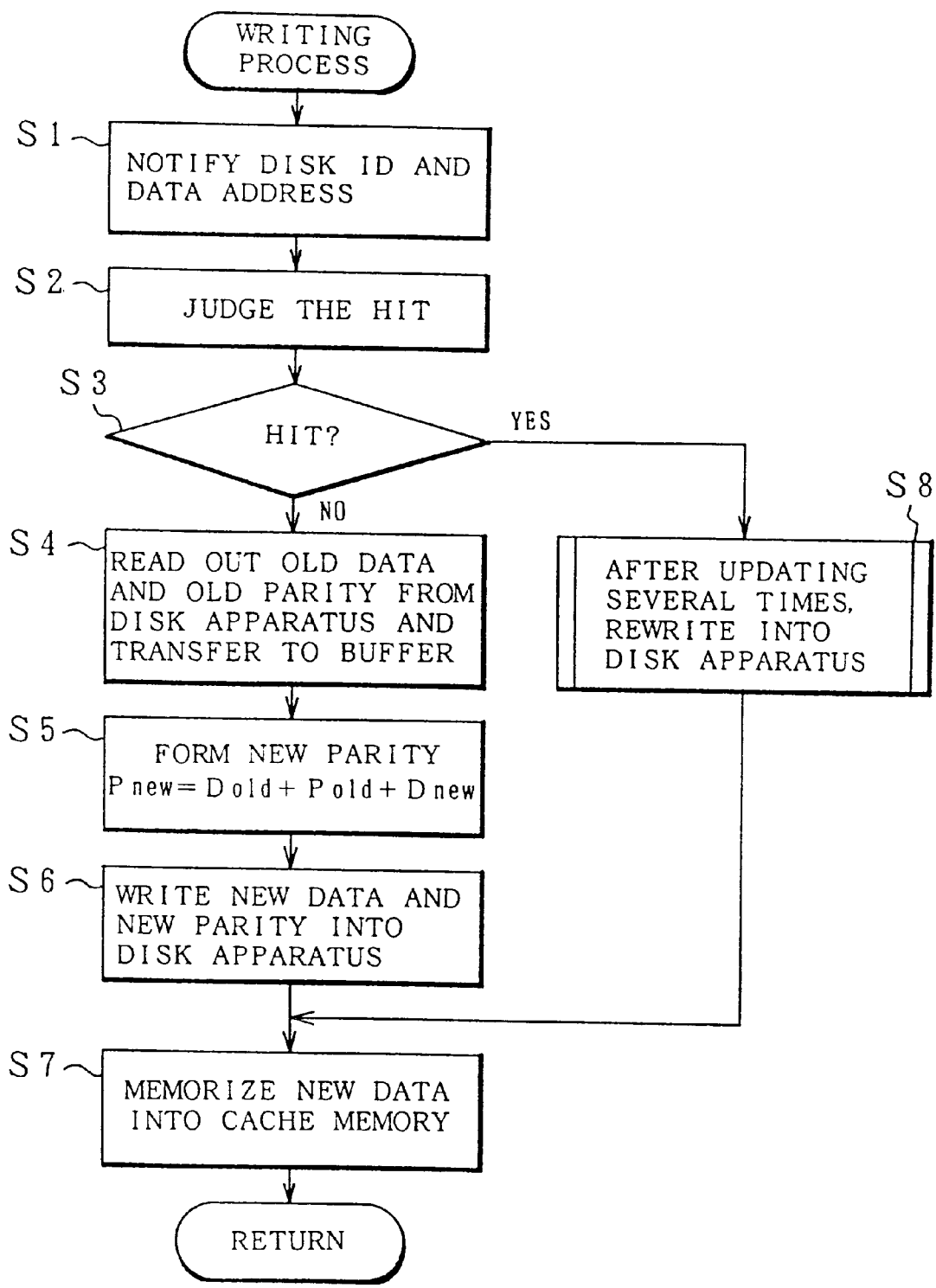
FIG. 15 is a flowchart showing the details of another writing process of the first embodiment.

3. Rewriting Process to the Disk Apparatus After Completion of the Updating Processes of a Plurality of Number of Times FIG. 15 is a flowchart showing another embodiment of the writing process in step S6 shown in FIG. 12. The writing process is characterized in that there is provided a process in step S8 such that when the hit judgment is obtained in the cache control section 24, the data in the same area is updated a plurality of number of times on the cache memory 26 and, after that, the data is rewritten into the disk apparatus. Namely, in the writing process in FIG. 13, each time the data is updated, the new data and new parity are rewritten into the disk apparatus, so that it takes a time for the data updating process. On the other hand, in the embodiment of FIG. 15, since the rewriting process is executed only once for the disk apparatus for a plurality of number of updating times, the time which is required for the updating process can be reduces The principle to form the parity data which is rewritten into the disk apparatus after completion of a plurality of number of updating times will now be explained hereinbelow.

Figure 16:
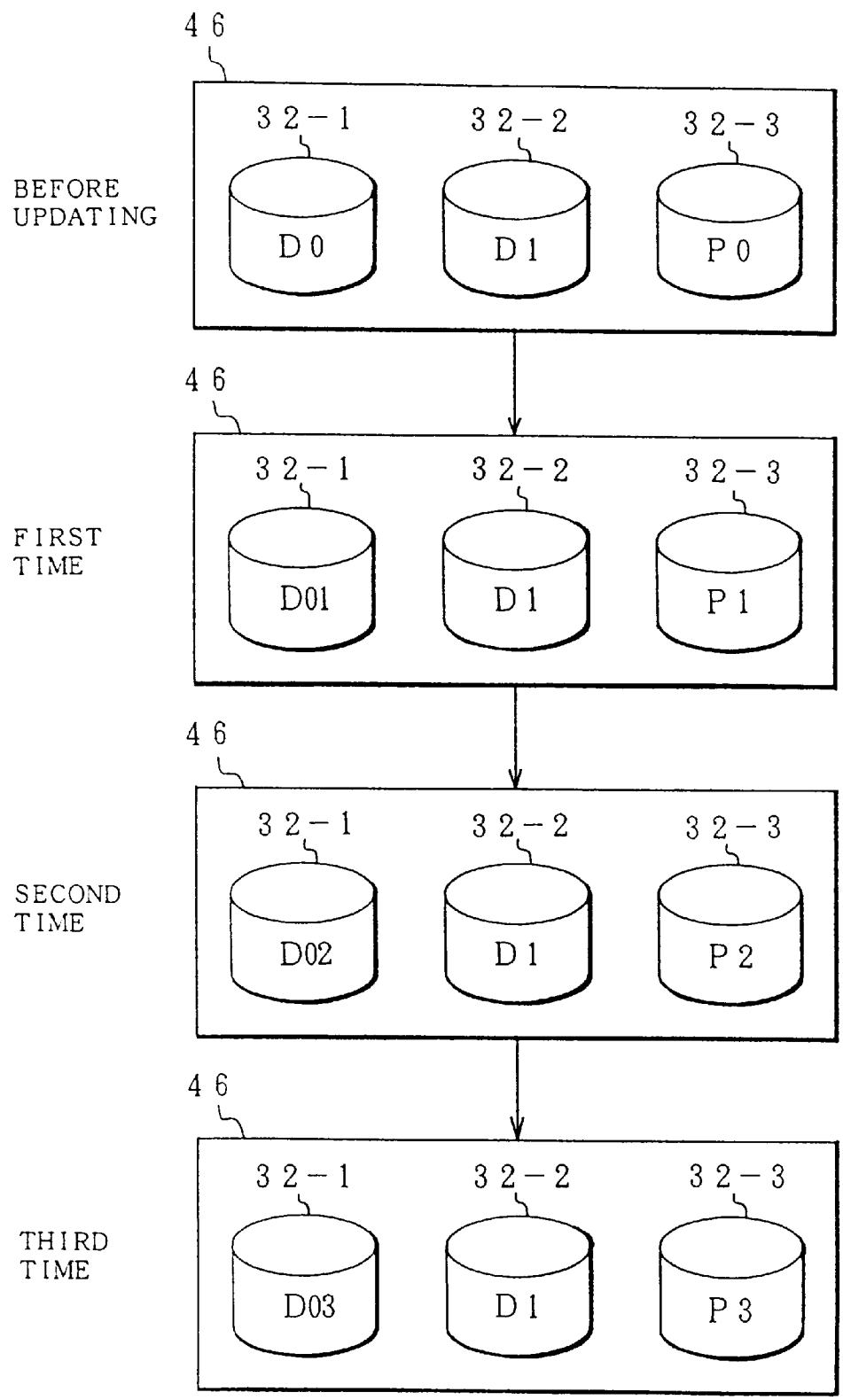
FIG. 16 is an explanatory diagram showing a change in storing state in a disk array when it is updated by a plurality of number of times.

FIG. 16 shows the disk array 46 having three disk apparatuses 32-1 to 32-3 for simplicity of explanation. The data D0 is stored into the disk apparatus 32-1 in the state before updating, the data D1 is stored into the disk apparatus 32-2, and further the parity P0 is stored in the disk apparatus 32-3 for parities. In this state, it is now assumed that the updating process was performed three times to the data D0 of the disk apparatus 32-1 in a manner such as new data D01, D02, and D03. The new parities P1 to P3 in the data updating for the disk apparatus 32-1 of the first to third times can be obtained in accordance with the following equations.

1st time: new data D01(+)old data D1=new parity P1   (2)

2nd time: new data D02(+)old data D1=new parity P2   (3)

3rd time: new data D03(+)old data D1=new parity P3   (4)

Now assuming that the number of updating times which are executed until the data is rewritten into the disk apparatus in step S8 in FIG. 15 is set to 3, the new parity P3 obtained by the updating at the third time is stored into the disk apparatus 32-3 and the newest updating data D03 is stored into the disk apparatus 32-1. With respect to the old data D1 of the equation (4) indicative of the result of the updating at the third time, there is the following relation from the storing st ate before updating.

$$\text{Old data D0}(+)\text{old data D1}=\text{old parity P0} \quad (5)$$

The old data D1 is obtained as follows with respect to the equation (5).

$$\text{Old data D1}=\text{old data D0}(+)\text{old parity P0} \quad (6)$$

Therefore, by substituting the equation (6) for the equation (4), the new parity P3 which is formed by the updating at the third time can be expressed as follows.

$$\text{New parity P3}=\text{old data D0}(+)\text{old parity P0}(+)\text{newest data D03} \quad (7)$$

In the process in step S8 in FIG. 15, the updating processes at the first to third times shown in FIG. 16 are executed on the cache memory 26. After the updating at the third time was finished, the new parity P3 is formed from the equation (7). A process to rewrite the newest data D03 and the new parity P3 into the disk apparatus is executed. To form the new parity P3 in the equation (7), it is sufficient to obtain the old data D0 before updating and the old parity P0 before updating and the other data is unnecessary. According to the invention, therefore, areas to sequentially update the data D01, D02, and D03 on the cache memory 26 are newly assured and the data is updated. At an end time point of the data updating process at the third time, the old data D0 before updating which has already been stored in the cache memory is read out together with the newest data D03. The old parity P0 before updating is read out from the disk apparatus 32-3 and the new parity P3 is formed in accordance with the equation (7). The new data D03 and the new parity P3 are rewritten into the disk apparatuses, respectively.

Figure 17:
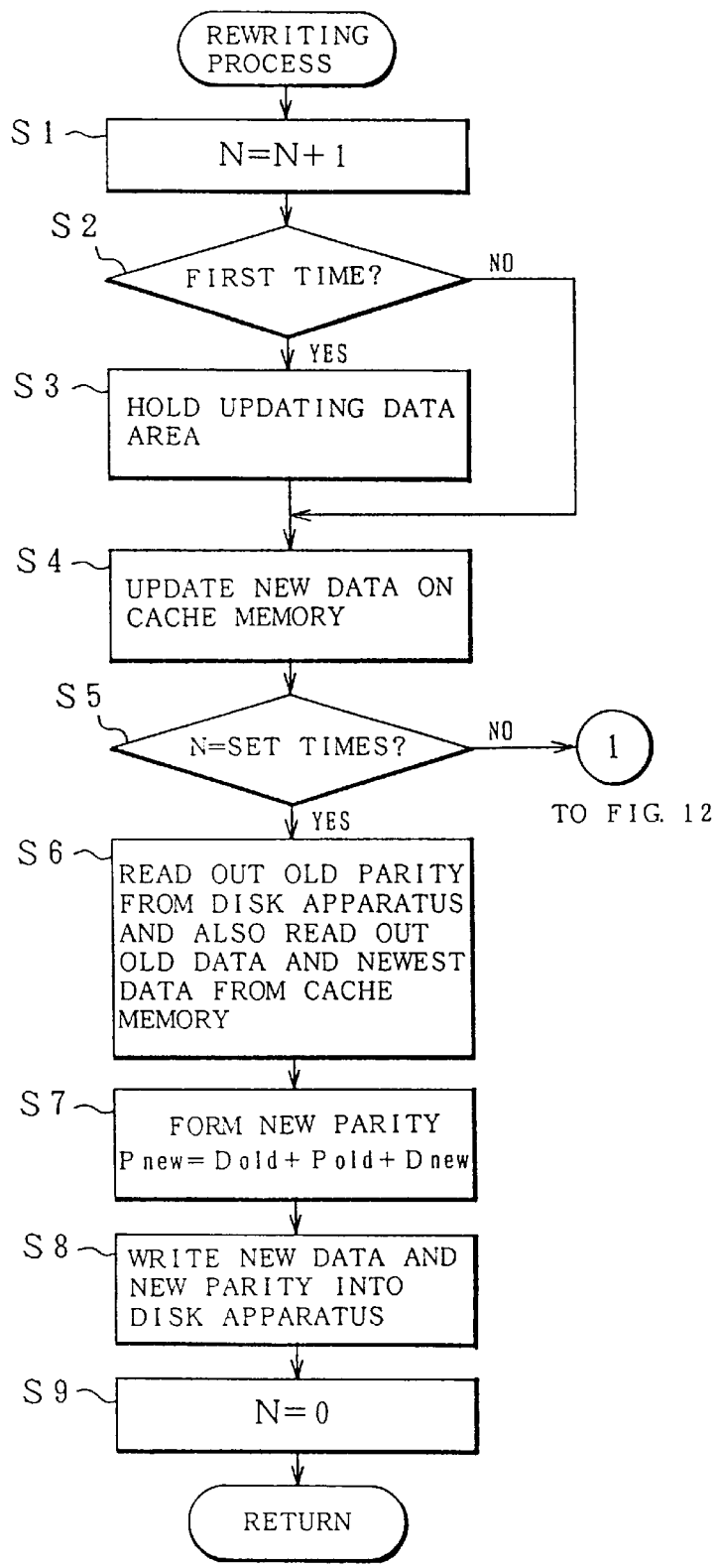
FIG. 17 is a flowchart showing the details of a rewriting process in FIG. 15.

FIG. 17 is a flowchart showing the details of the rewriting process in step S8 in FIG. 15. In FIG. 17, first, in step S1, the count value of the counter N to set the number of updating times is increased by 1. The counter N has been cleared to N=0 in the initial state. In step S2, a check is made to see if the number of the updating time is the first time or not. If NO, the area of the updating data is newly allocated in the cache memory 26 in step S3. The new data is updated for the first time in the area newly allocated in the cache memory 26 in step S4. In step S5, a check is made to see if the counter N indicative of the number of updating times has reached a set number of times, for example, three times or not. If it is less than 3, the processes in steps S6 to S9 are skipped and the processing routine is returned to (1) in the main routine in FIG. 12. When the counter N indicative of the number of updating times has reached the set number of times in step S5, step S6 follows and the old parity before updating of the same segment as that of the updating data is read out from the disk apparatus for parities, and the old data before updating and the newest updated data are read out from the cache memory 26. In step S7, the new parity is formed in accordance with the equation (7). Subsequently, in step S8, the new data and the new parity are respectively written into the corresponding disk apparatuses. After that, the counter N is reset in step S9. The processing routine is returned to step S7 in FIG. 15. The newest updating data after it was rewritten is stored into the cache memory 26 and the apparatus waits for the next access.

Figures 18, 19:
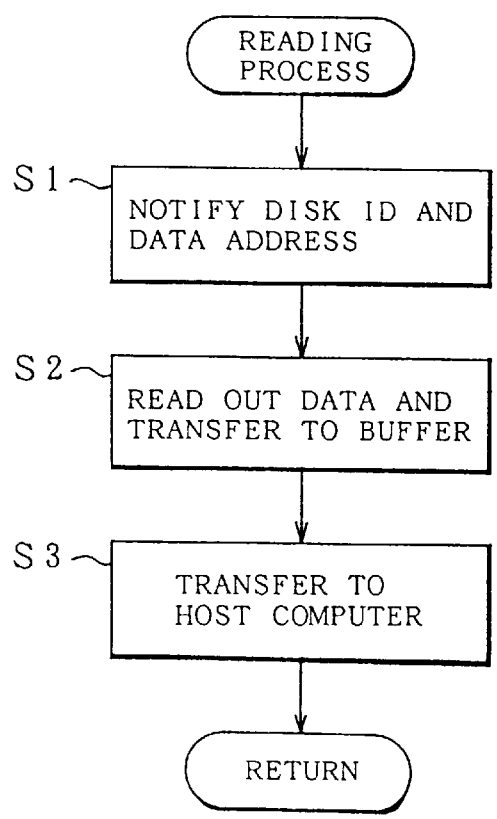
FIG. 18 is an explanatory diagram showing the content in a cache memory of the second embodiment.
FIG. 19 is a flowchart showing the details of a reading process of the second embodiment.

4. Second Embodiment in Which Only Redundant Information is Stored into Cache Memory FIG. 18 is an explanatory diagram showing the memory content in the case where only the parity data as redundant information has been stored in the cache memory 26 of the disk array control apparatus 10 of the invention shown in FIG. 9. In the cache memory 26 which is used in the second embodiment, only the parity data P01, P02, P03, - - - are stored in the areas which are designated by the OR of the disk ID numbers 1 to 5 and the sector numbers. The whole processing operation in the disk array control apparatus 10 in case of storing only the parity data into the cache memory 26 is substantially the same as that of the flowchart of FIG. 12. A reading process is executed as shown in FIG. 19. A writing process is executed as shown in FIG. 20.

FIG. 19 is a flowchart showing the details of t he reading process in the case where only the parity data has been stored in the cache memory 26. In step S1, the access processing section 34 notifies the disk ID obtained from the result of the analysis of the host command and the segment No. indicative of the data address to the disk apparatus via the corresponding device adapter. In step S2, the data is read out from the designated disk apparatus and transferred to the data transfer buffer 28.

In step S3, the data is transferred to the host computer and the series of processes are finished. That is, in the case where only the parity data has been stored in the cache memory 26, the cache memory is not accessed in the reading process.

Figure 20:
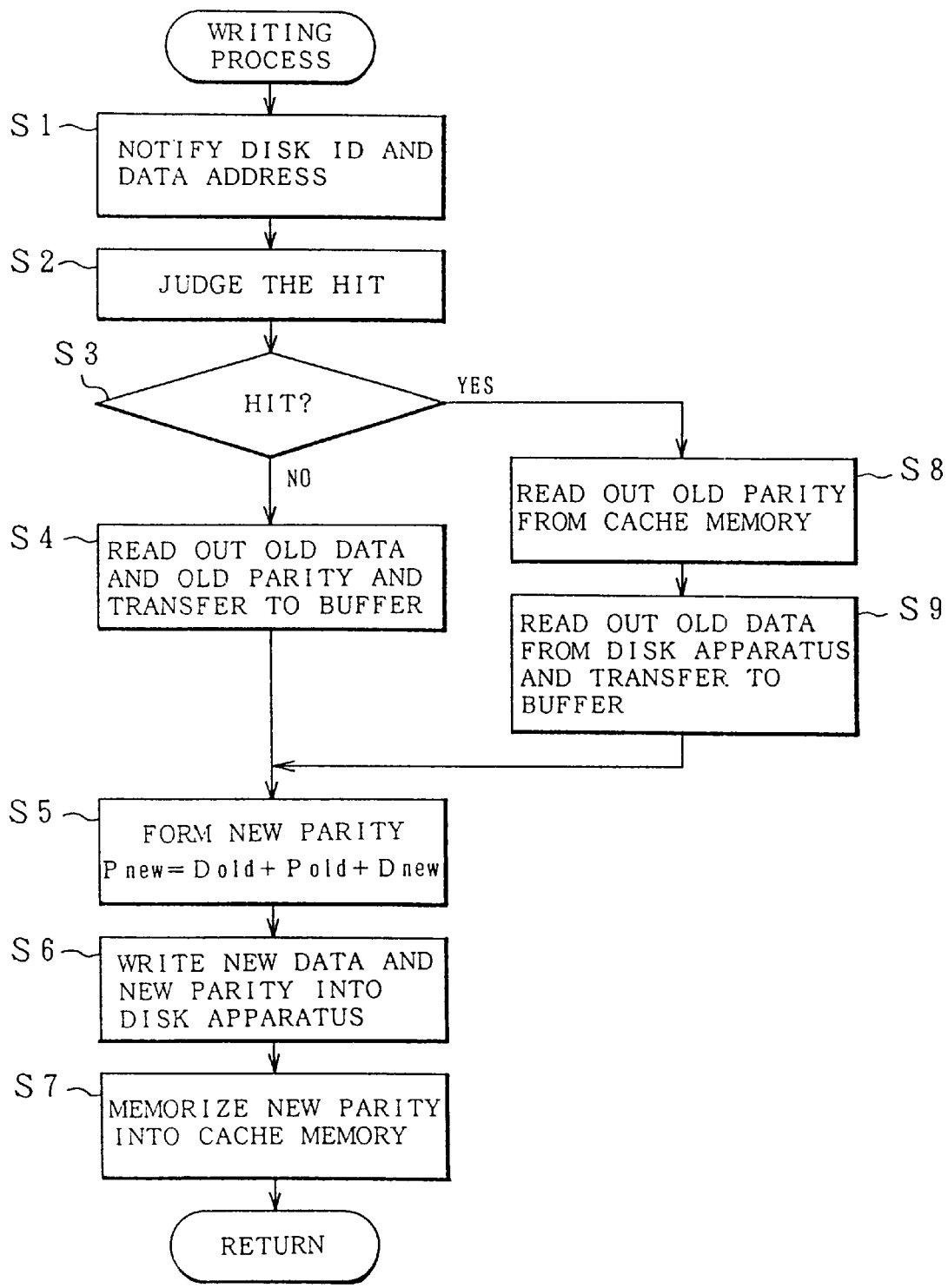
FIG. 20 is a flowchart showing the details of a writing process of the second embodiment.

FIG. 20 is a flowchart showing the details of the writing process in the case where only the parity data has been registered in the cache memory 26. In the writing process of FIG. 20, in response to the notification of the disk ID and the sector No. corresponding to the data address in step S1, the hit judging section 36 of the cache control section 24 judges the hit in step S2. Namely, with respect to a cache management table indicative of the contents registered in the cache memory 26 as shown in FIG. 18, since there is no distinction due to the disk ID, the presence or absence of the cache registration is discriminated by only the sector number. In case of a hit mistake in step S3, in a manner similar to the first embodiment, the old data and old parity before updating are read out from the disk apparatus and transferred to the data transfer buffer 28 in step S4. In step S5, the new parity is formed in accordance with the equation (1). In step S6, the new data and the new parity are respectively written into the corresponding disk apparatuses. Further, the new parity is newly stored into the cache memory 26 in step S7. On the other hand, in the case where the result of the hit judgment in step S2 indicates the hit, processing routine advances from step S3 to S8 and the corresponding old parity is read out from the cache memory 26. In step S9, the old data is read out from the corresponding disk apparatus and transferred to the data transfer buffer 28. In a manner similar to the above, the formation of the new parity in step S5, the writing of the new data and new parity into the disk apparatuses in step S6, and the storage of the new parity into the cache memory 26 in step S7 are executed.

Figure 21:
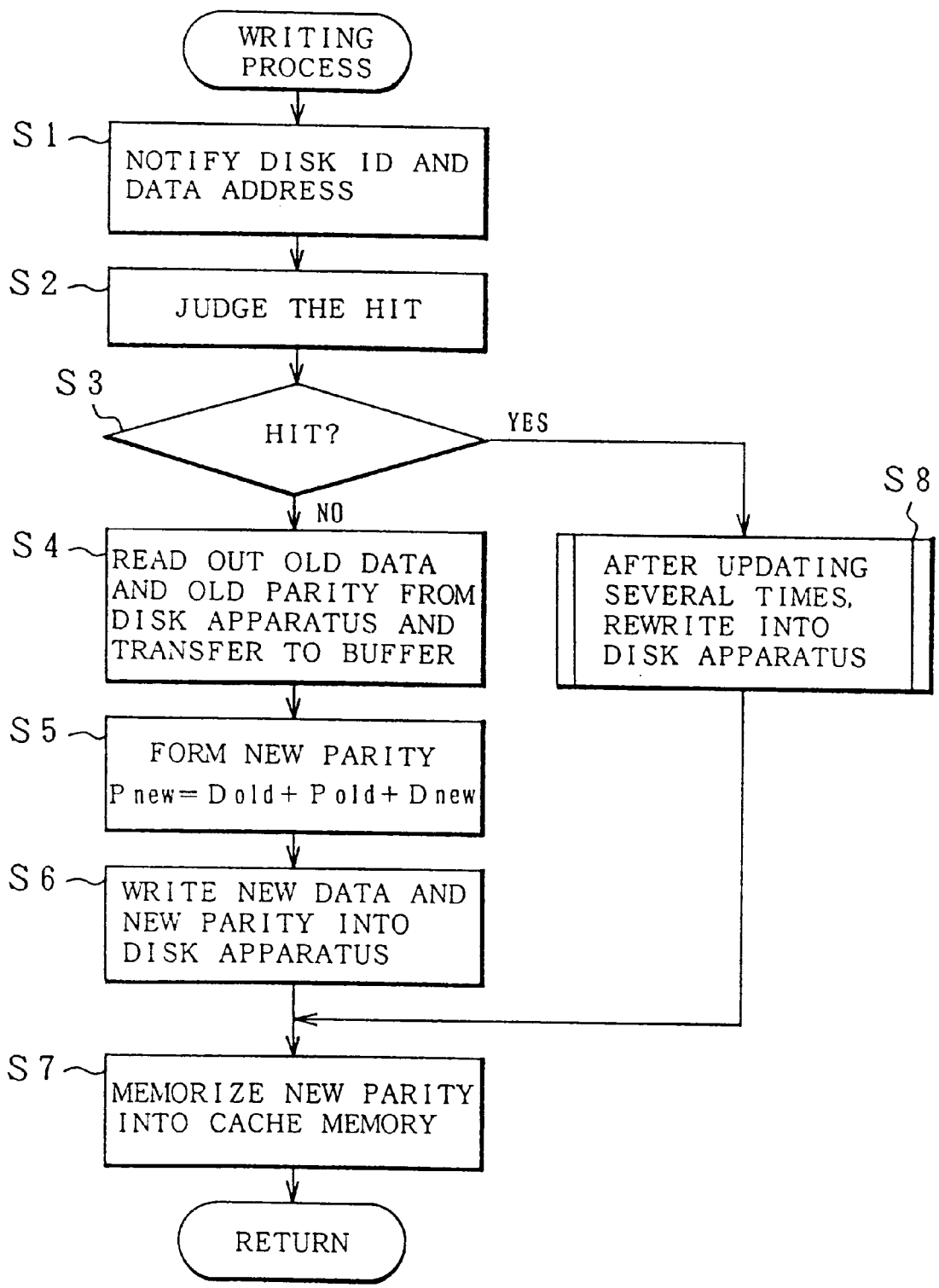
FIG. 21 is a flowchart showing the details of another writing process of the second embodiment.
Figure 22:
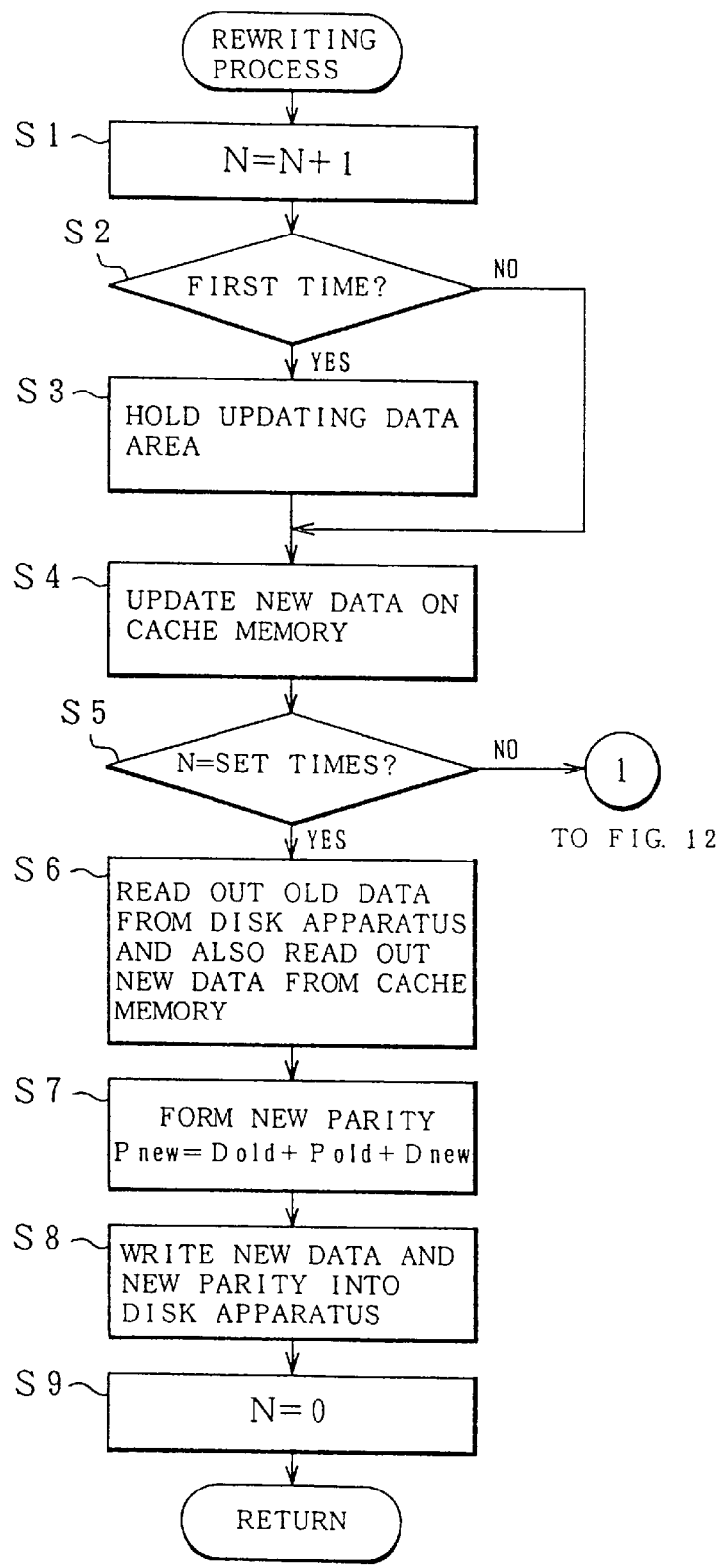
FIG. 22 is a flowchart showing the details of a rewriting process in FIG. 21.

FIG. 21 is a flowchart showing another embodiment of the writing process in case of storing only the parity data into the cache memory 26 and is characterized in that data is written into the disk apparatus after completion of the data updating processes of a plurality of number of times in step S8 for FIG. 15. The details of the disk rewriting process in step S8 are as shown in FIG. 22. Although the rewriting process in FIG. 22 is fundamentally the same as that in case of the first embodiment shown in FIG. 17, since only the parity data has been stored in the cache memory 26, it differs from the first embodiment with respect to points that the old data is read out from the disk apparatus in step S6 after the number of updating times reached the set number of times and that the old parity and the newest data are read out from the cache memory. The other processes are substantially the same as those in the first embodiment.

Figure 23:
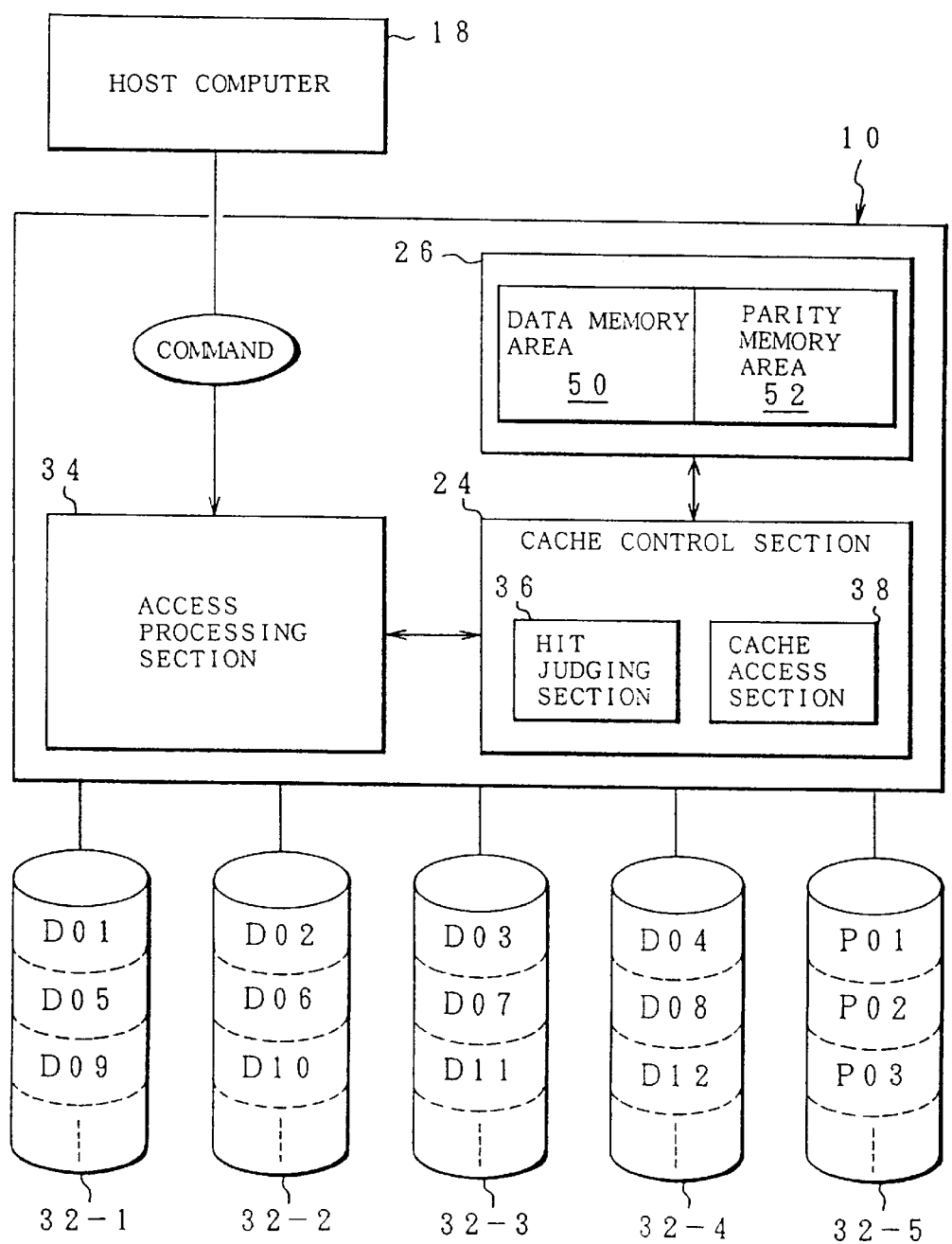
FIG. 23 is a functional block diagram showing the third embodiment of the invention.

5. Third Embodiment in which Both of the Data and the Redundant Information are Stored into the Cache Memory FIG. 23 shows a functional block diagram of the third embodiment of the invention. The third embodiment is characterized in that both of the data and the parity data as redundant information are stored into the cache memory 26. First, the cache memory 26 is divided into a data memory area 50 and a parity memory area 52.

Figure 24:
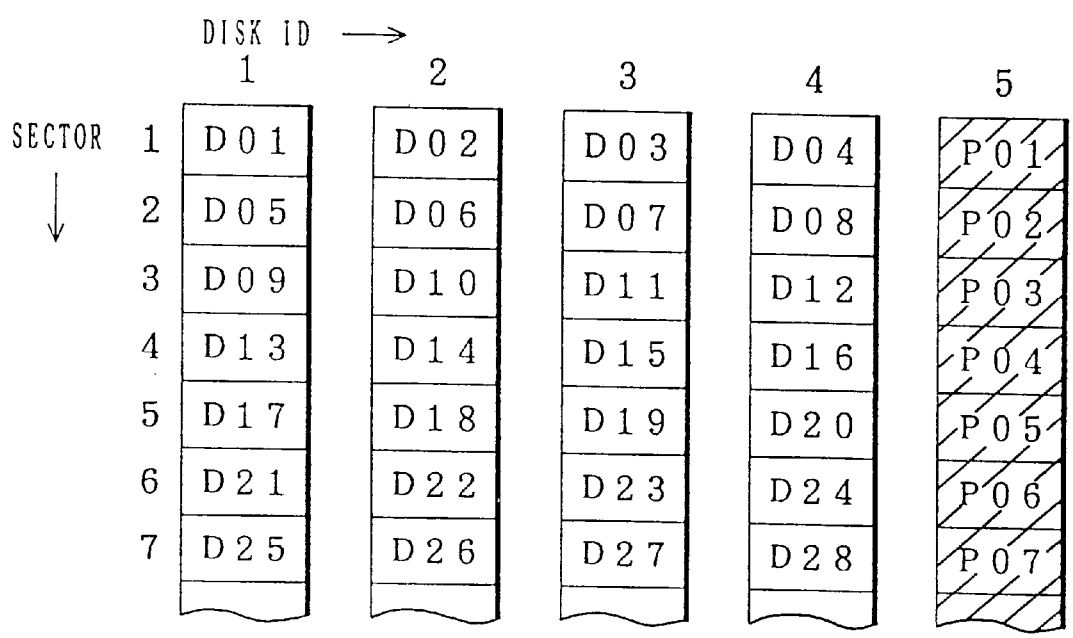
FIG. 24 is an explanatory diagram showing the content in a cache memory of the third embodiment.

FIG. 24 shows the memory contents in the cache memory 26. With respect to the disk ID Nos. 1 to 4, data is stored in the data memory area 50. With regard to the disk ID No. 5, data is stored in the parity memory area 52. FIG. 24 shows the case where the disk apparatus for parities is fixed to the disk apparatus 32-5. The reason why the cache memory 26 is divided into the data memory area 50 and the parity memory area 52 is because with respect to the first embodiment, it is sufficient to use only the data memory area 50, and with respect to the second embodiment, it is sufficient to use only the parity memory area 52, and in case of further newly adding the parity memory area 52 and data memory area 50 to the first and second embodiments, it is convenient to divide the area.

Figure 25:
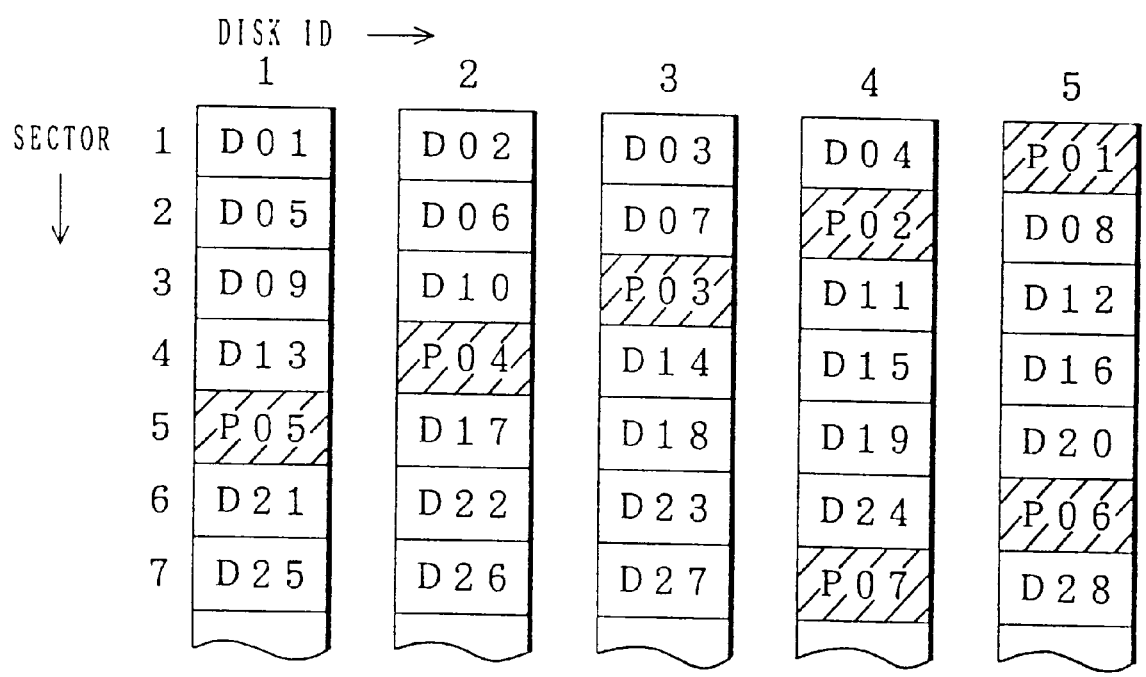
FIG. 25 is an explanatory diagram showing another content in the cache memory of the third embodiment.

FIG. 25 is an explanatory diagram showing the memory contents in the cache memory 26 with respect to a disk array in which the disk apparatus for recording parities differs each time the sector position changes. In the case where the parity data has been stored in the different disk apparatus which differs every segment, there is no need to divide the cache memory 26 shown in FIG. 23 into, particularly, the data memory area 50 and the parity memory area 52, and it is sufficient to store data and parity data which using the whole cache memory as one area.

Figure 26:
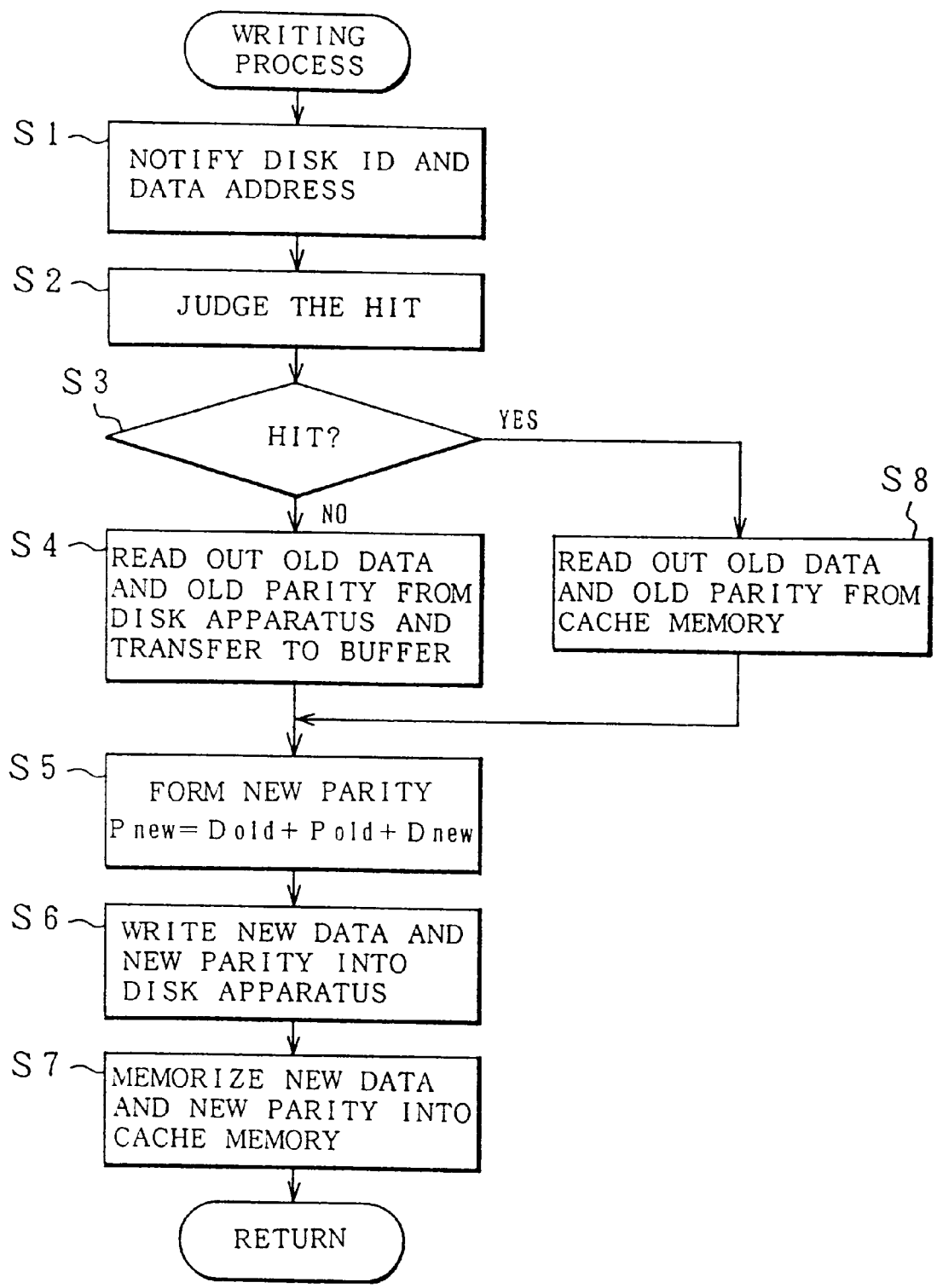
FIG. 26 is a flowchart showing the details of a writing process of the third embodiment.

The details of the whole processing operation and reading process of the disk array control apparatus 10 in the third embodiment shown in FIG. 23 are substantially the same as those in the first embodiment of FIGS. 12 and 13. The details of the writing process area as shown in a flowchart of FIG. 26. In the writing process of FIG. 26, when there is a hit mistake in step S3, both of the new data and the new parity are stored into the cache memory 26 in step S7 and this point differs from the first and second embodiments. When there is a hit mistake in step S3, both of the old data and old parity before updating can be read out from the cache memory 26 in step S8, so that there is no need to access the disk apparatus in order to read out the old data and old parity. The data updating process can be performed at a further high speed.

Figure 27:
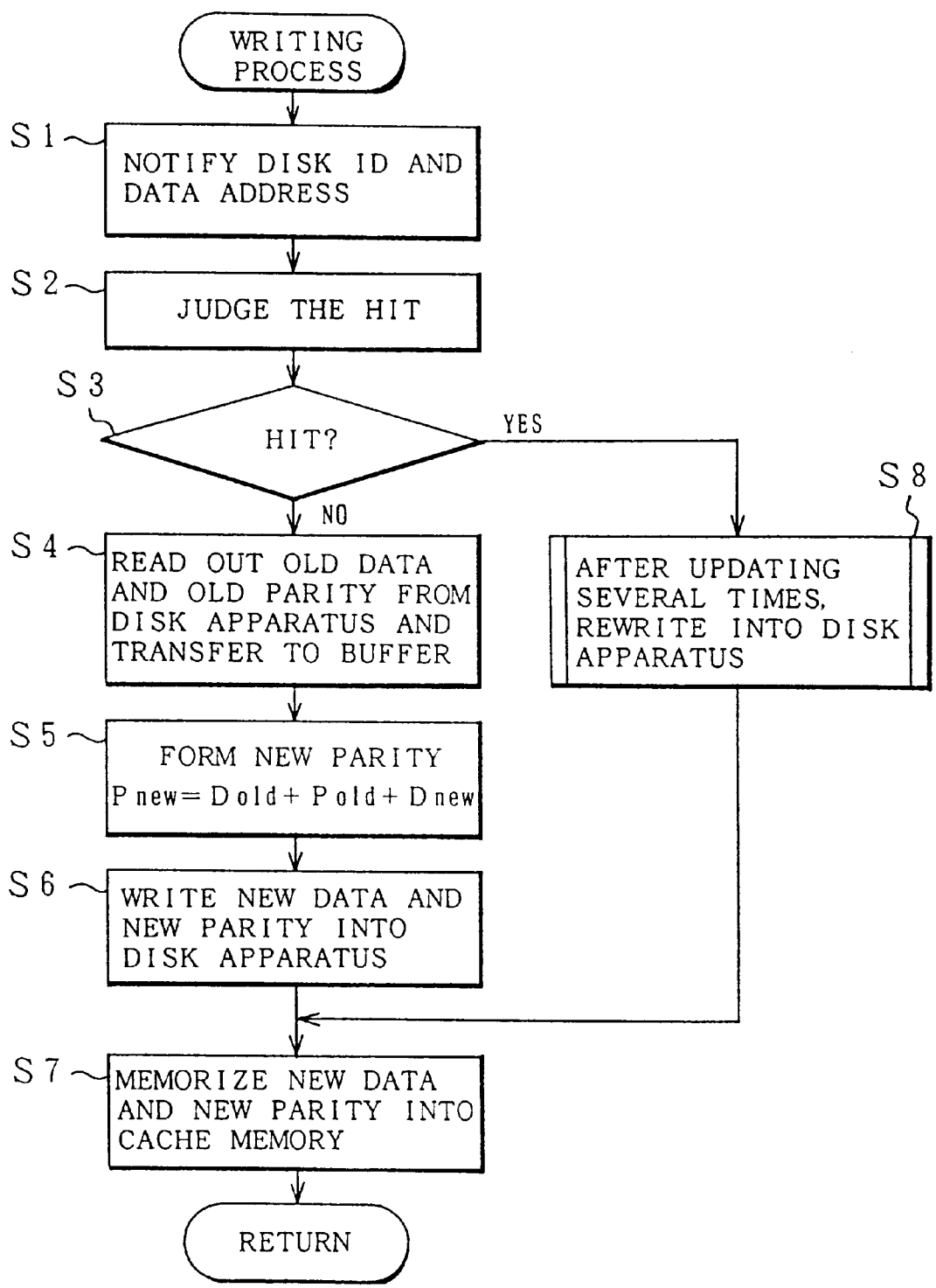
FIG. 27 is a flowchart showing the details of another writing process of the third embodiment.
Figure 28:
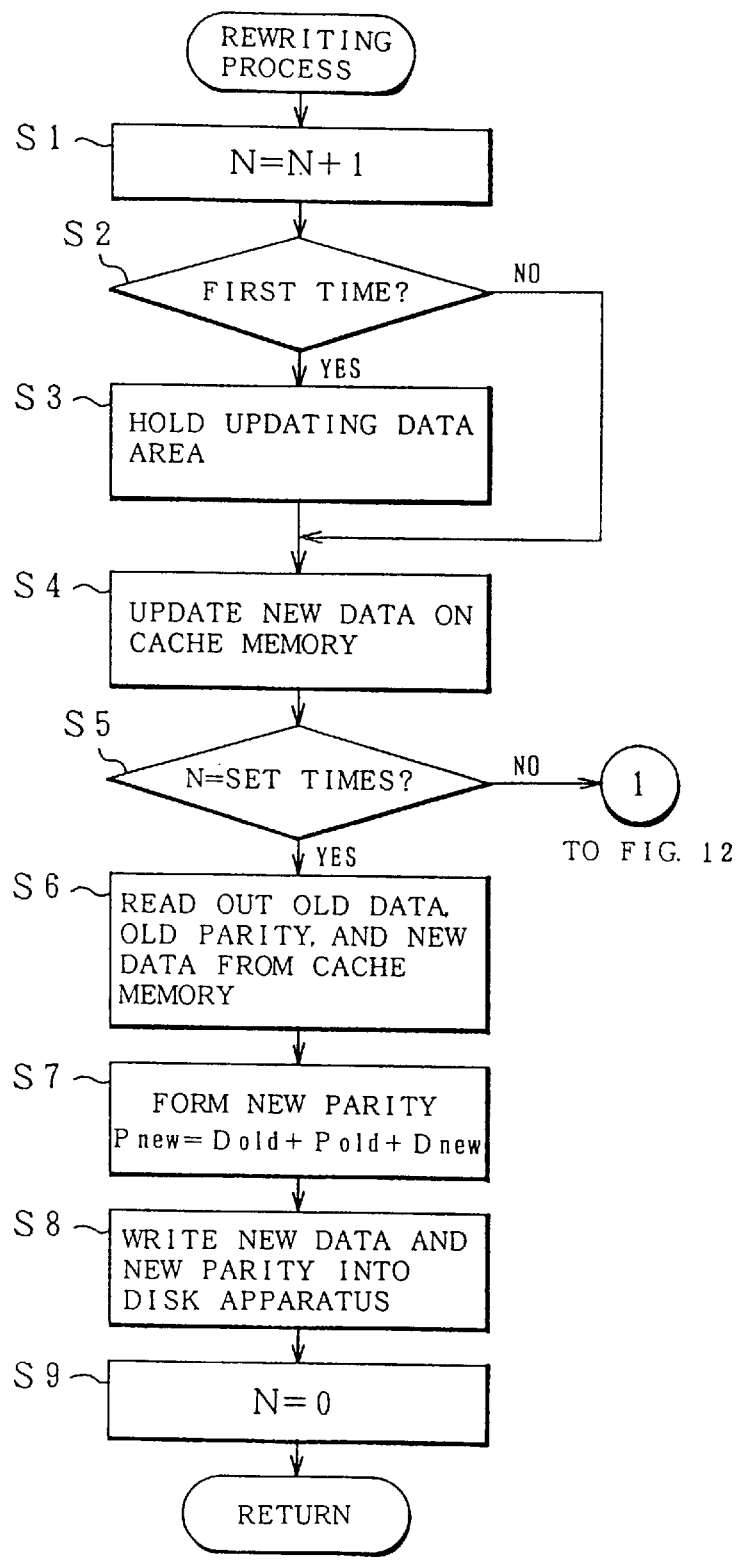
FIG. 28 is a flowchart showing the details of a rewriting process in FIG. 27.

FIG. 27 shows another embodiment of the writing process in the third embodiment and is characterized in that the data is rewritten into the disk apparatus after the data was updated a plurality of number of times in step S8. The details of the rewriting process are as shown in a flowchart of FIG. 28. In the rewriting process in FIG. 28, in step S6 in which the number of updating times has reached the set number of times, the old parity and old data before updating and, further, the newest updating data are read out from the cache memory 26 and this point differs from the first and second embodiments.

6. Fourth Embodiment in Which Dummy Data is Stored into a Space Area

Figure 29:
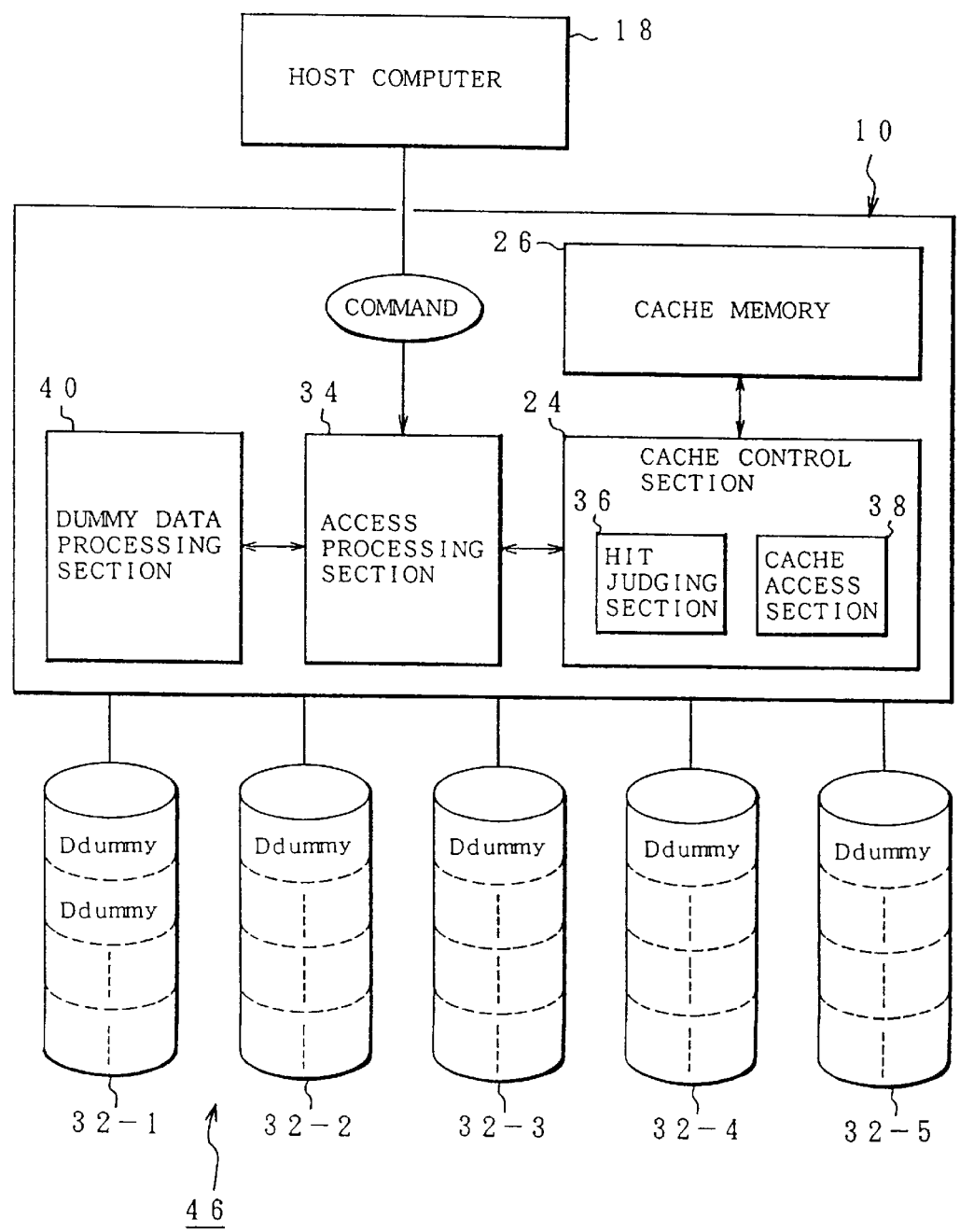
FIG. 29 is a functional block diagram showing the fourth embodiment of the invention.

FIG. 29 is a functional block diagram of the fourth embodiment of the invention. The fourth embodiment is characterized in that a dummy data processing section 40 is newly provided in the disk control apparatus 10 and dummy data $D_{dummy}$ and dummy parity data $P_{dummy}$ are stored into the disk apparatuses 32-1 to 32-5 of the disk array 46 and space areas in the cache memory 26. As mentioned above, by storing the dummy data and dummy parity data which were fixedly determined into the disk apparatuses 32-1 and 32-5 and the unused areas in the cache memory 26, the reading operation of the old data and old parity in the writing operation can be omitted with respect to the dummy data and dummy parity data.

Figure 30:
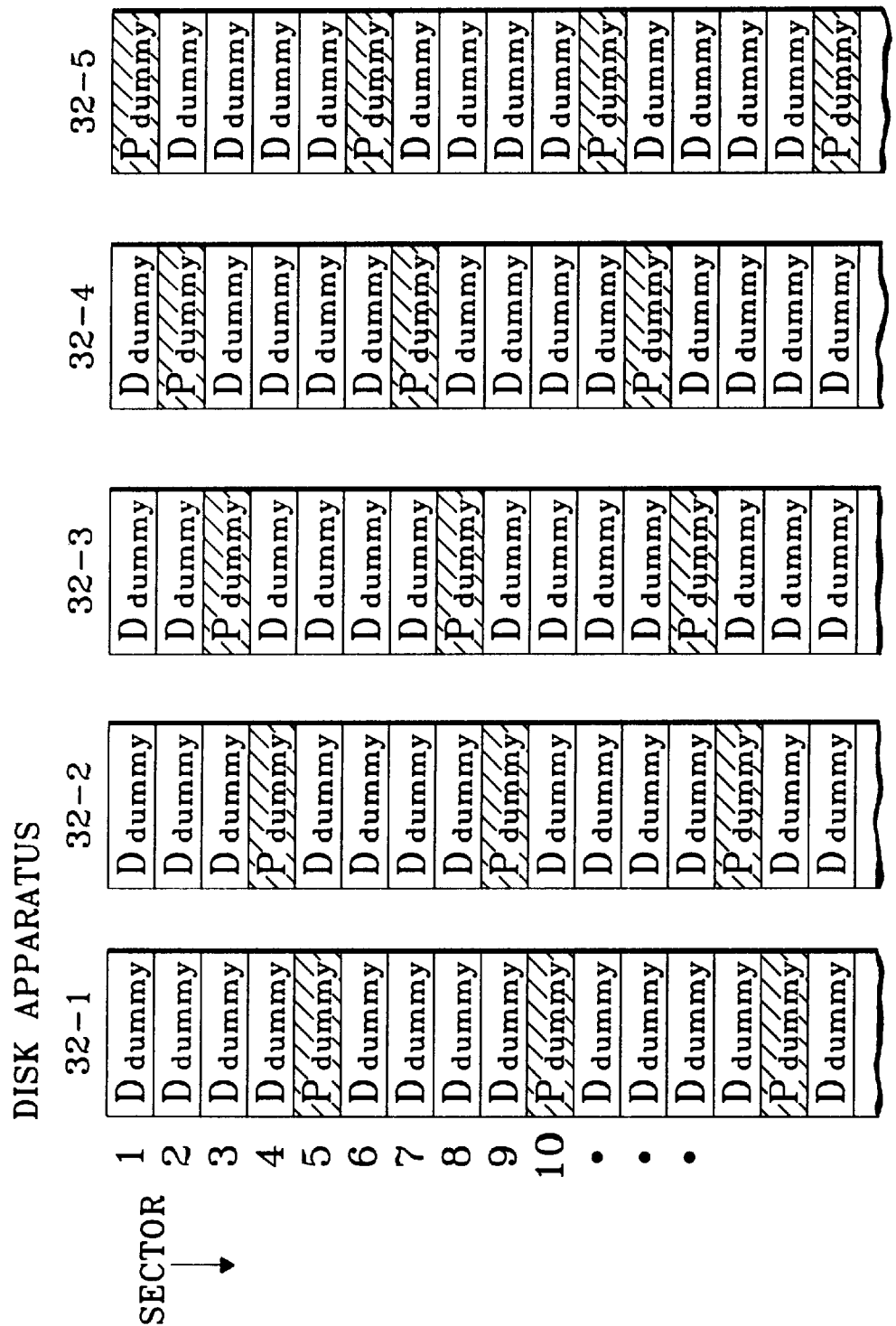
FIG. 30 is an explanatory diagram showing a dummy memory initial state in a disk array of the fourth embodiment.

FIG. 30 is an explanatory diagram showing initial states of the disk apparatuses 32-1 to 32-5 in the fourth embodiment. The dummy data and dummy parity data are previously stored into all of the sectors as space areas, for example, at the time of shipping of the disk array apparatus from the factory or the like. The disk apparatuses 32-1 to 32-5 in FIG. 29 are shown and described with respect to the example in the case corresponding to RAID-5 in which the disk apparatus to store parity data differs each time the sector position changes.

Figure 31:
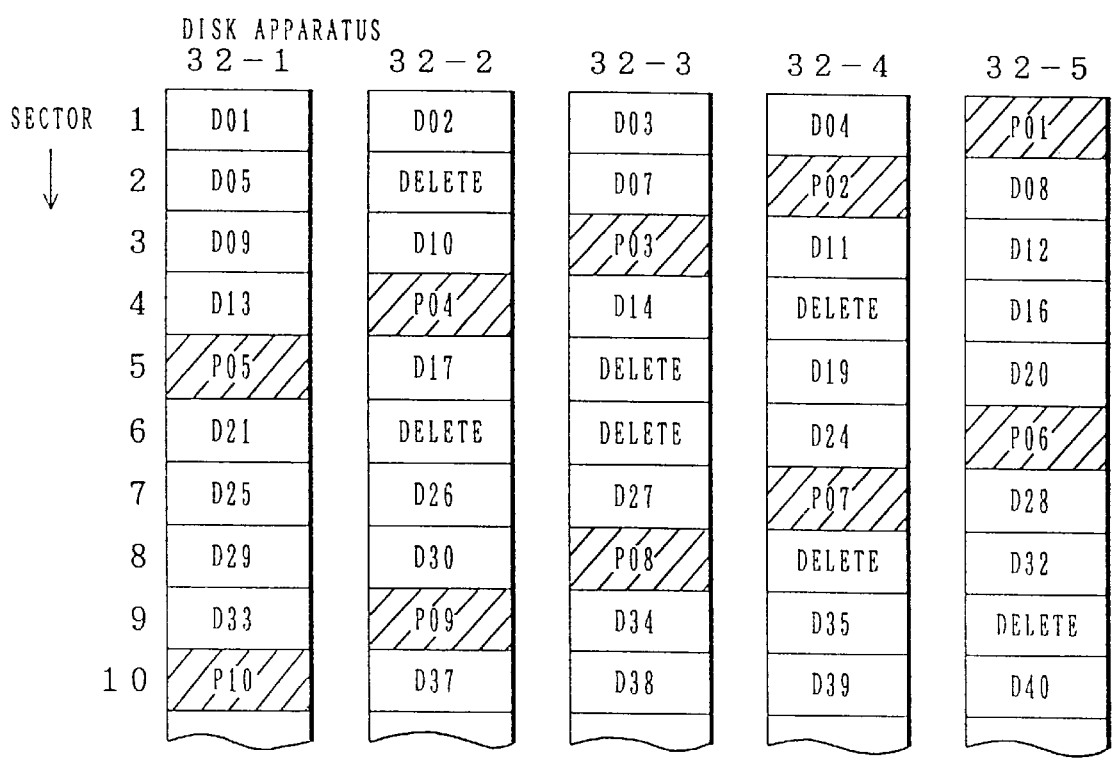
FIG. 31 is an explanatory diagram showing a deleting process of the disk array of the fourth embodiment.
Figure 32:
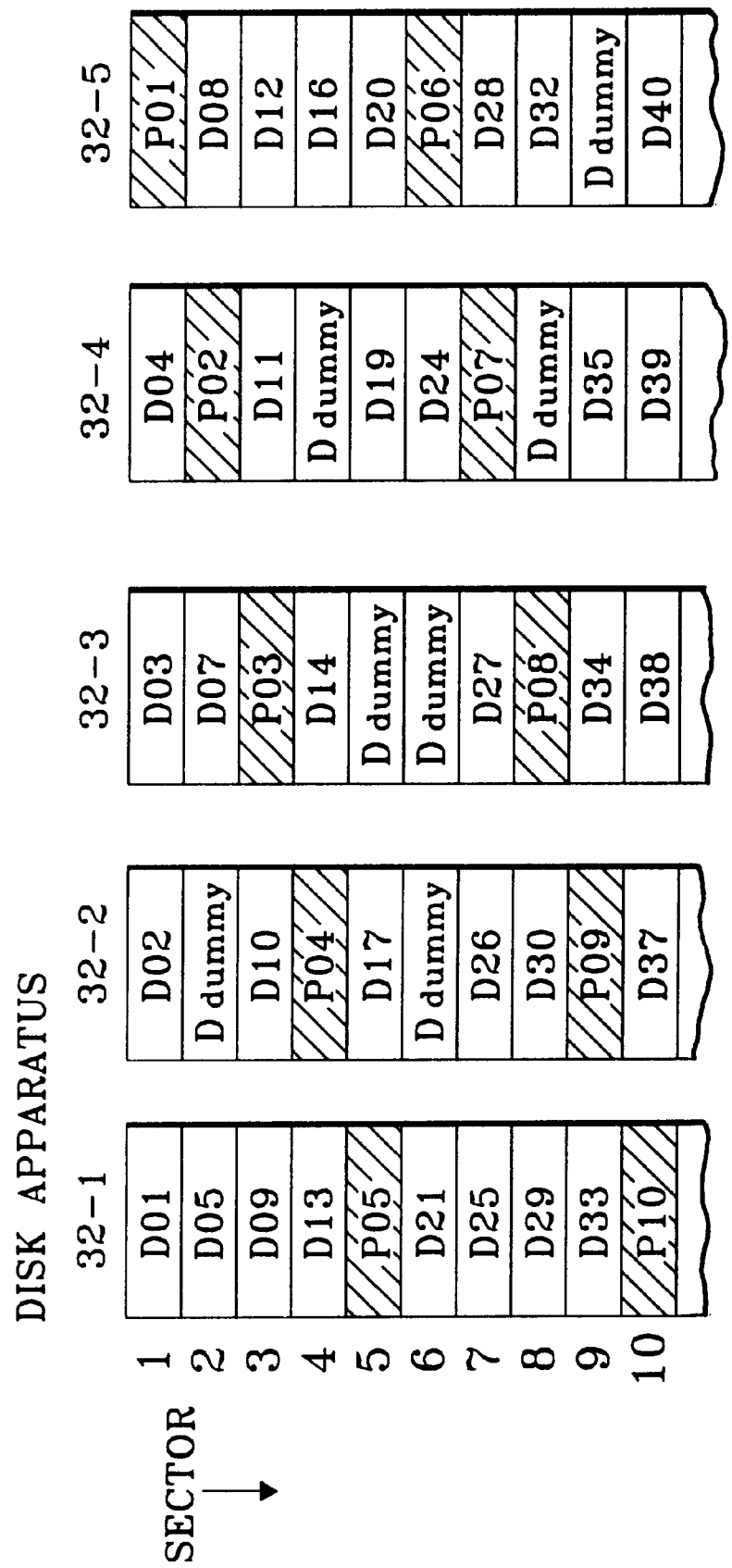
FIG. 32 is an explanatory diagram showing a state of the disk array after completion of the deleting process in FIG. 31.

FIG. 31 shows deleting states of the existing data in the disk apparatuses 32-1 to 32-5 in the fourth embodiment. Even in the case where such a deletion was performed, the dummy data is stored to the deleting positions as shown in FIG. 32. In the case where the dummy data has been stored to the deleting positions, a new parity is formed with regard to the parity data of the same segment.

Figure 33:
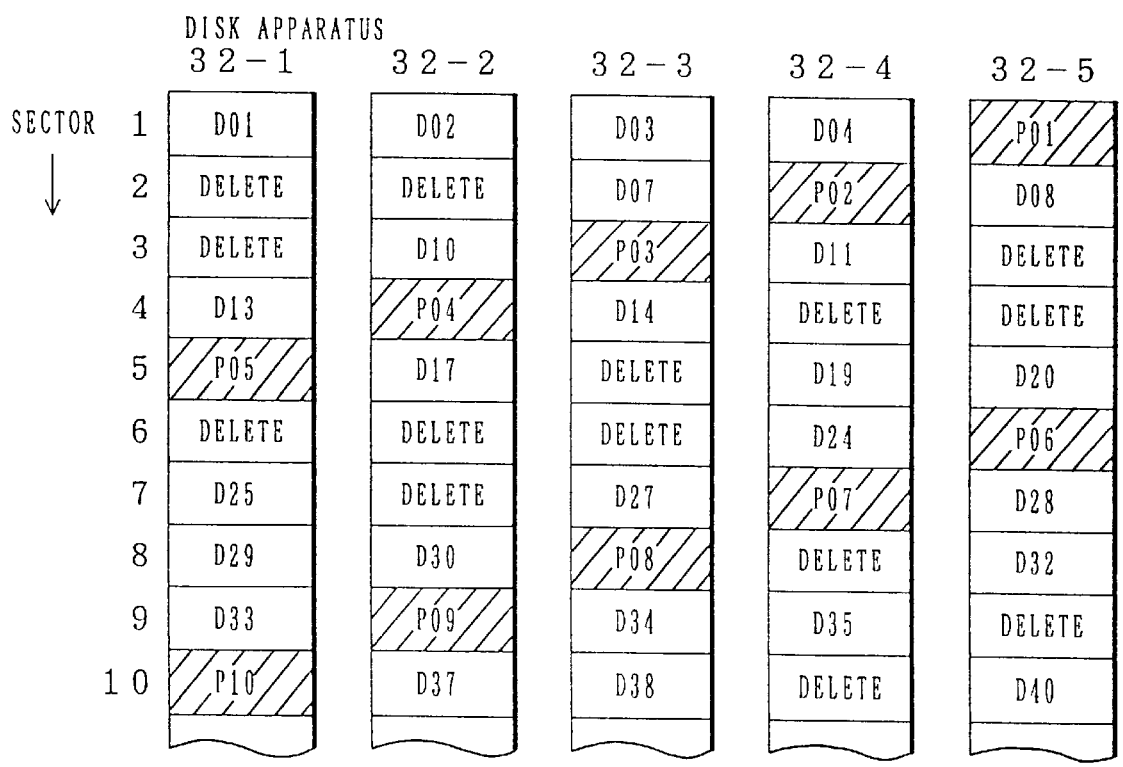
FIG. 33 is an explanatory diagram showing a deleting process of the disk array.
Figure 34:
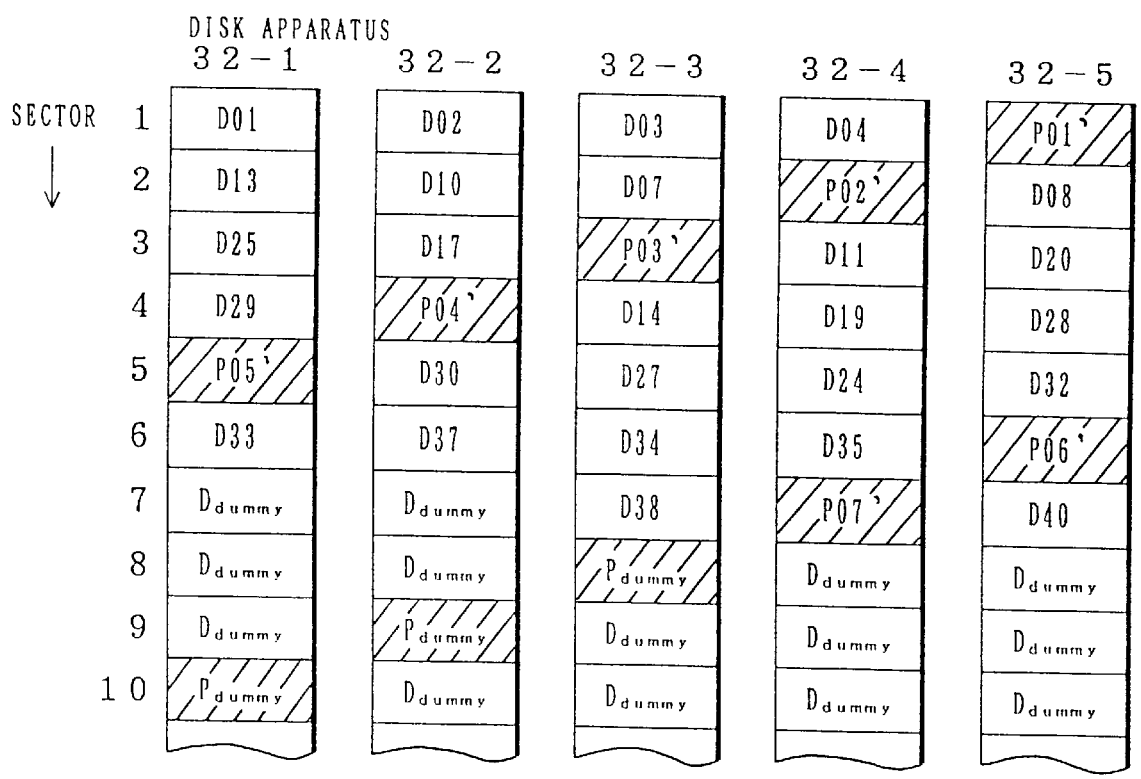
FIG. 34 is an explanatory diagram showing an arranging state of the disk array after completion of the deleting process in FIG. 33.

FIG. 33 shows another deleting process of the disk apparatuses 32-1 to 32-5 in the fourth embodiment. In the case where such a data deletion was performed, as shown in FIG. 34, a sorting process to rewrite the data so as to move the deleted space areas to the upper locations is executed, space sector areas are formed together in the lower locations, and the dummy data and dummy parity data are stored.

As for the processes regarding the dummy data and dummy parity data as shown in FIGS. 29 to 34, it is sufficient to execute the updating after completion of the deleting and sorting processes with regard to the effective data and parity data excluding the dummy data and dummy parity data with regard to the cache memory 26 side.

Figure 35:
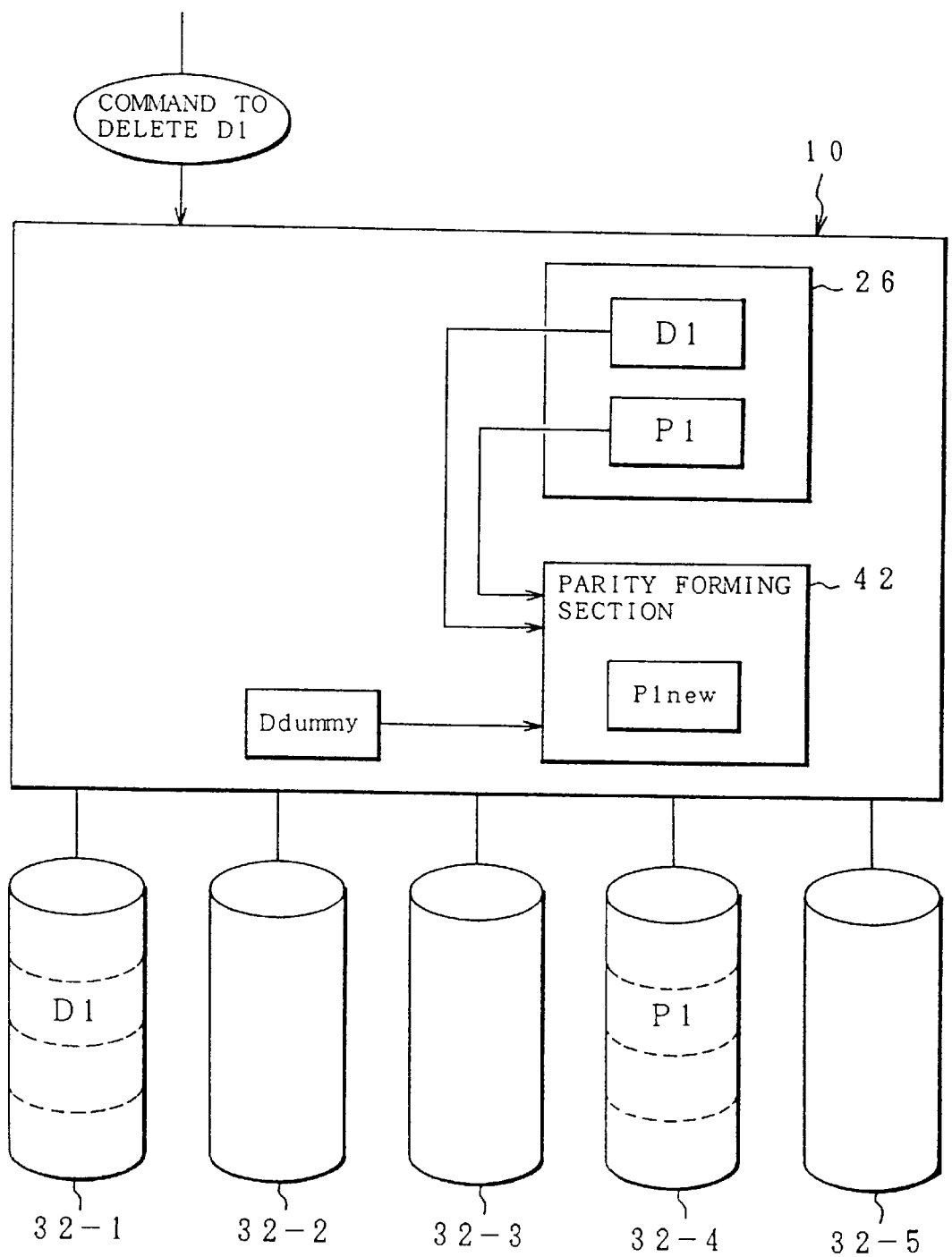
FIG. 35 is a functional block diagram showing a deleting process in a cache memory of the fourth embodiment.
Figure 36:
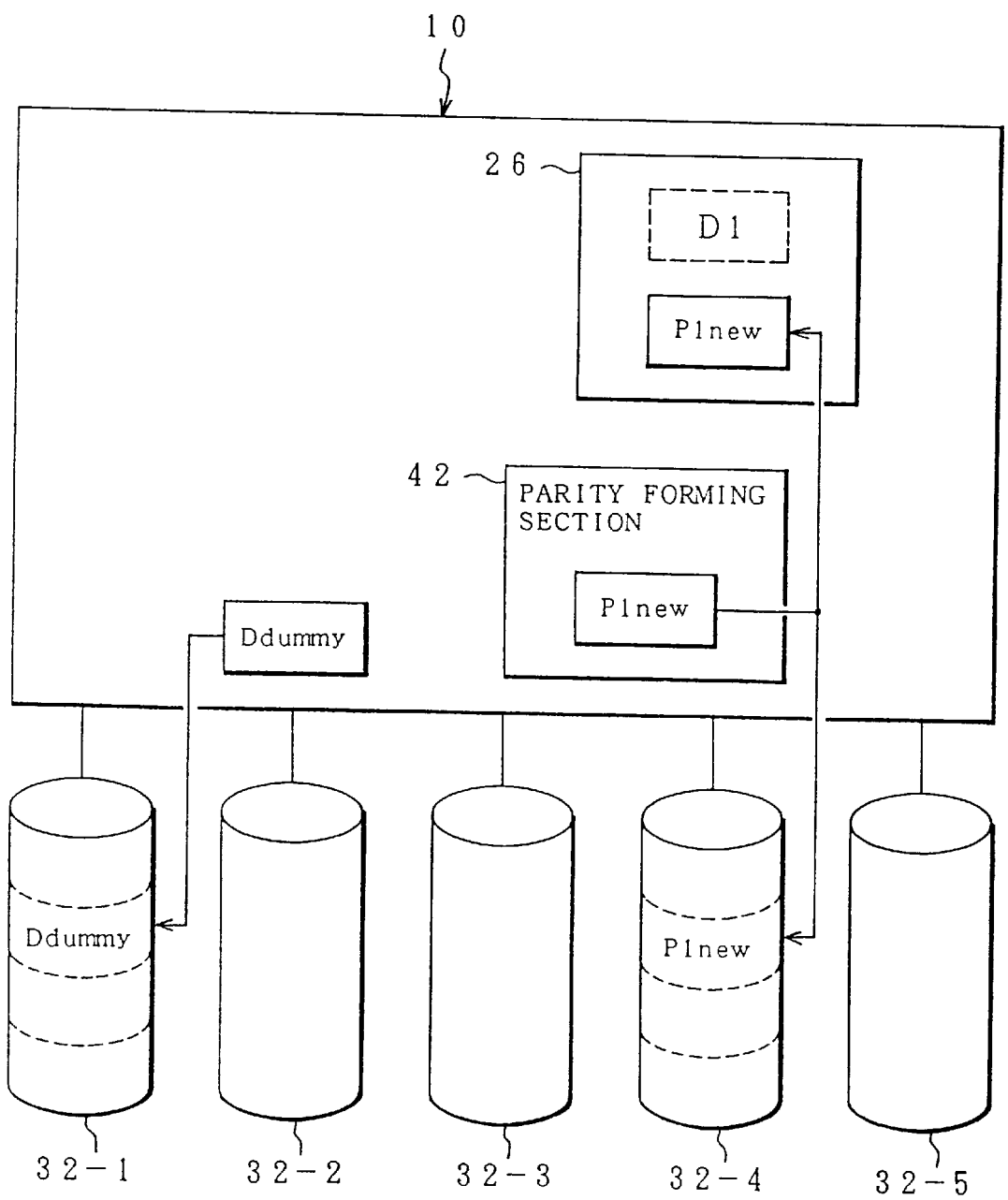
FIG. 36 is a functional block diagram of a deletion end state of the cache memory in FIG. 35.

FIG. 35 shows the processing operation in the case where, for example, a deletion command of the data D1 stored in the disk apparatus 32-1 was received from the host computer 18 in the fourth embodiment. When the deletion command of the data D1 is received from the host computer 18, the old data D1 and the old parity P1 before updating which have been stored in the cache memory 26 are first read out by a parity forming section 42. Since the new data is set to the dummy data $D_{dummy}$ due to the deletion of the data D1, a new parity $P1_{new}$ is formed by the exclusive OR of those three data. Subsequently, as shown in FIG. 36, the old data D1 in the disk apparatus 32-1 is rewritten to the dummy data $D_{dummy}$. The old parity P1 in the disk apparatus 32-4 is rewritten to the new parity $P1_{new}$ which was newly formed. Further, the data D1 stored in the cache memory 26 is deleted and the old parity P1 is updated to the new parity $P1_{new}$.

Figure 37:
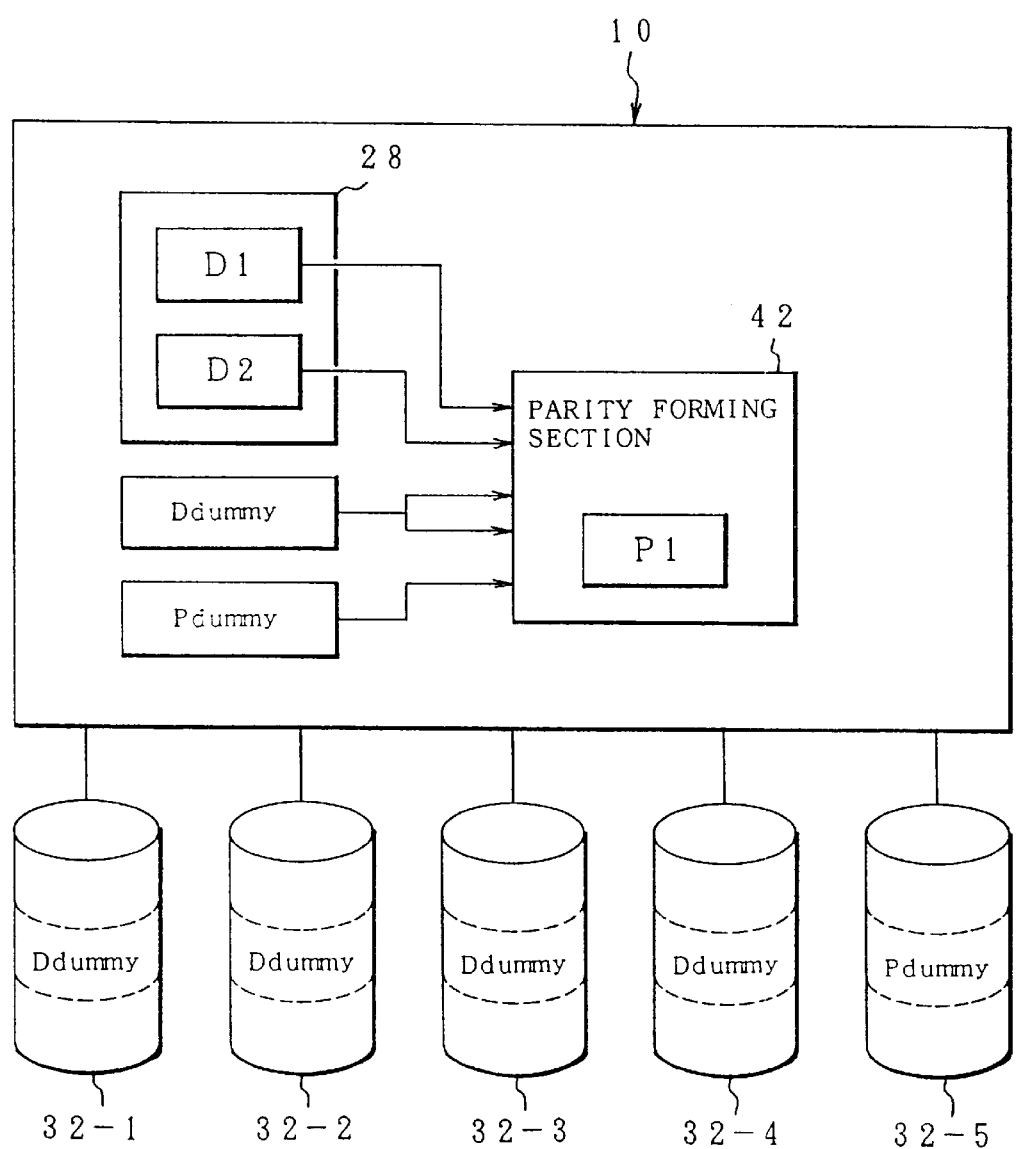
FIG. 37 is a functional block diagram showing a process to update a plurality of data of the same segments in a rank in the fourth embodiment.
Figure 38:
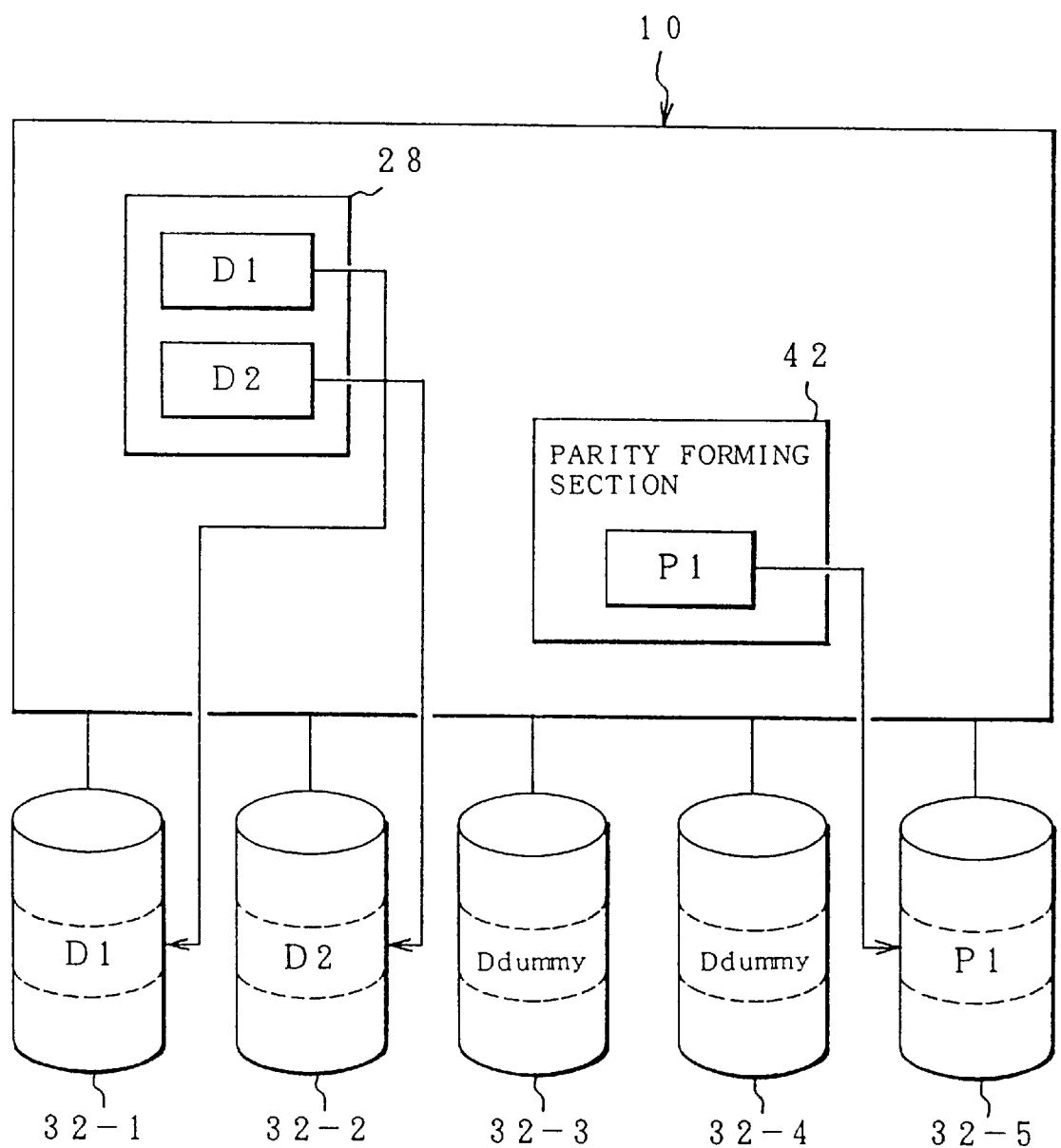
FIG. 38 is a functional block diagram of a state after completion of the updating process in FIG. 37.

FIG. 37 is an explanatory diagram showing processes in case of updating a plurality of dummy data existing in the same segments in the rank in the fourth embodiment. In FIG. 37, it is now assumed that the data D1 stored in the data transfer buffer 28 is written into the space area in the disk apparatus 32-1 and the data D2 is written into the space area at the same sector position in the disk apparatus 32-2. In this case, in order to finally form the parity P1 when the writing operation of the data D2 is finished, the data D1 and D2, two dummy data, and one parity dummy data are inputted to the parity forming section 42, and the new parity P1 is formed by the exclusive OR of those data. Subsequently, as shown in FIG. 38, the data D1 is written into the disk apparatus 32-1, the data D2 is written into the disk apparatus 32-2, and the new parity P1 formed by the parity forming section 42 is written into the disk apparatus 32-5. The new data D1 and D2 and the parity P1 are also stored into the cache memory 26 (not shown), thereby preparing for the next access. As a cache memory which is used in each of the above embodiments, a non-volatile memory having a backup power source can be also used so that the apparatus can cope with a power shut-off due to some causes. By using the non-volatile memory as a cache memory as mentioned above, even if there is a power shut-off, the cache data is not erased and it is possible to prevent that the access performance using the cache memory deteriorates to the initial state by the power shut-off. The use of the non-volatile memory for the whole cache memory results in high costs. Therefore, for example, a part of the cache memory can be also constructed by a non-volatile memory.

Figure 39:
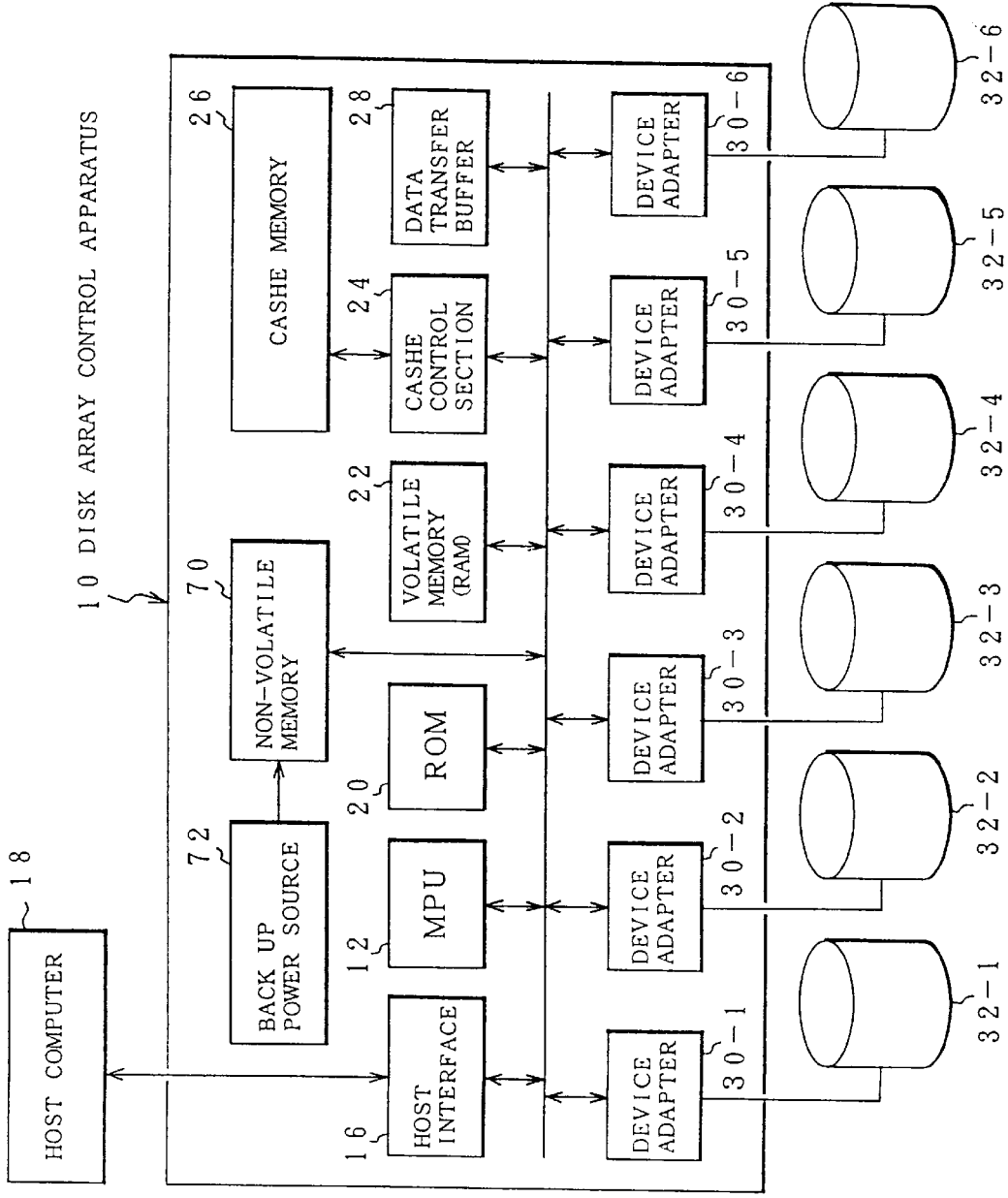
FIG. 39 is an embodiment constructional diagram showing the first embodiment of the invention in which a recovering process at the time of power shut-off is executed by using a non-volatile memory.

7. Embodiment in which a Recovering Process is Executed for the Power Shut-off by using a Non-volatile Memory FIG. 39 shows an embodiment of a disk array apparatus of the invention having a function of a recovering process when the power source is shut off. In FIG. 39, the MPU 12 is provided in the disk array control apparatus 10. The ROM 20 in which control programs and fixed data have been stored, the volatile memory 22 using an RAM, the cache memory 26 provided through the cache control section 24, the data transfer buffer 28, and a non-volatile memory 70 which can also operate even at the power shut-off by a backup power source 72 are connected to the internal bus 14 of the MPU 12. The host interface 16 is provided. The host computer 18 which functions as an upper apparatus is connected to the host interface 16. On the other hand, in the embodiment, six disk apparatuses 32-1 to 32-6 are provided for the disk array control apparatus 10. The disk apparatuses 32-1 to 32-6 are connected to the internal bus 14 of the MPU 12 through the device adapters 30-1 to 30-6, respectively. Among the six disk apparatuses 32-1 to 32-6, four disk apparatuses are used to store data, one disk apparatus is used for parities, and the remaining one disk apparatus is a spare apparatus.

Figure 5:
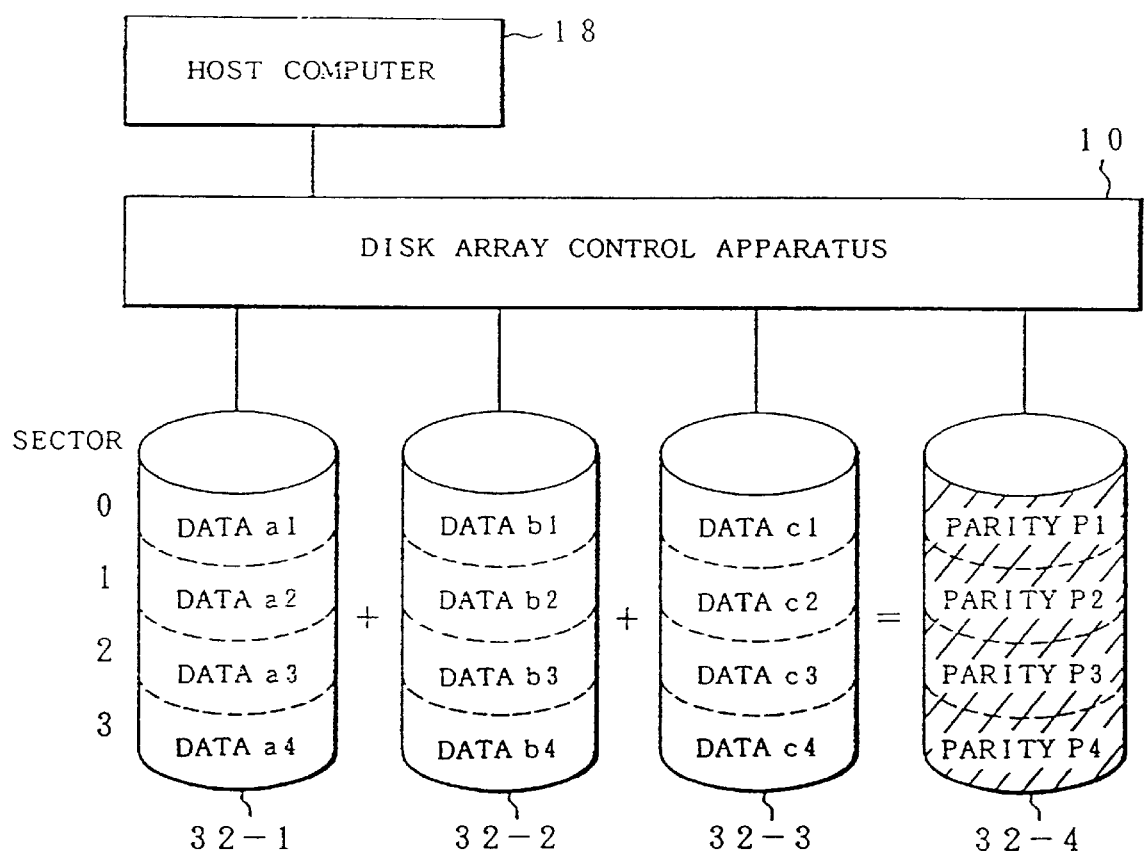
FIG. 5 is an explanatory diagram of a Prior Art disk array apparatus by RAID4.

Since the disk array apparatus of the invention realizes the same function as that of the RAID4 shown in FIG. 5 or the RAID5 shown in FIG. 6, for example, when it is now assumed that the disk apparatus 32-6 is set to a spare disk apparatus, in case of the RAID4, the disk apparatuses 32-1 to 32-4 are used for data storage and the disk apparatus 32-5 is used for parities. On the other hand, in case of the RAID5, as for the disk apparatuses 32-1 to 32-5, the same data units are stored together into one disk apparatus in a manner similar to the case of RAID4. However, the disk apparatus for parities is not fixed and the disk apparatus for parities is sequentially switched in accordance with a predetermined order each time the same storing position in the disk apparatuses 32-1 to 32-5 changes.

Figure 40:
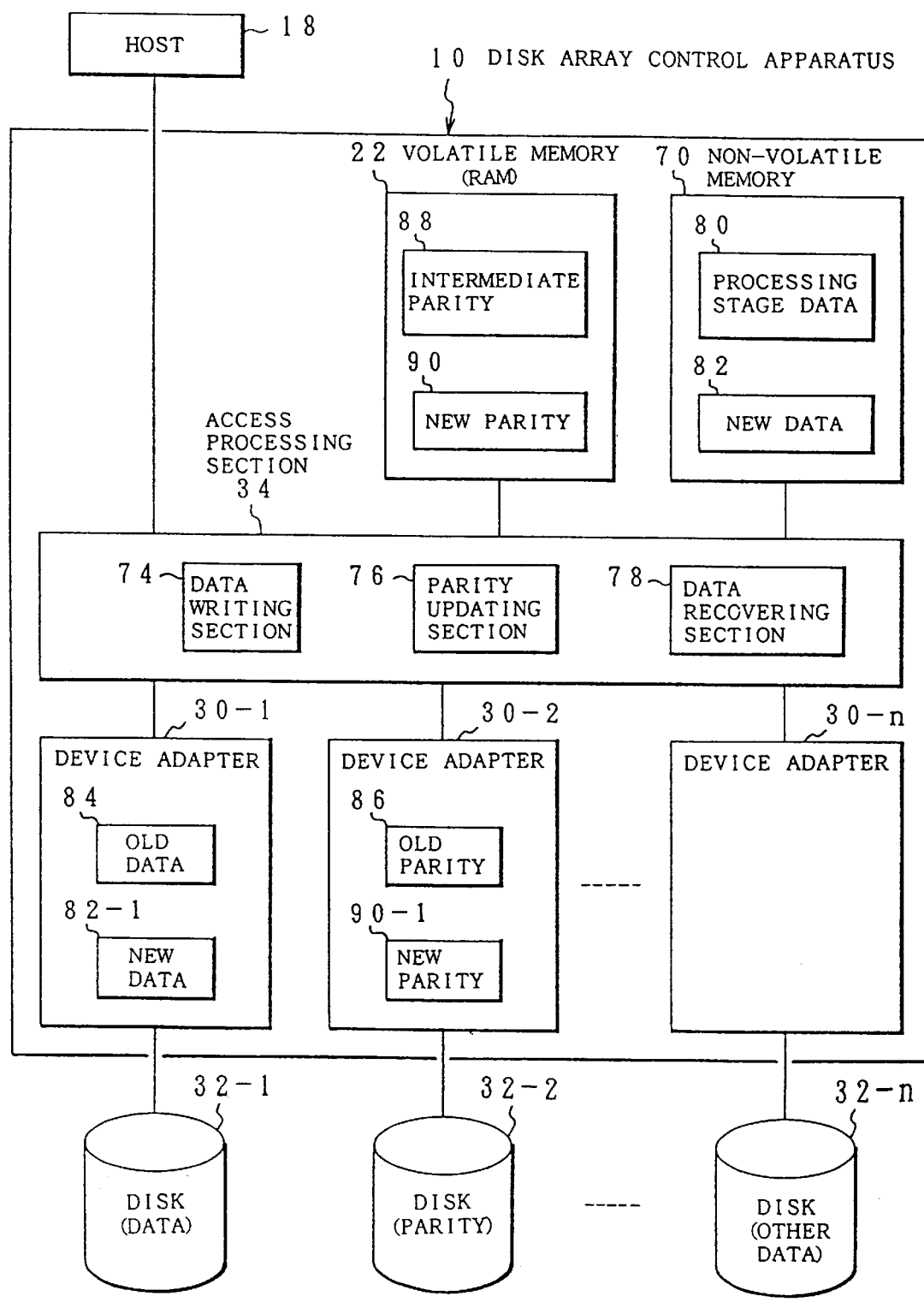
FIG. 40 is a functional block diagram showing processing contents in FIG. 39.

FIG. 40 is a functional block diagram showing the processing contents in the first embodiment of FIG. 39. In FIG. 40, as disk apparatuses for the disk array control apparatus 10, (n) disk apparatuses 32-1 to 32-n are shown as an example. It is now assumed that the disk apparatus 32-2 was used as an apparatus for parities. In case of RAID4, the disk apparatus 32-2 is fixedly predetermined as an apparatus for parities. With respect to the RAID5, the disk apparatus 32-2 is positioned for parities in the data access at the present time point. The access processing section 34 provided for the disk array control apparatus 10 realizes the functions as a data writing section 74, a parity updating section 76, and a data recovering section 78 by the program control by the MPU 12. The volatile memory 22 and the non-volatile memory 70 are connected to the access processing section 34. The access processing section 34 has therein a memory to temporarily store the data which is transmitted or received among the disk apparatuses of the device adapters 30-1 to 30-n provided for every disk apparatuses 32-1 to 32-n.

In the first embodiment of FIG. 40, processing stage data 80 indicative of the processing stages of the data writing section 74 and parity updating section 76 is stored into the non-volatile memory 70. New data 82 which was transferred from the host computer 18 and is used to write into the designated disk apparatus is stored into the memory 70. On the other hand, an intermediate parity 88 and a new parity 90 which are formed by processes of the parity updating section 76 are stored into the volatile memory 22. Further, with respect to the device adapters 30-1 to 30-n, the new data 82 transferred from the host computer 18 and old data 84 which was read out from an area into which new data will be written for updating the parity are stored into, for example, the device adapter 30-1 of the disk apparatus 32-1 as a target for data writing. An old parity 86 read out from the same position corresponding to an area into which new data will be written in the disk apparatus 32-1 and the new parity 90 formed by the parity updating section 76 are stored into the device adapter 30-2 of the disk apparatus 32-2 for parities. In the case where all of the memories which are used in the disk array control apparatus 10 are constructed by non-volatile memories, the memory capacity increases and the costs are high. In the first embodiment, therefore, the non-volatile memory 70 is allocated to store the processing stage data 80 and the new data 82 and the non-volatile memory 22 is used to store the intermediate parity 88 and the new parity 90 other than those data 80 and 82. If the new data 82 can be held on the host computer 18 side at the time of power shut-off, the new data 82 can be also stored into the volatile memory 22.

Figure 41:
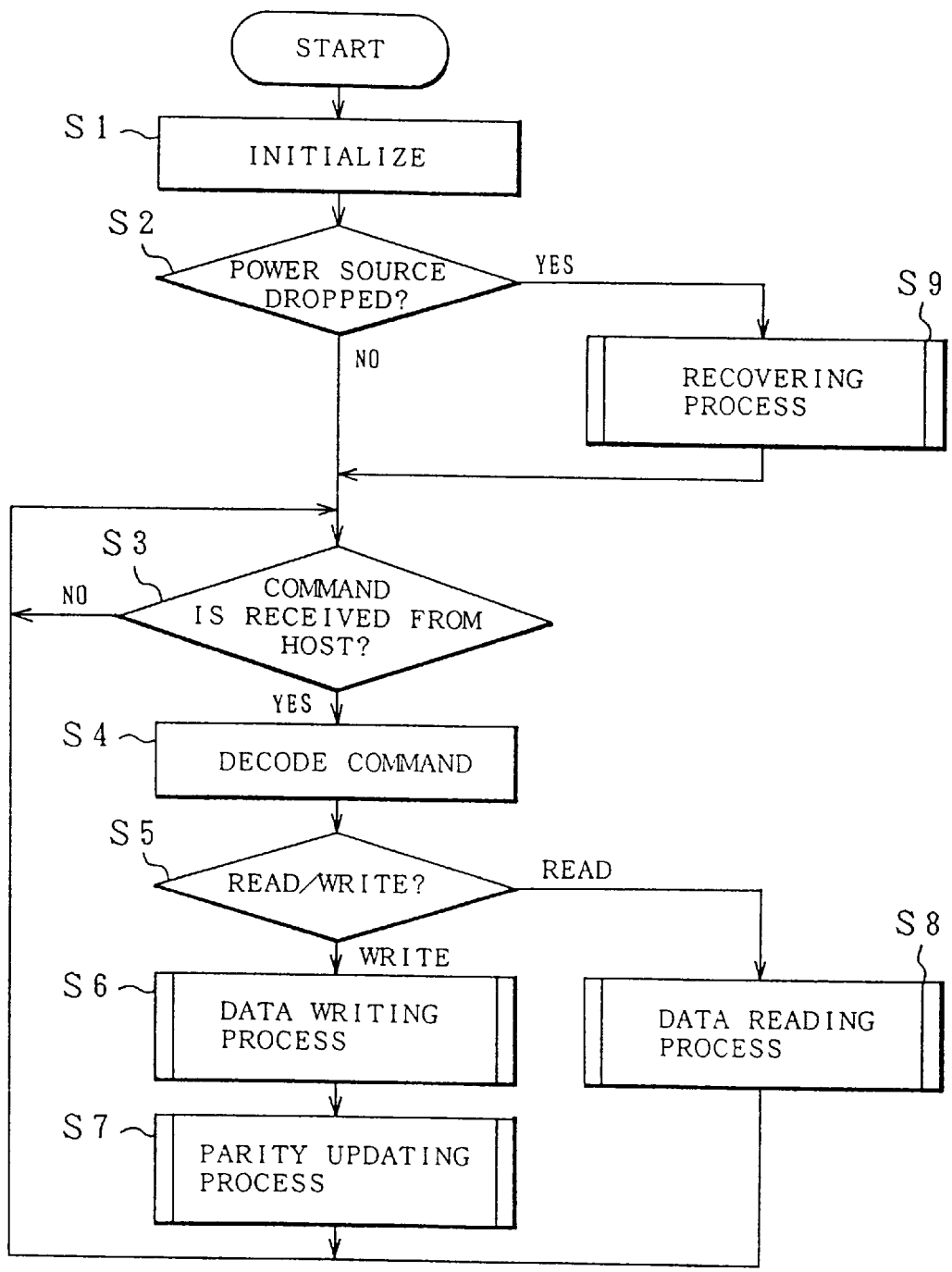
FIG. 41 is a flowchart showing the whole processing operation of an embodiment of FIG. 40.

FIG. 41 is a flowchart showing the overall processing operation in the access processing section 34 in FIG. 40. In FIG. 41, when the power source of the disk array apparatus is first turned on, a predetermined initializing process is executed on the basis of an initial program load (IPL) in step S1. In step S2, a check is made to see if a power source has been shut off or not. In the case where the power-on is started by the logon after completion of the disconnection of the power source by the ordinary logoff operation, it is determined that there is no power shut-off, so that step S3 follows and the apparatus waits for reception of the command from the host computer 18. When the command from the host computer 18 is received in step S3, the command is decoded in step S4. When a request for the read access is discriminated in step S5, a data reading process is executed in step S8. On the other hand, when a request for the write access is discriminated, a data writing process is executed in step S6. A parity updating process is executed in step S7. In the case where the power shut-off is discriminated in step S2 at the start of the power-on, recovering process is executed in step S9. After that, the ordinary processes in step S3 and subsequent steps are executed. The data writing process in step S6 in the flowchart of FIG. 41 is executed by the data writing section 74 provided in the access processing section 34 in FIG. 40. The parity updating process in step S7 is executed by the parity updating section 76. The recovering process in step S9 is further executed by the data recovering section 78.

Figure 42:
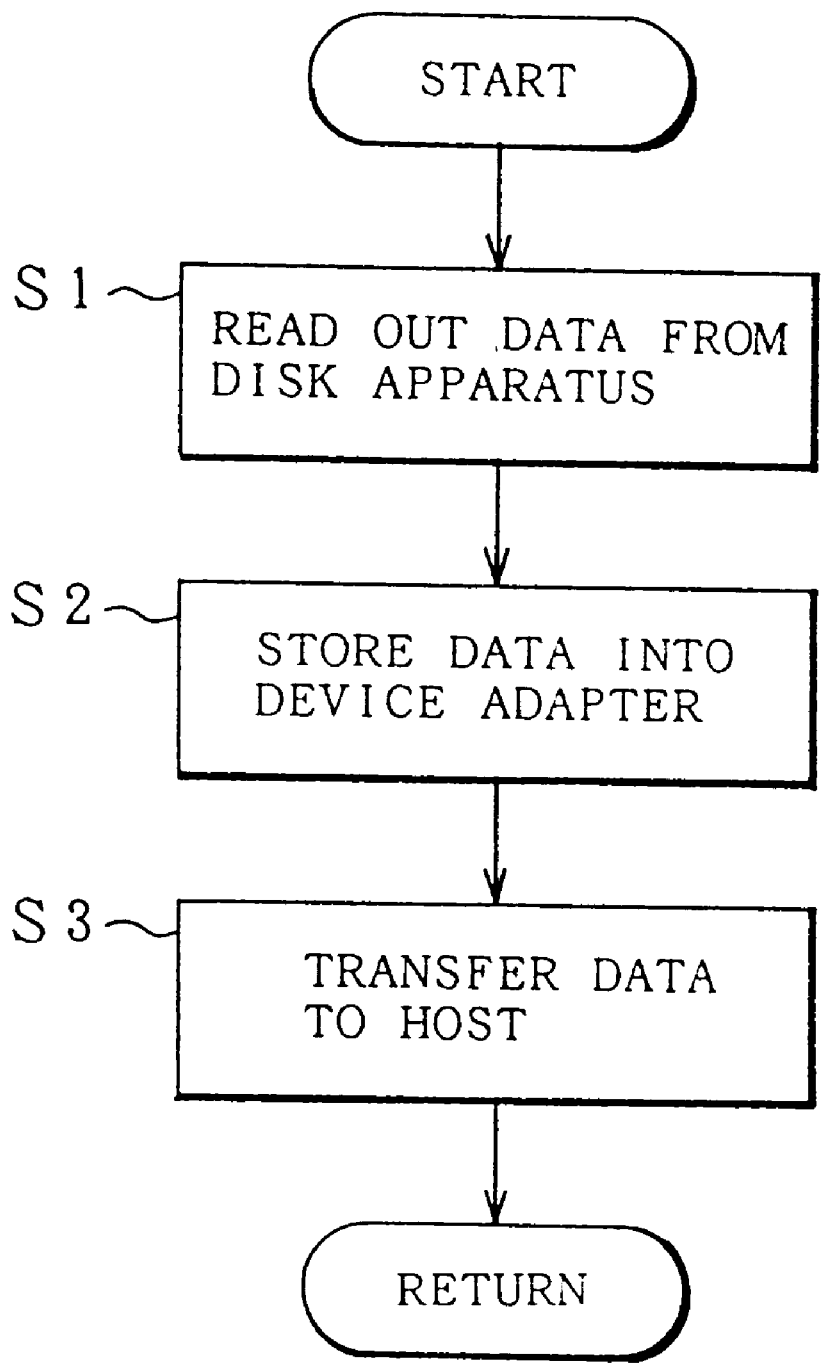
FIG. 42 is a flowchart showing the details of a data reading process in FIG. 41.

FIG. 42 is a flowchart showing the details of the data reading process shown in step S8 in FIG. 41. In FIG. 42, when the read command from the host computer is decoded, data is read out from the disk apparatus through the device adapter as a target for data reading. The read-out data is stored into the device adapter in step S2. After that, the data is transferred to the host computer 18 in step S3. In this instance, when a transfer rate on the disk apparatus side differs from a transfer rate on the host computer 18 side, the read-out data which was transmitted via the data transfer buffer 28 provided in the disk array control apparatus 10 shown in FIG. 39 is transferred to the host computer 18.

Figure 43:
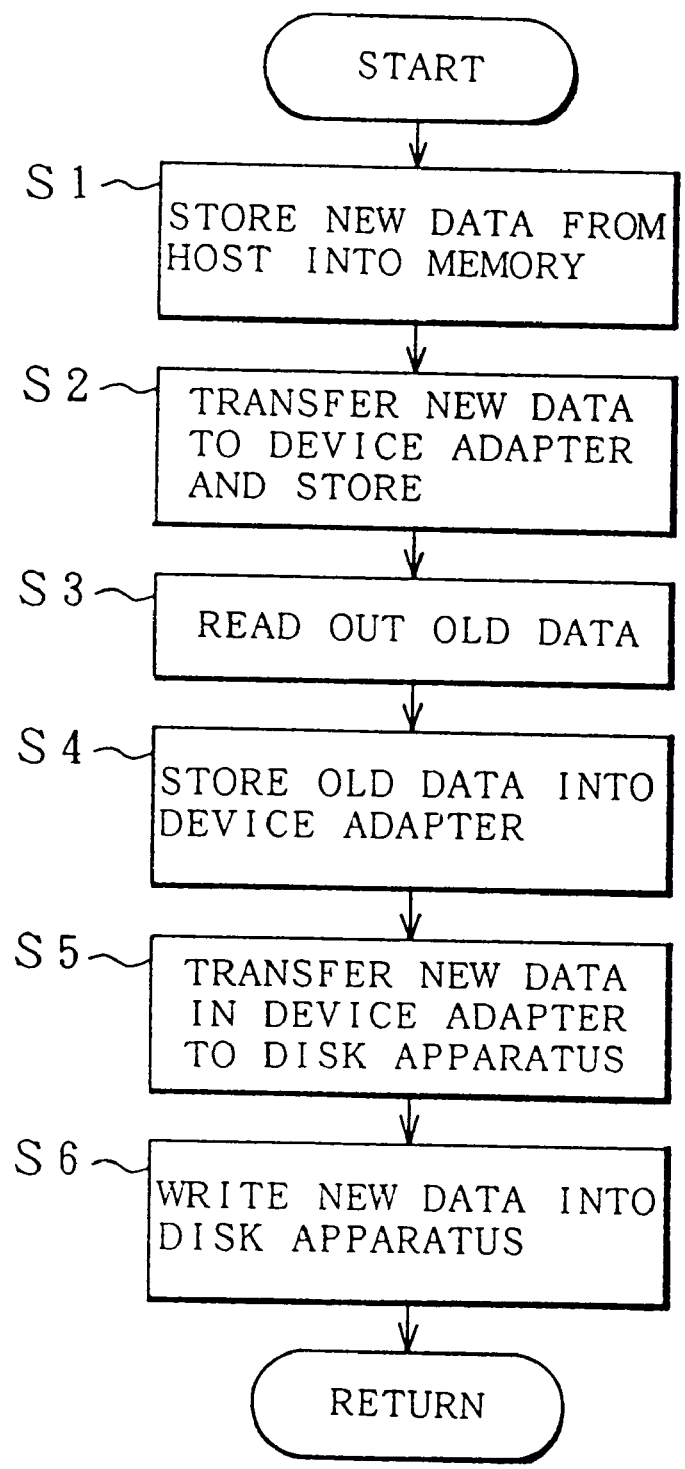
FIG. 43 is a flowchart showing the details of a data writing process in FIG. 41.

FIG. 43 is a flowchart showing the details of the data writing process shown in step S6 in FIG. 41. In FIG. 43, since new data which is written into the disk apparatus is transferred in response to a write command from the host computer 18, the new data 82 from the host computer 18 is stored into the memory, namely, non-volatile memory 70 in step S1. Subsequently, now assuming that, for example, the disk apparatus 32-1 was designated as a writing target, the new data 82 is transferred and stored into the device adapter 30-1 in step S2. The contents in an area into which the new data will be written in the disk apparatus 32-1 are read out as old data 84 in response to an instruction from the device adapter 30-1 and stored into the device adapter 30-1. After the old data 84 was stored, the new data 82 in the device adapter 30-1 is transferred to the disk apparatus 32-1 in step S5. The new data 82 is written into an area into which the new data will be written in step S6.

Figure 44:
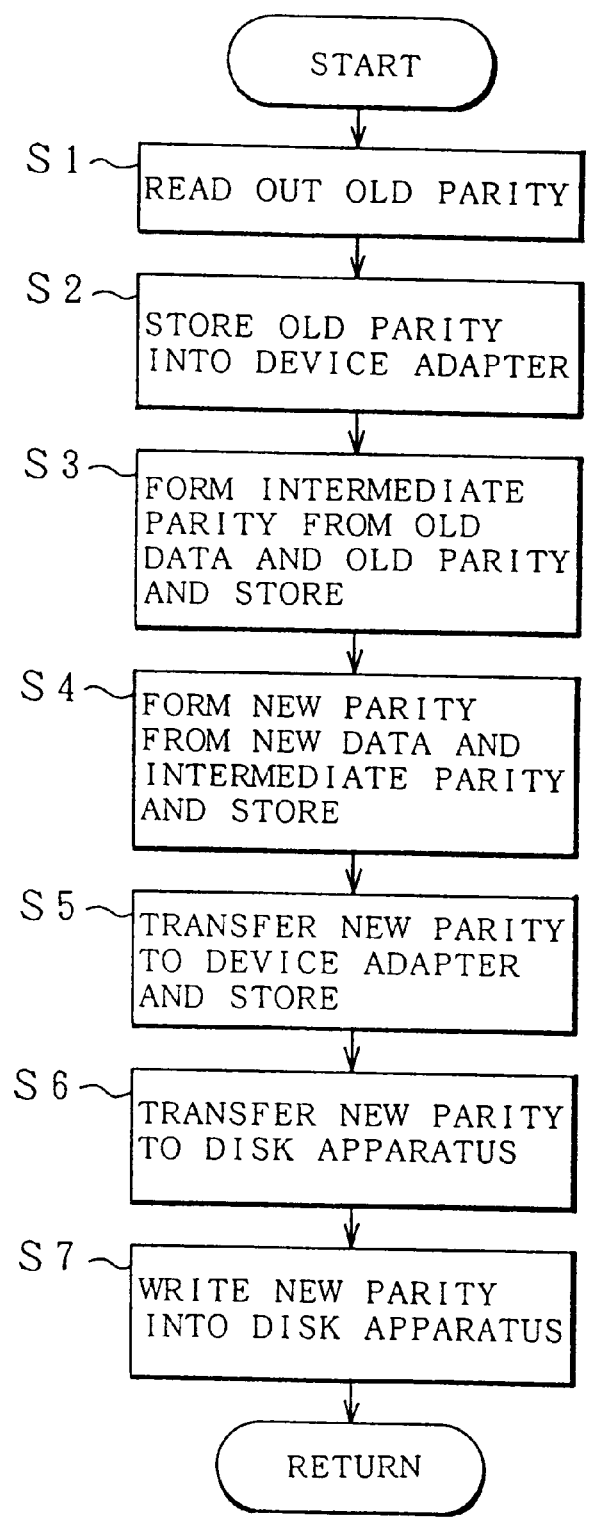
FIG. 44 is a flowchart showing the details of a parity updating process in FIG. 41.

FIG. 44 is a flowchart showing the details of the parity updating process shown in step S7 in FIG. 41. In FIG. 44, the contents in the same area in the disk apparatus 32-2 for parities as the area into which new data will be written in the disk apparatus 32-1 are first read as an old parity 86 in step S1. In step S2, the read-out old parity 86 is stored into the device adapter 30-2. Subsequently, in step S3, the intermediate parity 88 is formed from the old data 84 and the old parity 86 is step S3 and stored into the volatile memory 22. The new data 82 in the non-volatile memory 70 and the intermediate parity 88 in the volatile memory 22 are subsequently read out and the new parity 90 is formed and stored into the volatile memory 22. The intermediate parity 88 is formed from the exclusive OR of the old data 84 and the old parity 86. The new parity 90 is similarly formed from the exclusive OR of the new data 82 and the intermediate parity 88. After the new parity 90 was formed and stored in step S4, the new parity 90 is read out from the volatile memory 22 in step S5 and is transferred and stored into the device adapter 30-2. Subsequently, the new parity 90 is transferred to the disk apparatus 32-2 for parities in step S6. In step S7, the new parity 90 is written into the same area in the disk apparatus 32-2 as the writing area of the new data in the disk apparatus 32-1. The parity updating process is finished. The new parity 90 is fundamentally formed from the exclusive OR of the new data 82, old data 84, and old parity 86. In the embodiment of FIG. 43, the new parity 90 is formed via the forming stage of the intermediate parity 88. As a forming step of the new parity via the stage of the intermediate parity 88, there are the following three cases including the case of FIG. 41.

Case 1

The exclusive OR of the new data 82 and the old data 84 is calculated and the intermediate parity 88 is formed and stored into the volatile memory 22. After the intermediate parity 88 was stored into the volatile memory 22, the old data 84 becomes unnecessary, so that the memory area in which the old data in the device adapter 30-1 has been stored is released. The exclusive OR of the intermediate parity 88 in the volatile memory 22 and the old parity 86 of the device adapter 30-2 is got and the new parity 90 is formed and stored into the non-volatile memory 70. Namely, the processes of the following equation are executed.

new data(+)old data=intermediate parity intermediate parity(+)old parity=new parity Case 2

The exclusive OR of the old data 84 and the old parity 86 is got and the intermediate parity 88 is formed and stored into the volatile memory 22. After the intermediate parity 88 was stored into the volatile memory 22, the memory areas in which the old data 84 of the device adapter 30-1 and the old parity 86 of the device adapter 30-2 have been stored are released. Subsequently, the exclusive OR of the intermediate parity 88 in the volatile memory 22 and the new data 82 in the non-volatile memory 70 is got and the new parity 90 is formed and stored into the volatile memory 22. The above processes correspond to the processes in the embodiment of FIG. 44 and the processes of the following equations are executed.

Old data(+)old parity=intermediate parity

Intermediate parity(+)new data=new parity

Case 3

The exclusive OR of the old parity 86 stored in the memory of the device adapter 30-2 and the new data 82 in the non-volatile memory 70 is got and the intermediate parity 88 is formed and stored into the volatile memory 22. After the intermediate parity 88 was stored into the volatile memory 22, since the old parity 86 is unnecessary, the memory area in the device adapter 30-2 in which the old parity has been stored is released. Subsequently, the exclusive OR of the intermediate parity 88 in the volatile memory 22 and the old data 84 in the device adapter 30-1 is got and the new parity 90 is formed and stored into the volatile memory 22. That is, the processes of the following equations are executed.

Old parity(+)new data=intermediate parity

Intermediate parity(+)old data=new parity

Further, the formation of the new parity via the forming stage of the intermediate parity is not limited to the above cases 1 to 3. It is sufficient to sequentially select the processes in the case 1 or 3 in accordance with the order of the timing to read out and store the old data 84 of the device adapter 30-1 and the timing to read out and store the old parity 86 of the device adapter 30-2 from the earlier timing. That is, in the flowchart of FIG. 41, after the data writing process was executed in step S6, the parity updating process is sequentially executed in accordance with the order in step S7. However, actually, after a seeking command was issued to the disk apparatus 32-1 and this disk apparatus was disconnected, a seeking command is issued to the disk apparatus 32-2 for parities and this disk apparatus is disconnected. The old data or old parity is read out from one of the disk apparatuses 32-1 and 32-2 which received a notification indicative of the completion of the seeking operation for the first time. Therefore, in the case where the old data 84 was first read out, the intermediate parity is formed from the new data and the old data as shown in the case 1. In the case where the old parity 86 was first read out, the intermediate parity is formed from the old parity and the new data as shown in the case 3. After the intermediate parity was formed, with respect to the case 1, when the old parity is read out, the new parity is formed, and with regard to the case 3, when the old data is read out, the new parity is formed. At a time point when all of the new data, old data, and old parity are obtained, the exclusive OR is got in a lump by new data(+)old data(+)old parity=new parity and the new parity is formed and the forming step of the intermediate parity can be also omitted.

Figure 45:
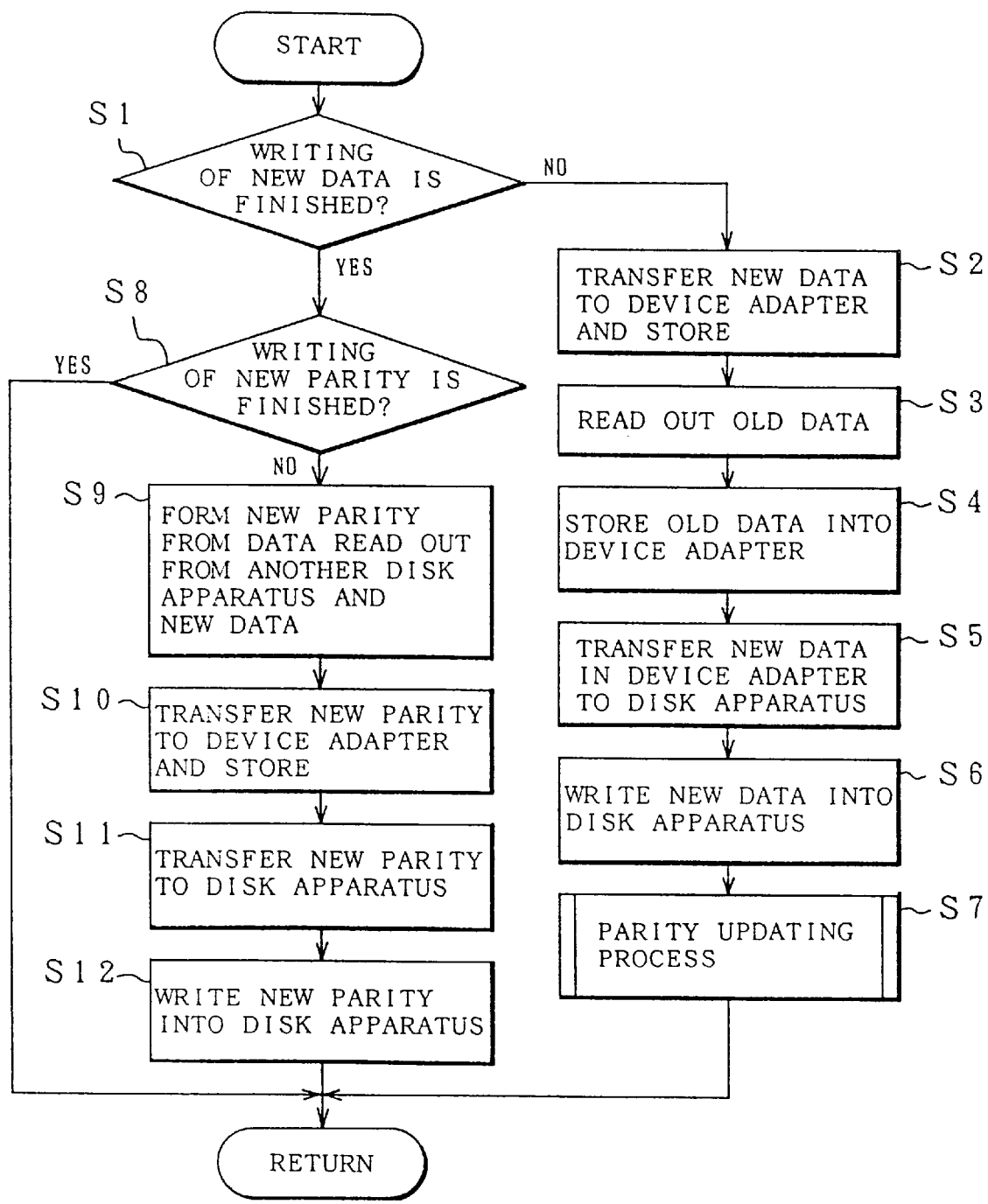
FIG. 45 is a flowchart showing the details of a recovering process in FIG. 41.

FIG. 45 is a flowchart showing the details of the recovering process shown in step S9 in FIG. 41. In the first embodiment of FIG. 40, only the processing stage data 80 and the new data 82 are held in the non-volatile memory 70 at the time of power shut-off. Therefore, the contents of the recovering process differ in dependence on whether the timing of the power shut-off is located before or after the end of writing of the new data 82 into the disk apparatus 32-1. In the recovering process in FIG. 45, a check is first made in step S1 to see if the writing of the new data has been finished or not. When the writing of the new data is not yet finished, this means that the power has already been shut off before completion of the writing of the new data. Therefore, the processing routine advances to the processes in step S2 and subsequent steps. Namely, in step S2, the new data 82 held in the non-volatile memory 70 is read out and is transferred and stored into the device adapter 30-1. In the next step S3, the contents in the area into which the new data will be written are read out as old data 84 from the disk apparatus 32-1. The old data 84 is stored into the device adapter 30-1 in step S4. Subsequently, in step S5, the new data 82 in the device adapter 30-1 is transferred to the disk apparatus 32-1. In step S6, the new data 82 is written into the disk apparatus 32-1. That is, in the case where the power is shut off before completion of the writing of the new data, the same processes as those in steps S2 to S6 excluding step S1 in the data writing process shown in FIG. 43 are executed as a recovering process. Since the new data 82 was held in the non-volatile memory 70 as mentioned above, there is no need to newly transfer the new data 82 from the host computer 18 at the time of the recovering process and the recovering process can be executed at a high speed by only a speed corresponding to it. After the writing of the new data 82 in step S6 was finished, the parity updating process is executed in step S7. The parity updating process has the same contents as those shown in the flowchart of FIG. 44.

On the other hand, when the end of the writing of the new data is discriminated in step S1, step S8 follows and a check is made to see if the writing of the new parity has been finished or not. When the writing of the new parity is not yet finished, the processes in step S9 and subsequent steps are executed. First, since the writing of the new data into the disk apparatus 32-1 has already been finished, the new parity is formed by the exclusive OR of the data which was read out from the other disk apparatuses 32-3 to 32-n excluding the disk apparatus 32-2 for parities and the new data in step S9. Namely, the new parity is formed from only the new data and the data of the other disk apparatuses without using the old parity. Subsequently, in step S10, the new parity is transferred and stored into the device adapter 30-2. After that, in step S11, the new parity is transferred to the disk apparatus 32-2. In step S12, the new parity is written into the disk apparatus 32-2 and the series of recovering professes are finished. Further, in the case where the end of writing of the new parity is discriminated in step S8, since the recovering process is unnecessary, the processing routine is directly returned to the main routine.

Figure 46:
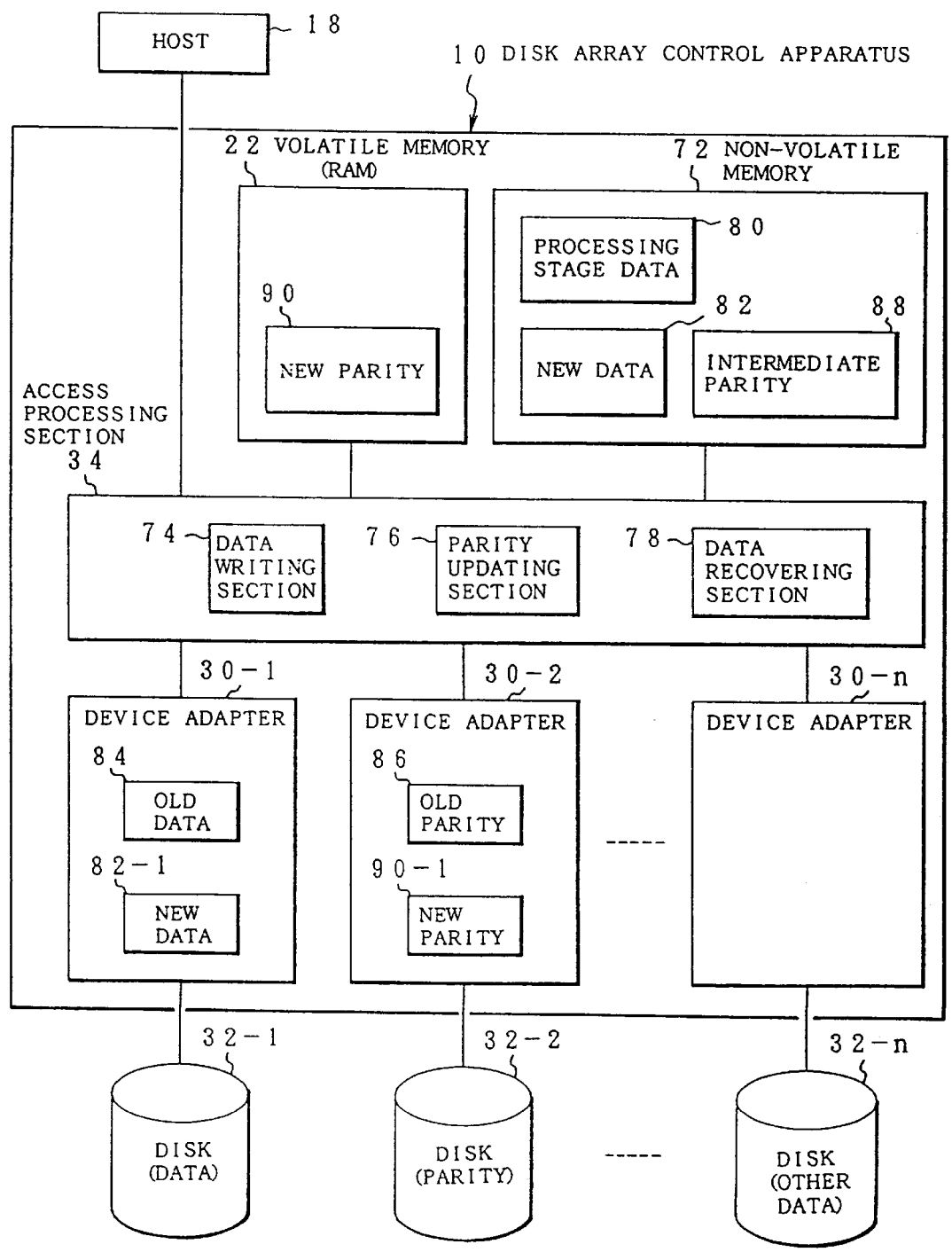
FIG. 46 is a functional block diagram showing the processing content of the second embodiment of the invention in which the recovering process at the time of power shut-off is executed by using the non-volatile memory.
Figure 47:
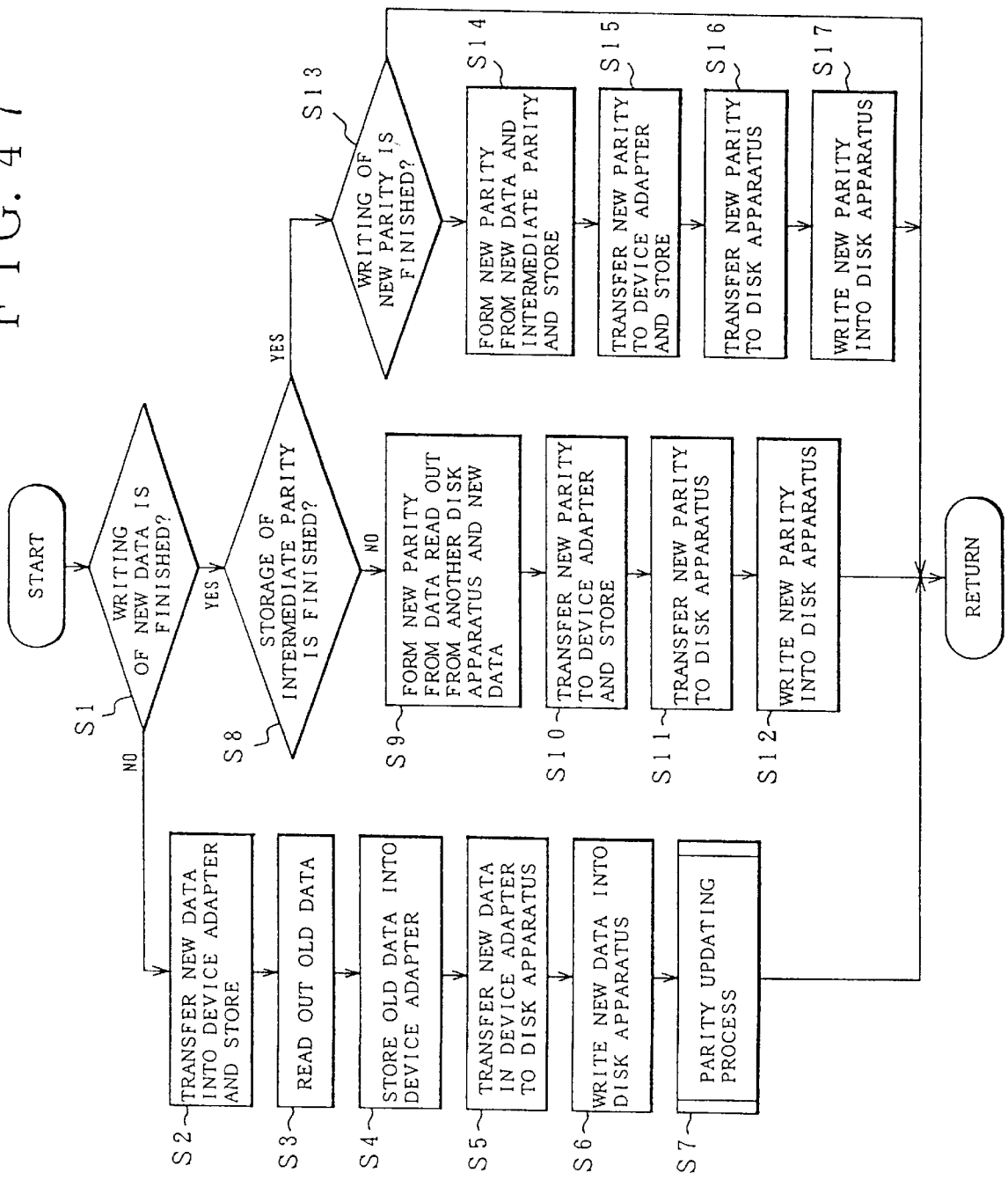
FIG. 47 is a flowchart showing the details of the recovering process in the embodiment of FIG. 46.

FIG. 46 is a functional block diagram showing the processing contents of the second embodiment of the recovering process of the invention. The second embodiment is characterized in that in addition to the processing stage data 80 and the new data 82 but also the intermediate parity 88 is also stored into the non-volatile memory 70. For this purpose, a memory capacity of the non-volatile memory 70 is increased by only a capacity to store the intermediate parity 88 and the costs are higher than those in the first embodiment. However, since the intermediate parity 88 can be held due to the power shut-off, the recovering process can be executed further at a high speed. The whole control process in the second embodiment of FIG. 46 is fundamentally the same as that of the first embodiment shown in FIG. 41. The processes by the data writing section 74 and the parity updating section 76 are also substantially the same as those in the flowcharts of FIGS. 43 and 44 expect that the intermediate parity 88 is stored into the non-volatile memory 70. On the other hand, the recovering process by the data recovering section 78 is executed as shown in a flowchart of FIG. 47 because the intermediate parity 88 was newly stored into the non-volatile memory 70. In FIG. 47, the timing of the occurrence of the power shut-off is discriminated in steps S1, S8, and S13, respectively. When it is determined in step S1 that the writing of the new data is not yet finished due to the power shut-off, the processes in steps S2 to S7 are executed. The above point is the same as that in case of the first embodiment shown in FIG. 45. When the end of writing of the new data is judged in step S1, a check is subsequently made in step S8 to see if the storage of the intermediate parity has been finished or not. When the intermediate parity is not yet stored, namely, in the case where the power was shut off for a period of time before the intermediate parity is stored after completion of the writing of the new data, the processes in steps S9 to S12 are executed. Those processes are the same as the processes in steps S9 to S12 in the first embodiment of FIG. 47. Since the new data has already been written, the new parity is formed by getting the exclusive OR of the data read out from the other disk apparatuses excluding the disk apparatus for parities and the new data and is written into the disk apparatus for parities. Further, in the case where the end of storage of the intermediate parity is judged in step S8, step S13 follows and a check is made to see if the new parity has been written or not. In the case where the new parity is not yet written in step S13, namely, in the case where the power was shut off before the new parity is written after completion of the storage of the intermediate parity, the processes in steps S14 to S17 are executed. First, in step S14, the new parity is formed from the exclusive OR of the new data 82 and the intermediate parity 88 held in the non-volatile memory 70 and is stored into the non-volatile memory 70. In the next step S15, the new parity 90 is read out from the non-volatile memory 70 and is transferred and stored into the device adapter 30-2. In step S16, the new parity 90 is transferred to the disk apparatus 32-2. The new data is written in step S17. At the time of power shut-off, if the new data 82 and the intermediate parity 88 could be held in the non-volatile memory 70 as mentioned above, it is sufficient to execute only the processes such that the new parity 90 is formed from the new data 82 and the intermediate parity 88 and is written into the disk apparatus 32-2 for parities. The recovering process can be executed at a higher speed as compared with that in case of again executing the processes from the beginning.

Figure 48:
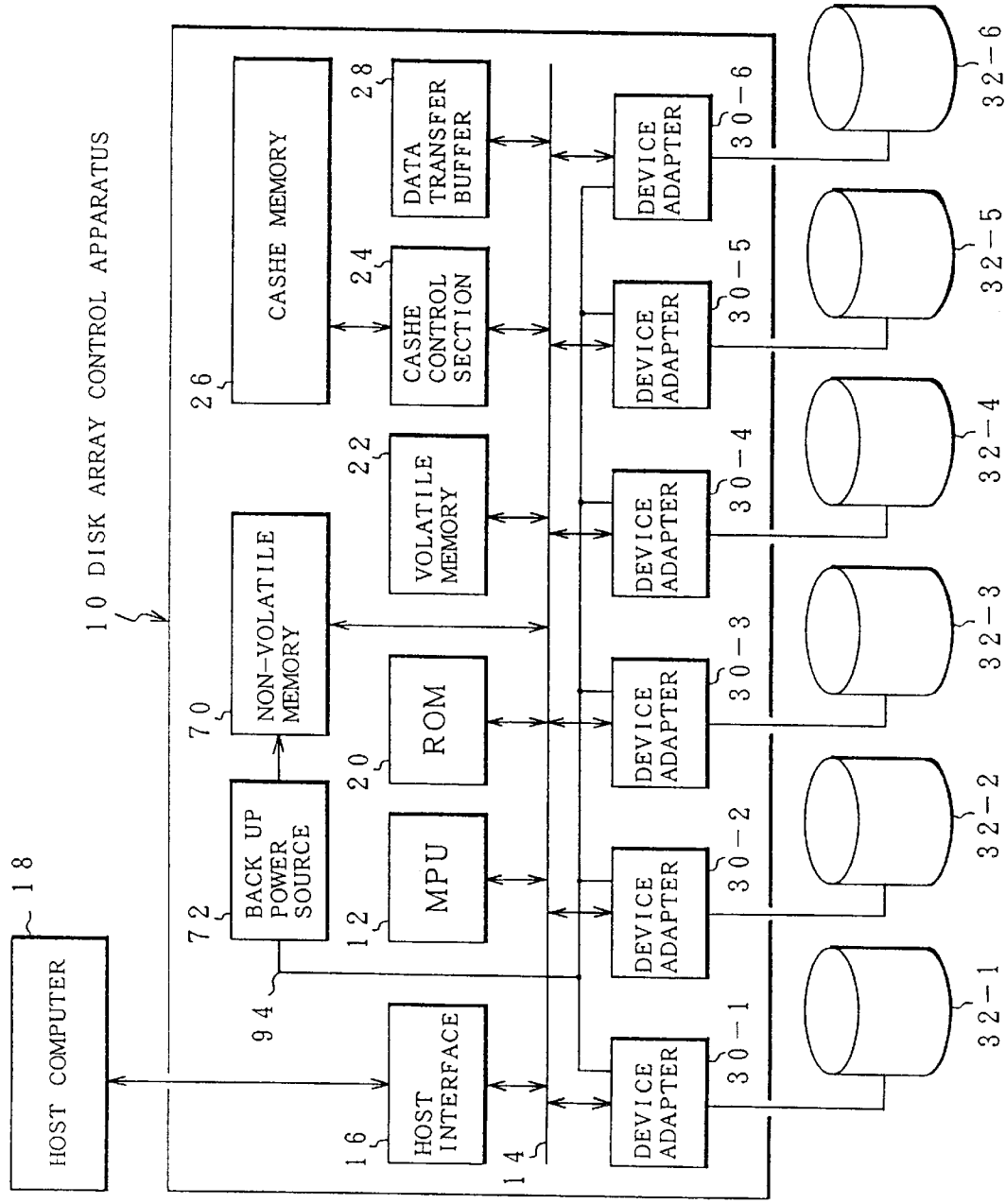
FIG. 48 is an embodiment constructional diagram showing the third embodiment of the invention in which the recovering process at the time of power shut-off is executed by using the non-volatile memory.
Figure 49:
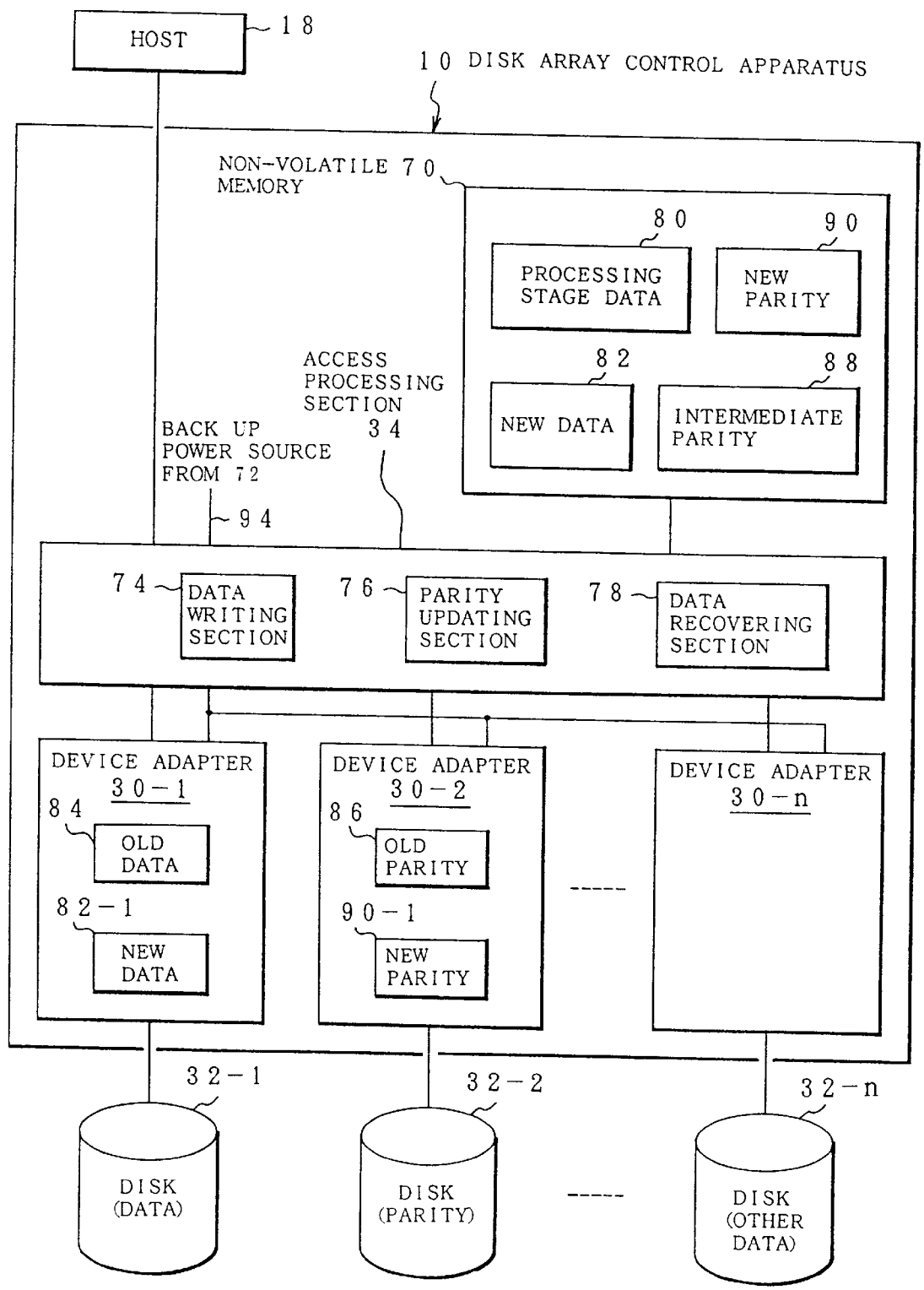
FIG. 49 is a functional block diagram showing the processing content of the embodiment of FIG. 48.

FIG. 48 shows a construction of the third embodiment of the recovering process according to the invention. The embodiment is characterized in that in addition to the processing stage data 80, new data 82, and intermediate parity 88, the new parity 90 is also further held as shown in the non-volatile memory 70 in a functional block diagram of FIG. 49. Further, there is a feature such that a backup power source line 94 from a backup power source 72 is connected to all of the device adapters 30-1 to 30-6, the device adapters 30-1 to 30-6 are made operative at the time of power shut-off, and the recovery data 84 and old parity 86 which were read out from the disk apparatus side can be held or the new data 82 and new parity 90 which were transferred from the access processing section 34 side can be held. According to the third embodiment shown in FIGS. 48 and 49, when the processes are interrupted at the time of occurrence of the power shut-off, the data obtained just before the interruption is held as it is in the non-volatile memory 70 and the device adapters 30-1 and 30-2. Therefore, it is sufficient to restart the process from the stage that is one preceding to the stage at which the power shut-off occurred as a recovering process after the power source was recovered. The overlapped processes before and after the power shut-off can be minimized and the recovering process can be executed at a high speed.

As further another embodiment of the invention, it is also possible to combine the embodiments of FIGS. 7 and 39. As for a hardware construction for this purpose, a non-volatile memory is used as a cache memory 26 in the embodiment of FIG. 7 and the data which indicates the processing stage and has been stored in the non-volatile memory 70 in the embodiment of FIG. 39 is stored. As a processing function, it is sufficient to provide the functions of both of the embodiments by the MPU 12.

Although the above embodiments have been described with respect to an example in which the magnetic disk apparatus is used as a disk apparatus, a disk array using optical disc apparatuses other than the magnetic disk apparatuses can be also constructed. The invention is also not limited by the numerical values shown in the embodiments.

Industrial Applicability

According to the present invention as described above, when the writing process into the disk array is executed, by storing the data that is necessary to form the new redundant information into the cache memory, the reading process from the disk apparatus can be omitted, and even when the redundant information has been stored in the disk apparatus, the executing time of the writing process can be reduced and the processes of a higher speed can be realized. Even if the power source is shut off during the writing process of the disk array having the constructions corresponding to RAID4 and RAID5, by restarting the writing process from the halfway after the power source was recovered, the writing process in which the redundancy of the data is maintained can be completed. The reliability of the disk array apparatus can be further improved. Moreover, by holding by the storage of the data into the non-volatile memory, the recovering process after the power source was shut off can be executed at a high speed and the apparatus can be made operative at a higher speed.

We claim:

1. A disk array apparatus characterized by comprising:

a disk array having a plurality of disk apparatuses for storing data and one disk apparatus for storing redundant information;

writing means for reading out old data stored at a writing position in the designated disk apparatus when a writing process is instructed from an upper apparatus and, after that, writing new data transferred from the upper apparatus;

redundant information updating means for reading out the old redundant information from a storing position in the disk apparatus for redundant information corresponding to the disk writing position by said writing means, forming new redundant information on the basis of said old redundant information, old data, and new data, and subsequently writing the new redundant information to the disk storing position of the old redundant information; and non-volatile memory means for storing processing stage data indicative of processing stages of said writing means and said redundant information updating means and the new data transferred from the upper apparatus.

2. A disk array apparatus according to claim 1, characterized by further having recovering means for referring to the processing stage data in said non-volatile memory means at the time of turn-on of a power source, and in the case where the writing process has been interrupted in the halfway, for executing a recovering process by using the new data held in the non-volatile memory means.

3. A disk array apparatus according to claim 2, characterized in that in the case where a power shut-off has occurred before completion of the writing of the new data into the disk apparatus, said recovering process allows the writing means to execute processes such that the old data stored at the writing position in the designated disk apparatus is read out and, after that, the new data read out from the non-volatile memory means is written, and said recovering process subsequently allows the redundant information updating means to execute processes such that the old redundant information is read out from the storing position in the disk apparatus for redundant information corresponding to the disk writing position by said writing means and new redundant information is formed on the basis of the old redundant information, old data, and new data and, after that, the new redundant information is written to the disk storing position of the old redundant information.

4. A disk array apparatus according to claim 2, characterized in that in the case where the power shut-off has occurred before completion of the writing of the new redundant information into the disk apparatus for redundant information, said recovering means allows the writing means to execute a process to read out the storing data at the corresponding positions in the disk apparatuses other than the disk apparatus into which new data will be written and the disk apparatus for redundant information, and said recovering means subsequently allows the redundant information updating means to execute processes such that new redundant information is formed from the data read out from the other disk apparatuses and the new data read out from the non-volatile memory means and, after that, the new redundant information is written to the disk storing position of the old redundant information.

5. A disk array apparatus according to claim 1, characterized in that said redundant information updating means forms intermediate redundant information from the old redundant information and the old data and, after that, forms new redundant information from the intermediate redundant information and the new data, and in addition to the processing stage data and the new data, the intermediate redundant information are stored into the non-volatile memory means.

6. A disk array apparatus according to claim 5, characterized by further having recovering means for referring to processing stage data of said non-volatile memory means at the time of turn-on of a power source, and in the case where the writing process has been interrupted in the halfway, for executing the recovering process by using the new data and intermediate redundant information which were held in said non-volatile memory means.

7. A disk array apparatus according to claim 6, characterized in that in the case where the power shut-off has occurred before completion of the writing of the new data into the disk apparatus, said recovering means allows the writing means to execute processes such that the old data stored at the writing position in the designated disk apparatus is read out and, after that, the new data read out from the non-volatile memory means is written, and said recovering means subsequently allows the redundant information updating means to execute processes such that the old redundant information is read out from the storing position in the disk apparatus for redundant information corresponding to the disk writing position by said writing means and new redundant information is formed on the basis of the old redundant information, old data, and new data via the formation of the intermediate redundant information and, after that, the new redundant information is written to the disk storing position of the old redundant information.

8. A disk array apparatus according to claim 6, characterized in that in the case where the power shut-off has occurred before the intermediate redundant information is stored into the non-volatile memory means after completion of the writing of the new data, said recovering means allows the writing means to execute a process to read out the storing data at the corresponding positions in the disk apparatuses other than the disk apparatus into which the new data will be written and the disk apparatus for redundant information, and said recovering means subsequently allows the redundant information updating means to execute processes such that new redundant information is formed from the data read out from the other disk apparatuses and the new data read out from the non-volatile memory means and, after that, the new redundant information is written to the disk storing position of the old redundant information.

9. A disk array apparatus according to claim 6, characterized in that in the case where the power shut-off has occurred before completion of the writing of the new data after the intermediate redundant information had been stored, said recovering means allows the redundant information updating means to execute processes such that the new data and intermediate redundant information are read out from the non-volatile memory means and new redundant information is formed and, after that, the new redundant information is written to the disk storing position of the old redundant information.

10. A disk array apparatus according to claim 1, characterized in that said non-volatile memory means further stores the new redundant information in addition to the processing stage data and the new data.

11. A disk array apparatus according to claim 10, characterized by further having recovering means for referring to the processing stage data of said non-volatile memory means at the time of turn-on of a power source and, in the case where the writing process has been interrupted in the halfway, for executing a recovering process by using the new data and new redundant information held in the non-volatile memory means.

12. A disk array apparatus according to claim 10, characterized in that a backup power source is supplied to a disk adapter provided for each of said plurality of disk apparatuses, and when the power source is shut off, the old data and the old redundant information can be held.

13. A disk array apparatus according to claim 1, characterized in that said non-volatile memory means has a backup power source.

14. A disk array apparatus according to claim 1, characterized in that each of said plurality of disk apparatuses accepts the writing of the same data which belongs to one data unit and uses a predetermined disk apparatus to store the redundant information.

15. A disk array apparatus according to claim 1, characterized in that each of said plurality of disk apparatuses accepts the writing of the same data which belongs to one data unit and makes the disk apparatus that is used to store the redundant information different each time the data is written.

16. A disk array apparatus according to claim 1, characterized in that said writing means and said redundant information updating means are operated in parallel.

17. A disk array apparatus according to claim 1, characterized in that parity data is used as said redundant information.

* * * * *